(12) United States Patent
Yu et al.

(10) Patent No.: US 7,839,101 B2
(45) Date of Patent: Nov. 23, 2010

(54) LINEAR INDUCTION MACHINE CONTROL SCHEME, SYSTEMS, AND METHODS

(75) Inventors: Haidong Yu, Saint Joseph, MI (US); Babak Fahimi, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 386 days.

(21) Appl. No.: 12/114,520

(22) Filed: May 2, 2008

(65) Prior Publication Data

US 2008/0272716 A1    Nov. 6, 2008

Related U.S. Application Data

(60) Provisional application No. 60/927,230, filed on May 2, 2007.

(51) Int. Cl.
*H02P 1/00* (2006.01)
(52) U.S. Cl. .................. 318/135; 318/153; 318/687; 318/727
(58) Field of Classification Search ............ 318/135, 318/143, 147, 151, 153, 687, 727, 807; 322/14, 322/15, 17, 29
See application file for complete search history.

(56) References Cited

U.S. PATENT DOCUMENTS

| | | | |
|---|---|---|---|
| 4,315,203 A * | 2/1982 | Ibamoto et al. | 318/807 |
| 4,453,116 A * | 6/1984 | Bose | 318/727 |
| 6,194,850 B1 * | 2/2001 | Kumar et al. | 318/52 |
| 7,292,003 B1 * | 11/2007 | Baker | 318/717 |
| 7,443,127 B2 * | 10/2008 | Okazaki et al. | 318/722 |

OTHER PUBLICATIONS

Adamiak, K., et al., "Finite element force calculation in linear induction machines", IEEE Transactions on Magnetics, vol. 23, Issue 5, pp. 3005-3007, Sep. 1987.

da Silva, E.F. et al., "Vector control for linear induction motor", Industrial Technology, 2003 IEEE International Conference, pp. 518-523, Dec. 10-12, 2003.

Dawson, G., et al., "Design of Linear Induction Drives by Field Analysis and Finite-Element Techniques", IEEE Transactions on Industry Applications, vol. IA-22, Issue: 5, pp. 865-873, Sep. 1986.

Kang, G., et al., "Field-oriented control scheme for linear induction motor with the end effect", Electric Power Applications, IEE Proceedings, vol. 152, Issue: 6, pp. 1565-1572, Nov. 4, 2005.

Kwon, B. et al., "Experimental investigations and simulations using FEM for thedirect field oriented control of linear induction motor", Electric Machines and Drives Conference Record, IEEE International, pp. MC1/10.1-MC1/10.3, May 18-21, 1997.

Lin, F.J., et al., "Adaptive backstepping control using recurrent neural network for linear induction motor drive", IEEE Transactions on Industrial Electronics, vol. 49, Issue 1, pp. 134-146, Feb. 2002.

(Continued)

*Primary Examiner*—Walter Benson
*Assistant Examiner*—Thai Dinh
(74) *Attorney, Agent, or Firm*—Chowdhury & Georgakis, P.C.

(57) ABSTRACT

A method and system for a control scheme for linear induction machines. The control scheme includes a maximum energy conversion ratio and a maximum acceleration and deceleration for linear induction machines.

20 Claims, 38 Drawing Sheets

OTHER PUBLICATIONS

Vaez-Zadeh, S., et al., "Vector control of linear induction motors with end effect compensation", Electrical Machines and Systems, 2005. ICEMS 2005. Proceedings of the Eighth International Conference, vol. 1, pp. 635-638, Sep. 27-29, 2005.

Wu, D., et al., "A Field Reconstruction Technique for Efficient Modeling of the Fields and Forces within Induction Machines", Industrial Electronics Society, IECON 2007, 33rd Annual Conference of the IEEE, pp. 1274-1279, Nov. 5-8, 2007.

Yu, H., "High grade control of linear induction motor drives," *Doctor of Philosophy dissertation,* University of Texas Arlington, Dec. 2007.

Yu, H., et al., "Analysis of High Speed Characteristics for Linear Induction Machines", Vehicle Power and Propulsion Conference, 2006. VPPC '06. IEEE, pp. 1-6, Sep. 6-8, 2006.

Yu, H., et al., "An Investigation on Asymmetry Effects in Linear Induction Machines", Applied Power Electronics Conference, APEC 2007—Twenty Second Annual IEEE, pp. 390-395, Feb. 25, 2007-Mar. 1, 2007.

Yu, H., et al., "A Direct Control Scheme to Achieve Maximum Acceleration in Linear Induction Motors," *IEEE International Conference on Electric machines and drives,* IEMDC 2007, vol. 2, pp. 977-982, Antalya, Turkey, May 3-5, 2007.

Yu, H., et al., "Effects of Airgap Length Variation in Frictionless Linear Induction Transportation Systems," *IEEE Vehicle Power and Propulsion Conference* (VPPC 2007), pp. 377-382, Sep. 9-12, 2007.

Yu, H., et al., "Investigation of Electromechanical Differences of Linear Induction Machine Operation Regions," *IEEE Vehicle Power and Propulsion Conference* (VPPC 2007), pp. 84-89, Sep. 9-12, 2007.

Yu, H., et al., "Maximum Force Control of a Linear Induction Motor Drive," Industrial Electronics Society (IECON) 33rd Annual Conference of the IEEE, pp. 1091-1096, Nov. 5-8, 2007.

Zhu, W., et al., "A field reconstruction method for optimal excitation of permanent magnet synchronous machines", IEEE Transactions on Energy conversion, vol. 21, Issue 2, pp. 305-313, Jun. 2006.

* cited by examiner

300

_US 7,839,101 B2_

LINEAR INDUCTION MACHINE CONTROL SCHEME, SYSTEMS, AND METHODS

CROSS-REFERENCE TO RELATED APPLICATIONS

This application claims priority to U.S. Provisional Application No. 60/927,230, filed on May 2, 2007, which is incorporated by reference herein.

BACKGROUND OF THE INVENTION

The embodiments described herein relates generally to the field of induction, and more particularly to induction drives, machines, and controls thereof.

Vector control has been intensively utilized in linear induction machines ("LIM") to achieve maximum speed acceleration and deceleration for linear induction machines. Vector control includes direct field oriented control and indirect field oriented control. Vector control does not provide sufficient functionality for LIM as for other types of machines, e.g., rotary induction machines ("RIM") due to trailing eddy current effects and magnetic asymmetry effects. Furthermore, vector control schemes are relatively complicated, expensive, and ineffective.

The embodiments described herein solve these problems, as well as others.

SUMMARY OF THE INVENTION

The foregoing and other features and advantages are defined by the appended claims. The following detailed description of exemplary embodiments, read in conjunction with the accompanying drawings is merely illustrative rather than limiting, the scope being defined by the appended claims and equivalents thereof.

A method and system for a control scheme for linear induction machines. The control scheme includes a maximum energy conversion ratio and a maximum acceleration and deceleration.

BRIEF DESCRIPTION OF THE FIGURES

The foregoing description of the figures is provided for a more complete understanding of the drawings. It should be understood, however, that the embodiments are not limited to the precise arrangements and configurations shown.

DETAILED DESCRIPTION OF THE EMBODIMENTS

The methods, apparatuses, and systems can be understood more readily by reference to the following detailed description of the methods, apparatuses, and systems, and the following description of the Figures.

It is to be understood that the LIM system and control scheme may be applied to control motoring, generating, and electromagnetic braking regions in any linear induction machine. Generally speaking the linear induction machines that may avail benefits from the embodiments described herein include, but are not limited to, linear flat induction machines (single-sided and double-sided), tubular linear induction machines, and the like. Although particular embodiments are described with reference to one or more type variations of motors and/or generators, it should be expressly understood that such embodiments may be utilized with other variations of motors or generators. The LIM system and control scheme may be applied to any desired application, with appropriate modifications, such as motors and generators in the transportation, automotive, aerospace, military applications, and the like.

Figure 1A:
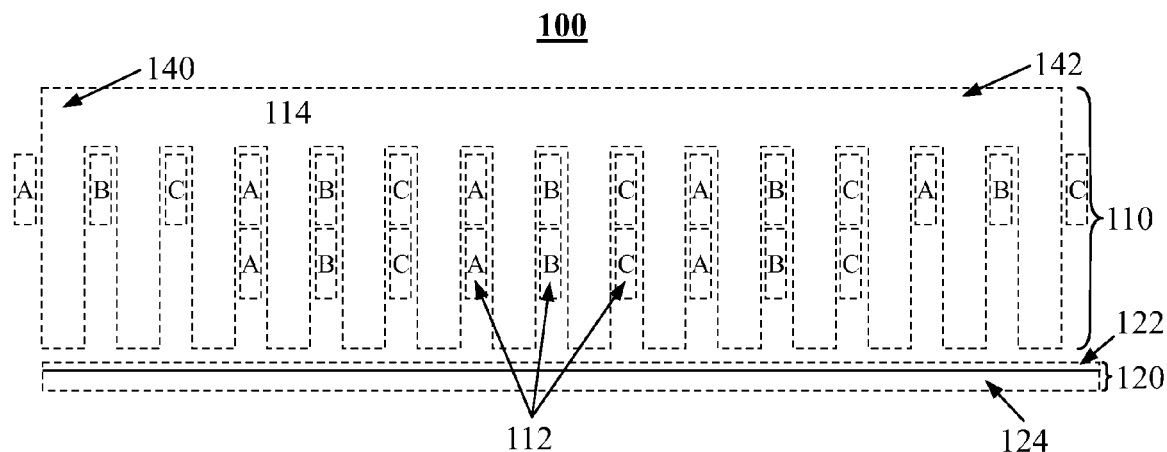
FIG. 1A is the cross-sectional view of a model Finite Element Analysis ("FEA") of the LIM.
Figure 1B:
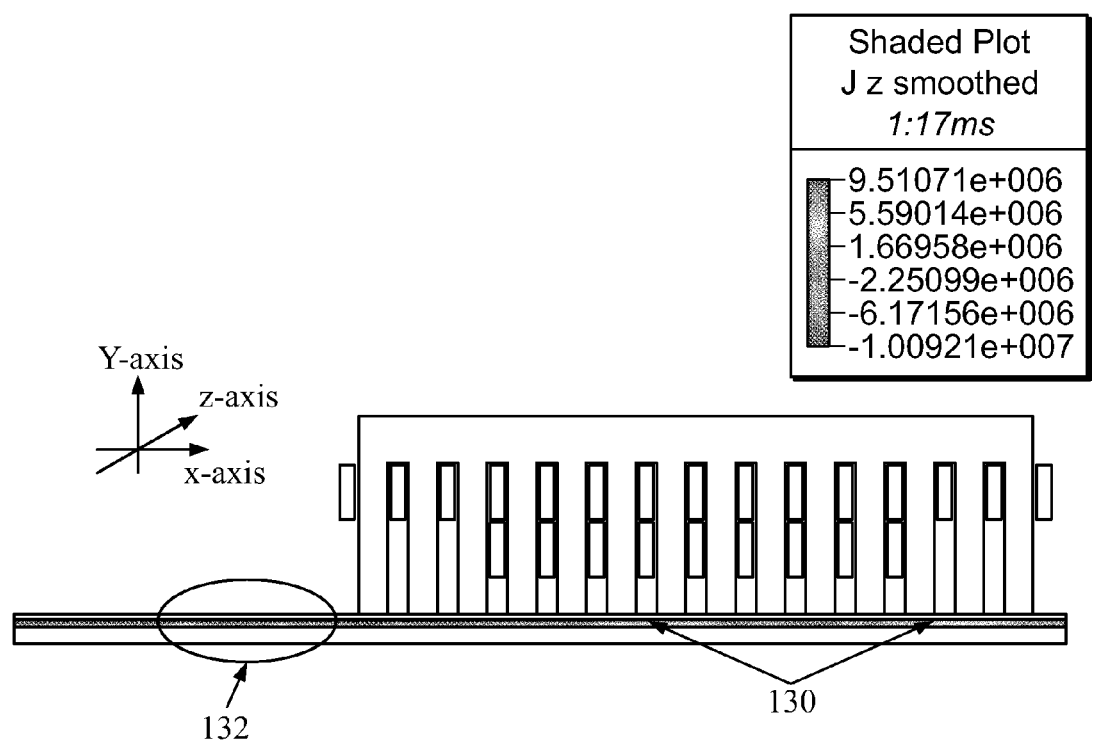
FIG. 1B is the cross-sectional view of a trailing eddy current in the FEA of the LIM.

As shown in FIG. 1A, the LIM control scheme can be generally understood by a LIM system 100 in a FEA based on machine construction details, in one embodiment. The LIM system 100 comprises a primary 110 and a secondary 120. The "primary" is the moveable part of the LIM system 100 relative to the "secondary", which is the stationary part of the LIM system 100. The primary 110 may comprise a three phase excitation winding 112 in the uniform slots of the laminated core 114. The three phases A, B, and C, are generally shown in FIG. 1A. The secondary 120 comprises at least a first metal 122 and a second metal 124. The first metal 122 may further comprise aluminum or copper. The second metal 124 may further comprise any appropriate magnetic material, such as a solid back iron core, a steel plate, and the like. When the primary 110 is excited by a set of balanced sinusoidal currents, an eddy current 130 is induced on the secondary aluminum sheet 122, as shown in FIG. 1B. Two electromagnetic sources react to produce electromagnetic forces, where the tangential force is known as "thrust" and another force is known as the "normal force". The LIM system 100 includes two open ends 140 and 142 on the primary 110. When the LIM system 100 moves forward, from left to right generally shown in the x-axis direction in FIG. 1B, there is a trailing eddy current 132 that is not in the overlapped region between the primary 110 and the secondary 120. The trailing eddy current 132 can cause non-sinusoidal and asymmetric magneto-motive force ("MMF"), and prohibit field oriented control from operating properly for LIMs.

Figure 1C:
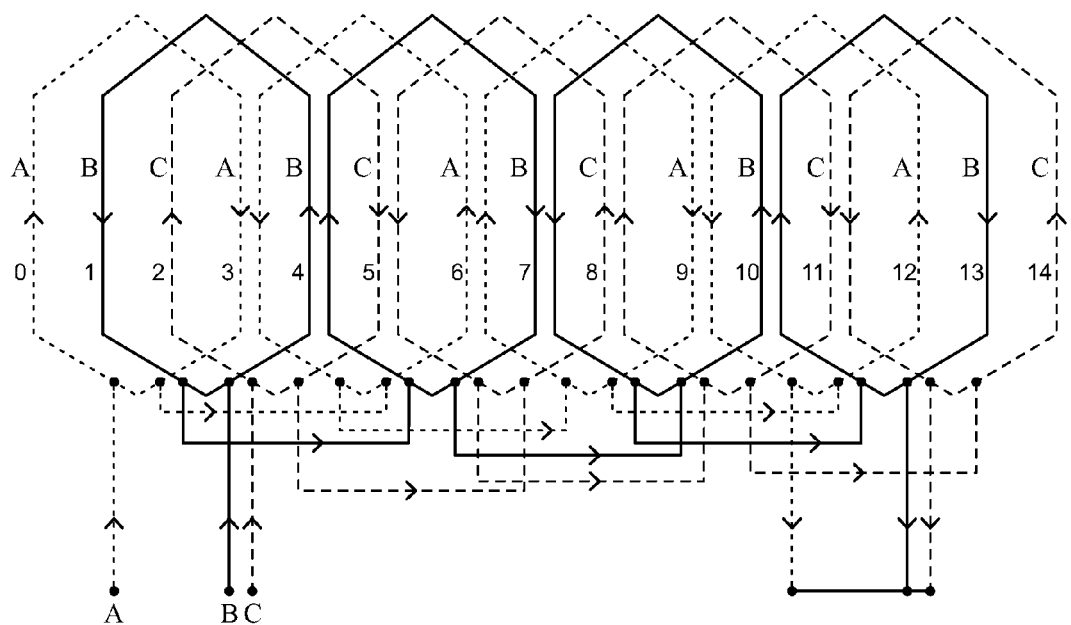
FIG. 1C is the primary winding scheme.

In one embodiment, one or more relationships between the electromagnetic forces and the different ranges of linear speed and excitation frequencies can be determined using Finite Element Analysis ("FEA"), including the motoring, generating, and electromagnetic braking regions of the LIM. FEA consists of a computer model of a material or design that is stressed and analyzed for specific results. FEA may be run on standard operating software and computer systems. The components of the computer systems can include, but are not limited to, one or more processors or processing units, a system memory, and a system bus that couples various system components including the processor to the system memory. The system memory can store an operating system and operating software. In one embodiment, the operating software is Infolytica's MagNet (Montréal, Québec). The primary winding scheme for phases A, B, and C in the FEA is shown in FIG. 1C. In another embodiment of the FEA, the solver method in FEA may be the Newton-Raphson iteration method, where the maximum iteration number is 20, and the polynomial order is 1. The maximum length of triangle sides located around the airgap, aluminum sheet surface, and primary teeth surface is about 1 mm.

Figure 2A:
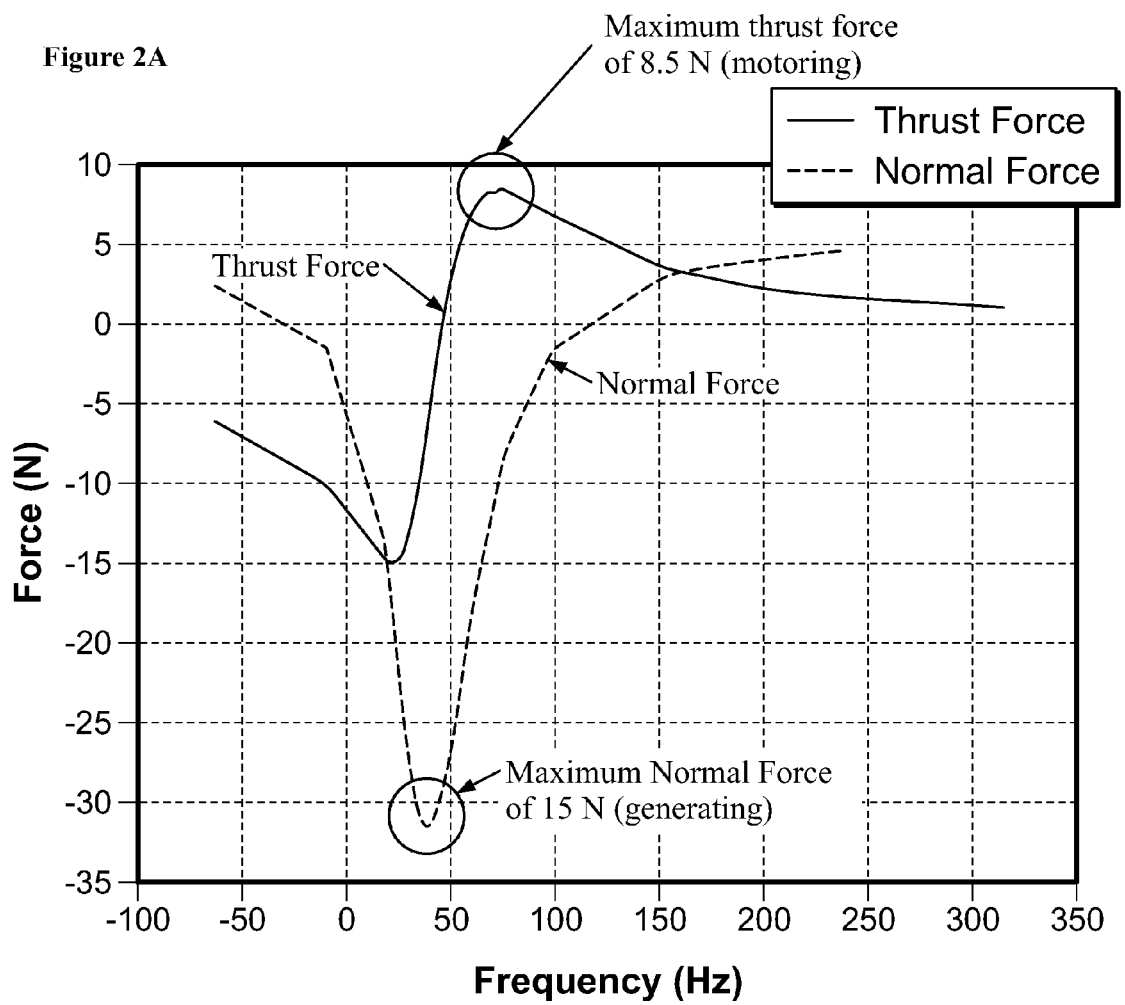
FIG. 2A is a plot of the average force variations with respect to frequency at a linear speed of 5 m/sec.

As shown in FIG. 2A, the variations of average thrust and normal forces with respect to stator frequency, when the power supply is a set of a three phase, balanced current sources with an amplitude of 2 A, and the linear speed is kept at 5 m/sec. The maximum forces during motoring and generating modes exhibit tangible differences. From synchronous frequency to positive infinity, the LIM system 100 operates as a motor, and from 0 Hz to synchronous frequency, the LIM works as a generator. From negative infinity to 0 Hz, the LIM system 100 operates under electromagnetic braking when the LIM system 100 has electrical and mechanical inputs at the same time.

Figure 3A:
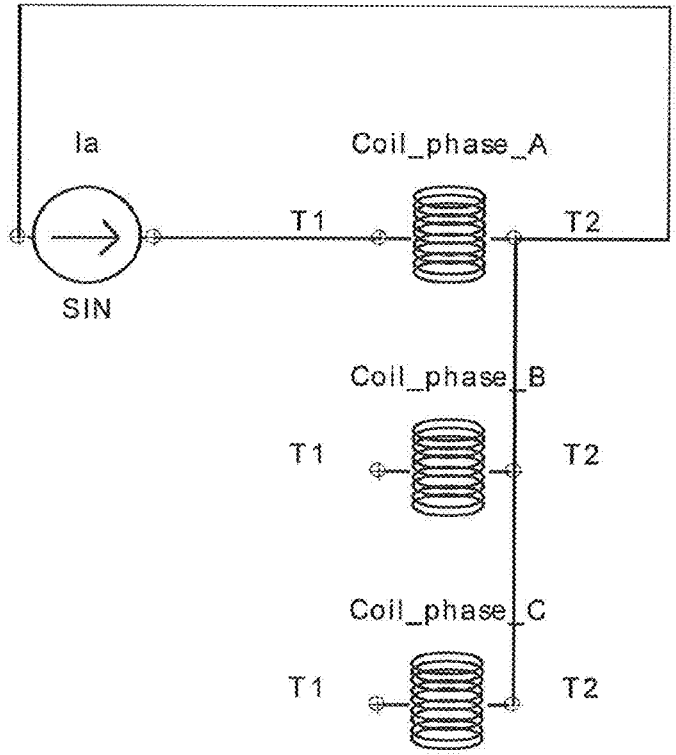
FIG. 3A is a schematic of the Excitation Circuit of the Direct Method used for flux density measurement.

The asymmetry effects are present in performance of the LIM system 100 under motoring conditions and generating conditions. Due to the different relative positions of A, B, and C phases in the primary 110, contribution of each phase to a transitional magneto-motive force will be unequal. When phases a, b, and c are each excited by a Direct Current ("DC") respectively under a lock up condition, it is known as the "direct method". The excitation circuit for the direct method is shown in FIG. 3A. The peak flux densities in the primary in each case are 0.560416 Tesla ("T"), 0.507523 T, and 0.582781 T in the sequence respectively for phases a, b, and c. There is a significant difference in primary flux density between phase b, and phases a and c.

Figure 3B:
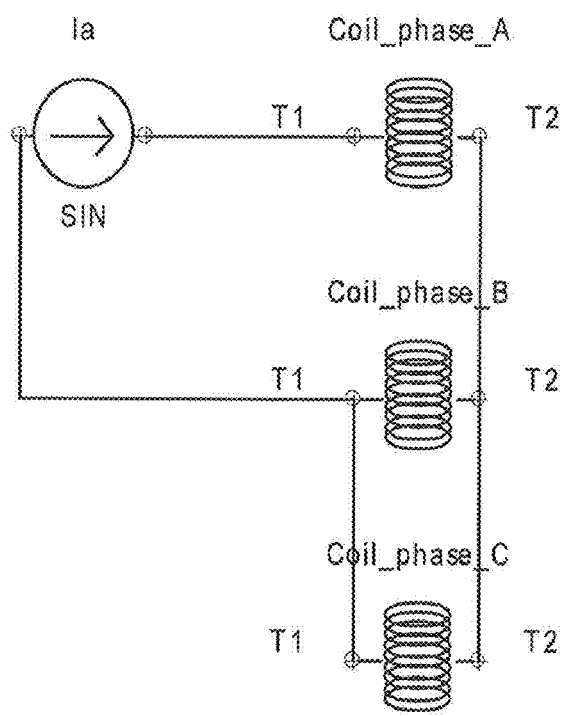
FIG. 3B is a schematic of the excitation circuit of the Indirect Excitation Method used for flux density measurement.
Figure 4A:
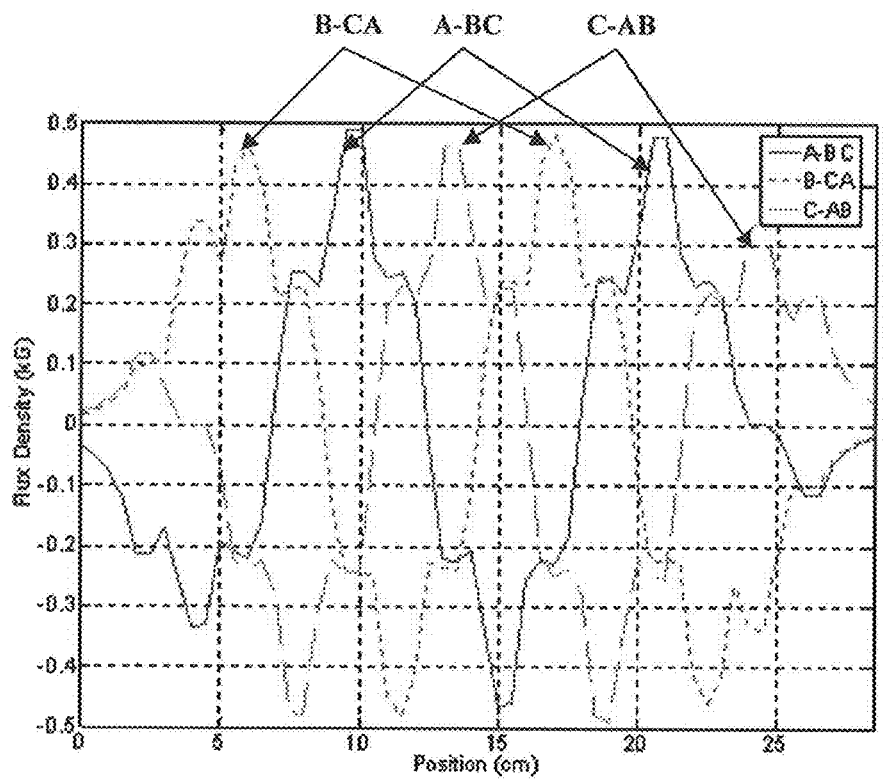
FIG. 4A is a plot of the normal flux density of three connections in FEA.
Figure 4B:
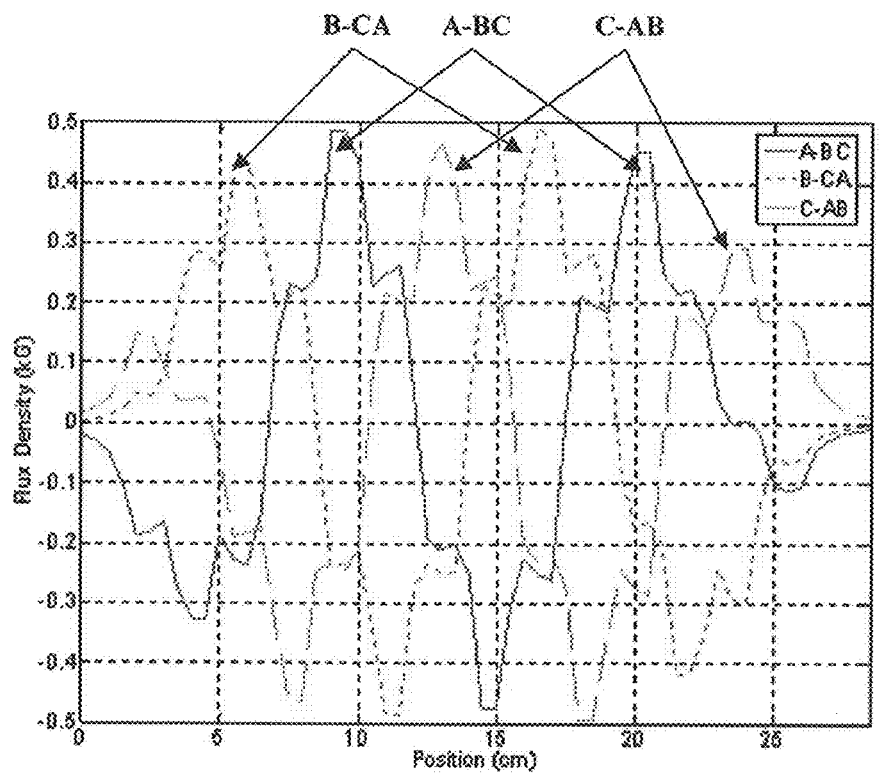
FIG. 4B is a plot of the normal flux density of three connections in the LIM system.

In the "indirect method", when one phase is excited by a DC current, the other two phases are connected in parallel to supply the return path for the first phase current, with the circuit for the indirect method shown in FIG. 3B. Since the winding connection of the primary 110 is a 'Y' connection without access to the neutral point, the indirect method circuit has been used. As a result, when phase a is excited and phases b and c are connected in parallel, this condition is defined as A-BC. When phase b is excited by phases c and a, this condition is defined as C-AB. When phase c is excited by phases a and b, this condition is defined as B-CA. Based on the above method, FIG. 4A shows the normal flux density of three connections in FEA. FIG. 4B shows the normal flux density of the three connections in an LIM system 200.

Figure 5A:
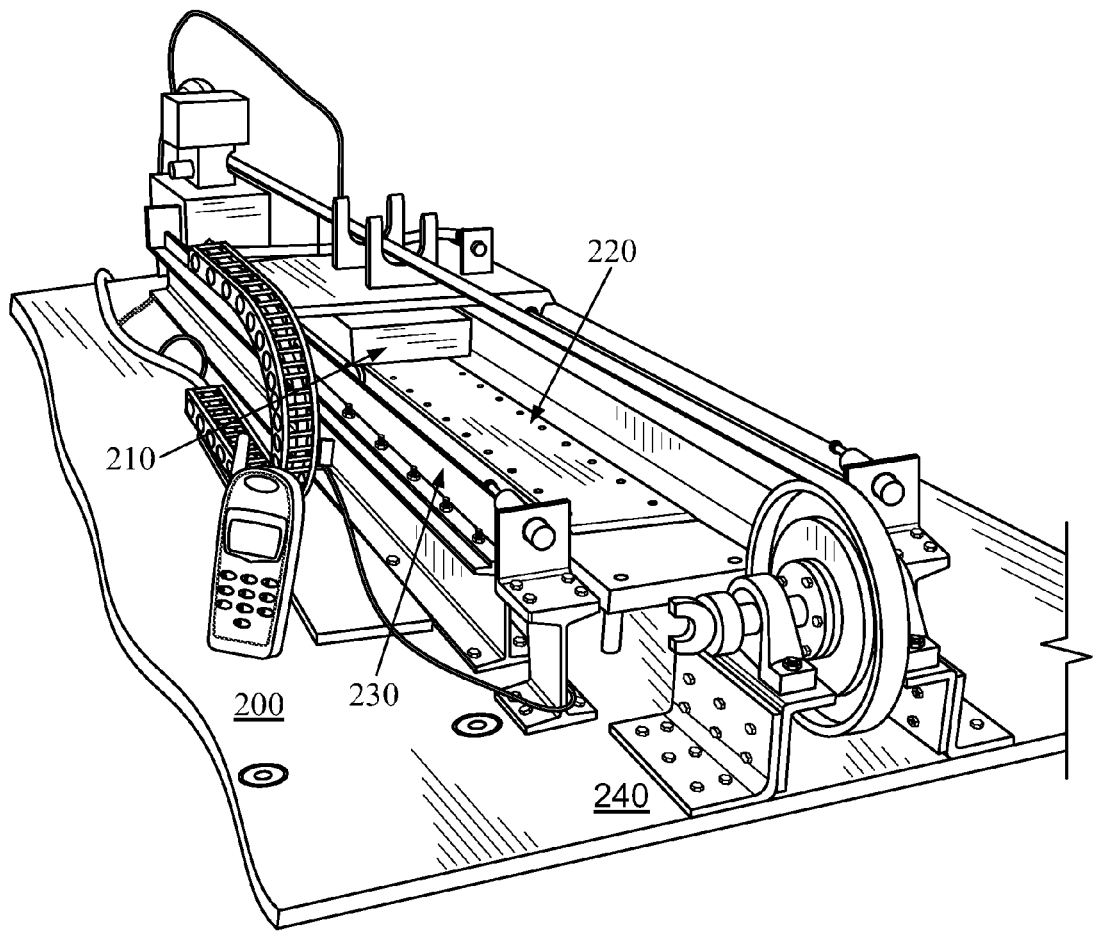
FIG. 5A is a perspective view the LIM system.

As shown in FIG. 5A, the LIM system 200 comprises a primary 210, a secondary 220, and a railway 230. In one embodiment, the LIM system 200 comprises a single sided, three phase, 4-pole linear induction machine with an overall stroke of 1524 mm. Additional information of the LIM system 200 is provided in TABLE 1 for one embodiment. It is to be understood that the information in TABLE 1 is for example only, and other parameters may be employed in the LIM system. Primary excitation is formed by a set of three phase balanced current sources, where the phase current amplitude is 2 A. The linear speed is kept at 5 m/sec, 10 m/sec, and 15 m/sec to represent various ranges for linear speed.

TABLE 1

| No. | Parameter | Description |
| --- | --- | --- |
| 01. | Type | Linear Induction Machine |
| 02. | Power supply | 240 V, 3 phase AC |
| 03. | Winding Configuration | wye |
| 04. | Poles | 4 |
| 05. | Slots per pole per phase | 1 |
| 06. | Air Gap (mm) | 2.54 |
| 07. | Primary Dimensions in x, y, and z Directions (mm) | 250 72 100 |
| 08. | Reaction Plate Dimensions in x, y and z Directions (mm) | 1524 3 100 |
| 09. | Back Iron Dimensions in x, y and z Directions (mm) | 1524 6 100 |
| 10. | Material of Primary Lamination | M19 |
| 11. | Material of Reaction Plate | Aluminum: 3.8e7 Siemens/meter |
| 12. | Material of Back Iron | CR10: Cold rolled 1010 steel |

FIG. 4B compared with FIG. 4A shows a close match between the normal flux density of the three connections in the LIM system 200 and the FEA, respectively. In addition, the waveform of excitation connection A-BC is a mirror image to that of excitation connection C-AB. The waveform of excitation caused by B-CA connection is anti-symmetric. The waveforms of excitations from the indirect method are similar with the results from the direct method. Therefore, the different relative positions of a, b, and c phases in the primary result in the magnetic asymmetry effects.

The flux linkage of each phase under a three phase balanced current excitation shows that phase a and c have almost the same magnitudes at about 0.27 weber ("Wb"). However, phase b exhibits a flux linkage of magnitude bigger than 0.3 Wb. The difference of the flux linkage values is beyond 10%; therefore, the flux linkage is not equally distributed among three phases. The resultant MMF will impact the force characteristic of the LIM system 200 and will hinder the application of conventional indirect field oriented control of LIM's.

Airgap Length Variation

Figure 6:
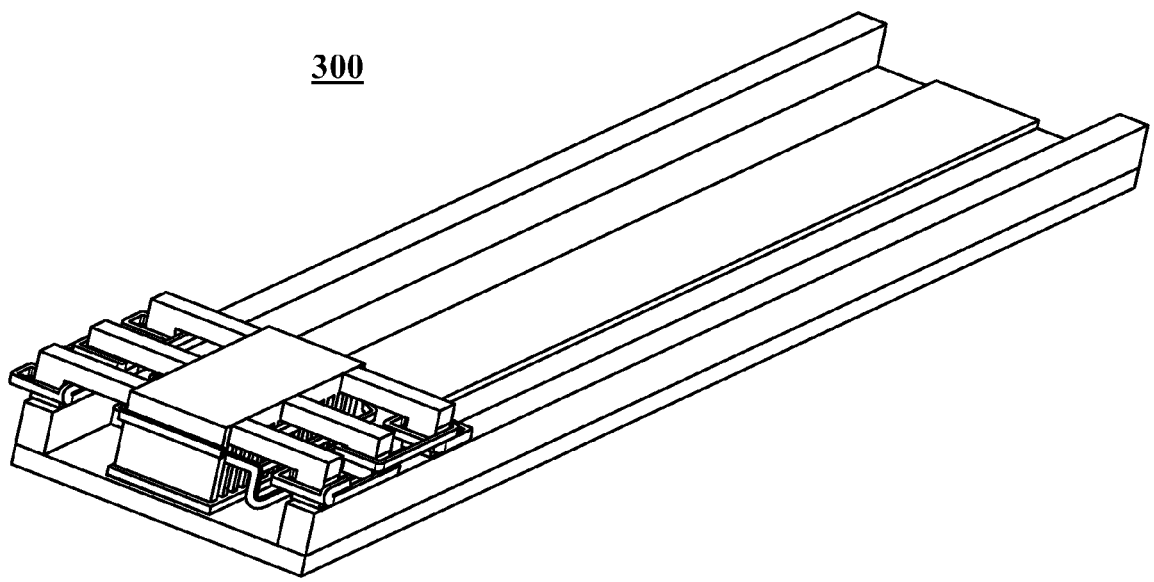
FIG. 6 is a perspective view of the combined system of the Magnetic Levitation ("maglev") system and the LIM system in FEA.

In one embodiment, the LIM system 200 may be combined with a magnetically levitated ("maglev") system 300 to achieve frictionless ultra fast transportation, as shown in FIG. 6. With the maglev system 300, the force characteristics under high speeds are important in propulsion applications, so the topologies of the airgap length effects are necessary to obtain for the full speed range. The effect of airgap length on the force characteristics of LIM at low linear speeds can be determined using FEA on a single sided, 3-phase, 4-pole LIM system 100, as shown FIG. 1A, and the detailed information as given in Table 1. The combination of maglev system 300 with the LIM system 200 can be optimized with the control scheme 400

When the linear speed is 1 m/sec (low speed range), and excitation frequency is 36.13 Hz, which is the motoring condition, the airgap length is varied from 1.5 mm, to 2.5 mm, 3.5 mm, and 4.5 mm in sequence. The excitation is a set of three phase balanced current sources with amplitude of 2 A. When the excitation frequency changes to 18.16 Hz, which is electromagnetic braking, both the thrust force and normal force monotonically decrease with the airgap length. And when the linear speed is increased to 10 m/sec to stand for the high speed range, the force variations with respect to airgap length under motoring (116.98 Hz) and generating (57.26 Hz) conditions respectively, the thrust force ceases to change monotonically. The thrust force reaches the peak value when airgap length is 2.5 mm, and then drops. When the machine works under generating conditions, thrust force and normal force monotonically decrease with airgap length. When the linear speed is 15 m/sec, the force characteristic with respect to airgap length shows that the thrust force has a maximum value at a 3.5 mm airgap length. When the linear speed increases, the airgap length for the maximum thrust force also increases. The normal force has the maximum value when airgap length is 2.5 mm.

Control Scheme

At any linear speed, a pair of excitation frequencies can produce the maximum driving force or braking force for the LIM system, where these excitation frequencies are defined as "optimum frequencies". If the gravity force and its by-product, friction force, are also taken into account, then Equation (1) is shown as:

$$f_{thrust} - \xi_{friction}(Mg + f_{normal}) = Ma \qquad (1)$$

Where $f_{thrust}$ is the thrust force, $f_{normal}$ is the normal force, $\xi_{friction}$ is the friction coefficient between LIM and the supporting frame, g is the gravity constant, M is total mass of the LIM system, a is the acceleration for the LIM system. The pair of optimum frequencies for any linear speed can be determined by Equation (1). In one embodiment, when the linear speed is 5 m/sec, the optimum frequency of motoring is 77.49 Hz, and optimum frequency of generating is 25.9 Hz. Using the knowledge of the optimum frequencies and the interpolation method, a plurality of lookup tables between linear speed and optimum frequency can be set up to achieve maximum acceleration/deceleration. The interpolation method constructs new data points within the range of a discrete set of known data points. A lookup table is a data structure, usually an array or associative array, used to replace a runtime computation with a simpler lookup operation. The optimum frequency is coupled into a power converter to produce a set of three phase, balanced, current sources of optimum frequencies using hysteresis current control, so at any linear speed, maximum acceleration/deceleration is implemented and maintained. Hysteresis current control is a method of controlling a voltage source inverter so that an output current is generated, which follows a reference current waveform. This method controls the switches in an inverter asynchronously to ramp the current through an inductor up and down so that it tracks a reference current signal. The linear speed is regulated with the usage of hysteresis control. Hysteresis control in a controller changes output states only when a given input goes below the low limit, or goes above the high limit. The control scheme 400 is generally shown in FIG. 7.

Figure 7:
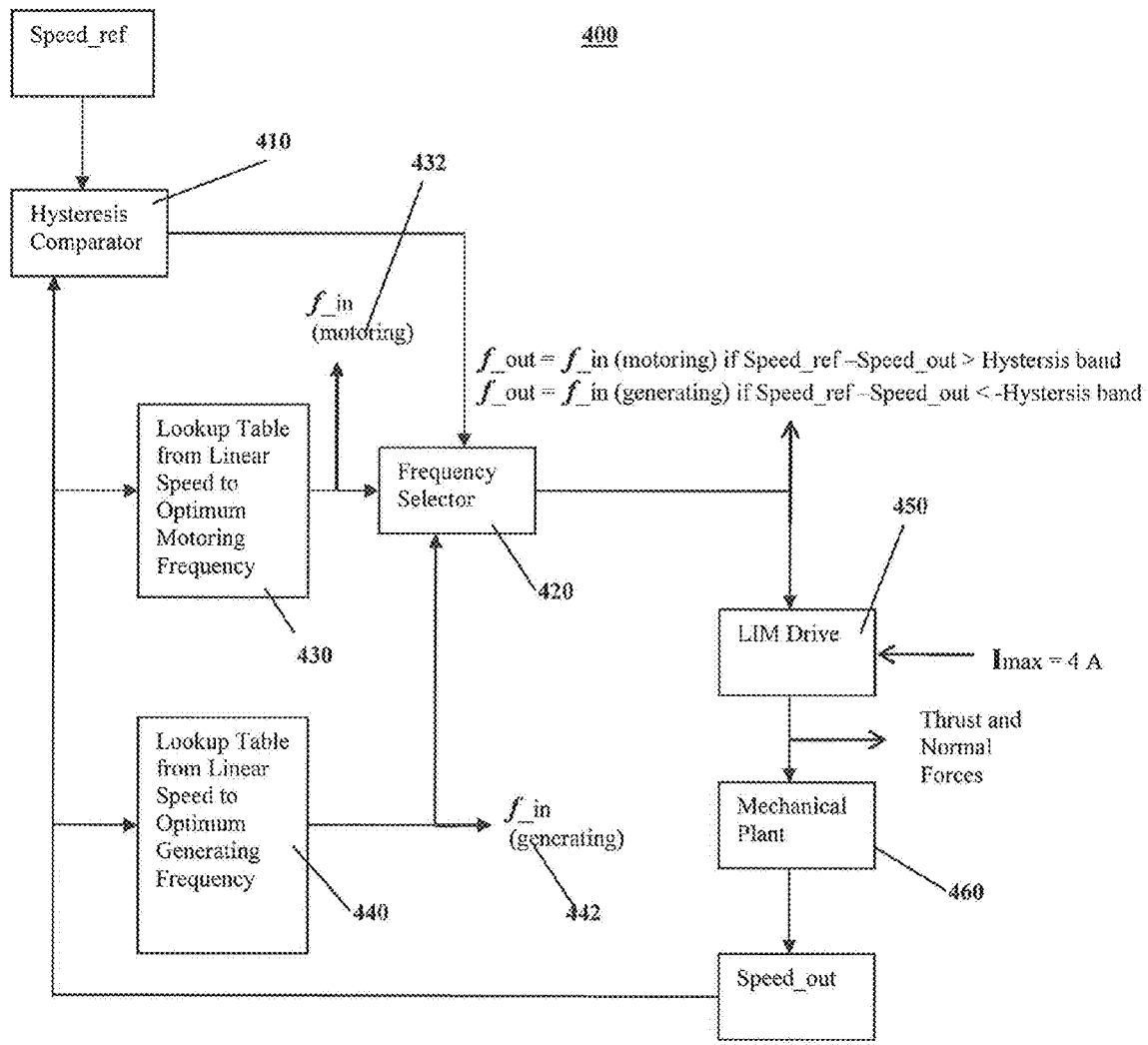
FIG. 7 is a schematic diagram of the control scheme.

As shown in FIG. 7, the control scheme 400 comprises a hysteresis comparator 410, a frequency selector 420, and at least a first lookup table 430 and a second lookup table 440. The hysteresis comparator 410 is a comparator which compares a processed quantity with a quantity whose value is standard for hysteresis property, where the difference being given as the output. The hysteresis comparator 410 determines whether the machine should work as a motor 432 or as a generator 442. The hysteresis comparator outputs the determination information to the frequency selector 420. The first and second lookup tables 430 and 440 store the optimum frequencies at discrete linear speeds. The first lookup table 430 stores the optimum frequency for motoring operations 432. The second lookup table 440 stores the optimum frequency for generating operations 442. The outputs from the lookup tables 430 and 440 are selected based on the operation mode as the motor or generator. The function of the frequency selector 420 comprises expressions (2) and (3):

$$f\_out = f\_in(\text{motoring}), \text{ if } \text{Speed}\_{ref} - \text{Speed}\_{out} > \text{Hysteresis band} \quad (2)$$

$$f\_out = f\_in(\text{generating}), \text{ if } \text{Speed}\_{ref} - \text{Speed}\_{out} < -\text{Hysteresis band} \quad (3)$$

Where $f\_out$ is the output of the frequency selector, $f\_in$(motoring) and $f\_in$(generating) are the outputs of the two lookup tables, $\text{Speed}\_{ref}$ is the reference linear speed, and $\text{Speed}\_{out}$ is the measured linear speed. The measured linear speed can be measured by any known linear speed encoder, where the measured speed is coupled to the hysteresis comparator by the $\text{Speed}\_{ref}$ and the $\text{Speed}\_{out}$.

In the control scheme 400, the accurate characteristics between "optimum frequencies" and linear speeds are stored in computer memory, hardware, or dedicated CPU instruction cache. Then the optimum frequencies are coupled into an LIM system 450 to generate thrust and normal forces. The thrust and normal forces of the LIM system 450 can then be coupled to a mechanical plant 460 to generate the $\text{Speed}\_{out}$, which is then coupled or monitored by the hysteresis comparator 410.

Figure 8A:
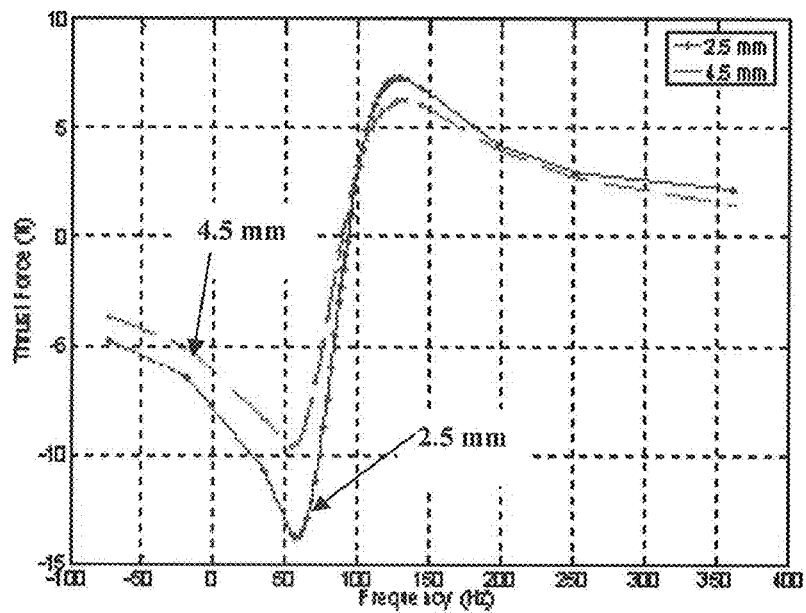
FIG. 8A is a plot of the thrust variations with excitation frequency for two airgap lengths at 10 m/sec.
Figure 8B:
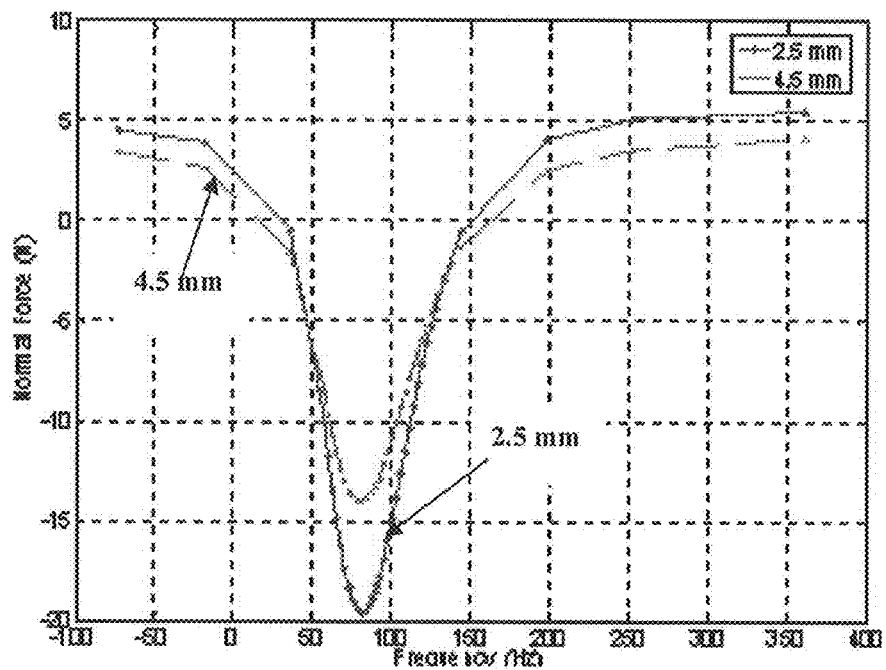
FIG. 8B is a plot of the normal force variations with excitation frequency for two airgap lengths at 10 m/sec.

The airgap variation cannot cause the change of the accurate characteristics between the optimum frequencies, such that the robustness of the control scheme 400 can tolerate the airgap variations. FIGS. 8A and 8B represent the thrust and normal force variations with respect to excitation frequency when the airgap is set at 2.5 mm and 4.5 mm respectively and the linear velocity is 10 m/sec. When the airgap length discrepancy is 80% to the rated value 2.5 mm, the pair of optimum frequencies at a linear speed 10 m/sec does not change. The control scheme 400 has good immunity to airgap variation, which can be used in the airgap length design of linear induction machines for high speed propulsive applications.

Secondary Conductivity Effect

The resistance of the LIM secondary 122 is subject to the ambient temperature change and heating effect caused by eddy current 130, which is governed by Equation (4):

$$R_r = \frac{234.5 + t_r}{234.5 + t_n} \times R_n \quad (4)$$

Where $R_n$ is the nominal value of secondary resistance, $R_r$ is the real value of resistance, $t_n$ is the nominal temperature, and $t_r$ is the real temperature.

The varying secondary resistance will also affect the secondary electric conductivity. The secondary electric conductivity affects the force characteristics of the LIM system. The thrust force and normal force variations with respect to secondary electric conductivity at 1 m/sec and 15 m/sec were tested. An increment of the secondary electric conductivity causes a significant drop of normal force from approximately $2 \times 10^{-7}$ Siemens/m to $5.5 \times 10^{-7}$ Siemens/m for both 1 m/sec and 15 m/sec, or a decrement of the secondary electric conductivity results in significant increase of the normal force. The variation of electric conductivity does not significantly affect thrust force from approximately $2 \times 10^{-7}$ Siemens/m to $5.5 \times 10^{-7}$ Siemens/m for both 1 m/sec and 15 m/sec. The variation of secondary electric conductivity can cause significant normal force ripples.

Figure 9A:
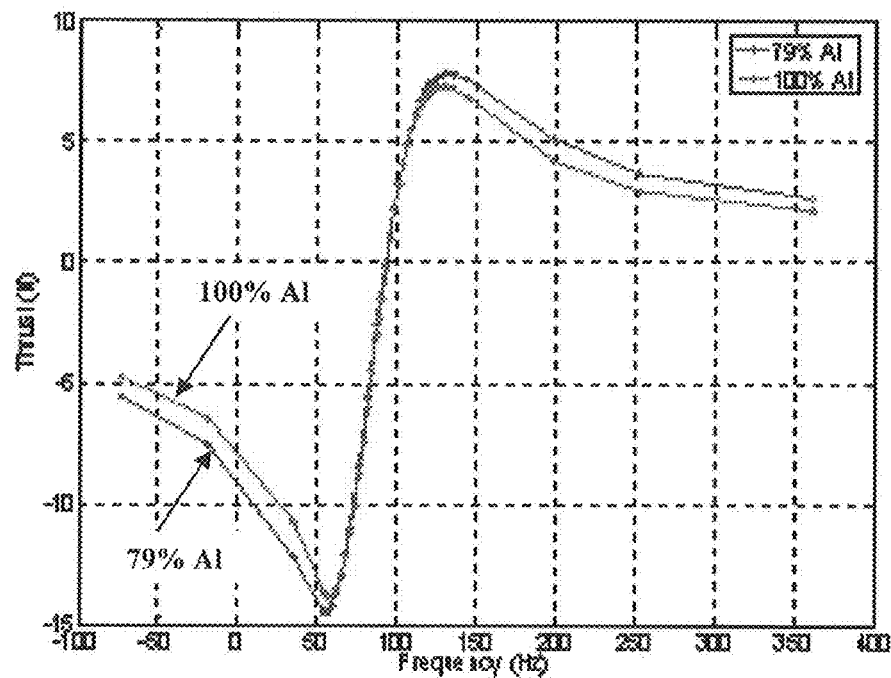
FIGS. 9A and 9B is a plot of the thrust variations with excitation frequency for two secondary electric conductivity values and a plot of the normal force variations with excitation frequency for two secondary electric conductivity values, respectively.
Figure 9B:
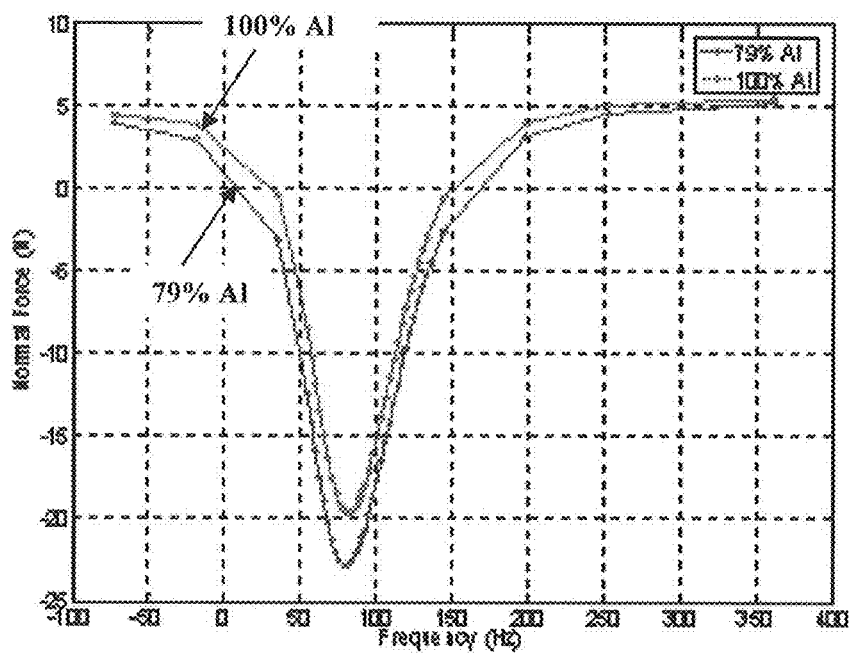

Due to the existence of heating effect of secondary reaction plate, the electric conductivity of aluminium plate will change. For example, a 20% discrepancy of the electric conductivity will result in the real electric conductivity being 31000000 Siemens/m. FIGS. 9A and 9B show the force variations with respect to excitation frequency when secondary electric conductivity is 39000000 Siemens/m and 31000000 Siemens/m respectively, where the pair of optimum frequencies for motoring and generating conditions remain the same. Furthermore, the control scheme 400 is verified to tolerate the secondary heating effect well.

Back EMF Characteristics

Linear induction machines comprise three operation regions, a motoring condition, a generating condition, and an electromagnetic braking condition. The motoring, generating, and electromagnetic braking conditions can achieve maximum acceleration/deceleration at a full speed region, or the highest speed region for a particular LIM system. For LIM, the thrust force can be related to the electrical input by Equations (5) and (6):

$$F_t = \frac{P_{electrical}}{V_{linear}} \quad (5)$$

$$P_{electrical} = E_a I_a \cos(\phi_a) + E_b I_b \cos(\phi_b) + E_c I_c \cos(\phi_c) \quad (6)$$

where $F_t$ is the thrust force, $P_{electrical}$ is the total electrical power, $V_{linear}$ is the linear velocity of LIM, $E_n$ (n=a, b, or c) is the magnitude of back Electromagnetic Force ("EMF"), $I_n$ is the magnitude of the phase current, and $\phi_n$ is the phase shift between back EMF and phase current. When excitation is a set of three phase balance DC sources (0 Hz), the amplitude of back EMF is very close to 0. In addition, when increasing the excitation frequency to positive or negative infinity, the amplitude of back EMF increases monotonically, which will cause a high stress on power electronic components when excitation frequency is very high, which can be overcome with a self-healing mechanism. Based on Equations (5) and (6), the phase shift between the back EMF and phase current can be plotted. The phase shift between back EMF and the phase current at 1 m/sec shows hyperbolic waveforms from −30 to 0 Hz and from 0 to 40 Hz, e.g. the first and second quadrants. The phase shift between back EMF and the phase current at 5 m/sec shows the minimum phase shift at 66.62 Hz saturates to 90 degrees in the positive infinity frequency. The LIM can work in the electromagnetic braking region in order to get the maximum braking force.

Maximum Force/Ampere Control of the Linear Induction Machine

Figure 10:
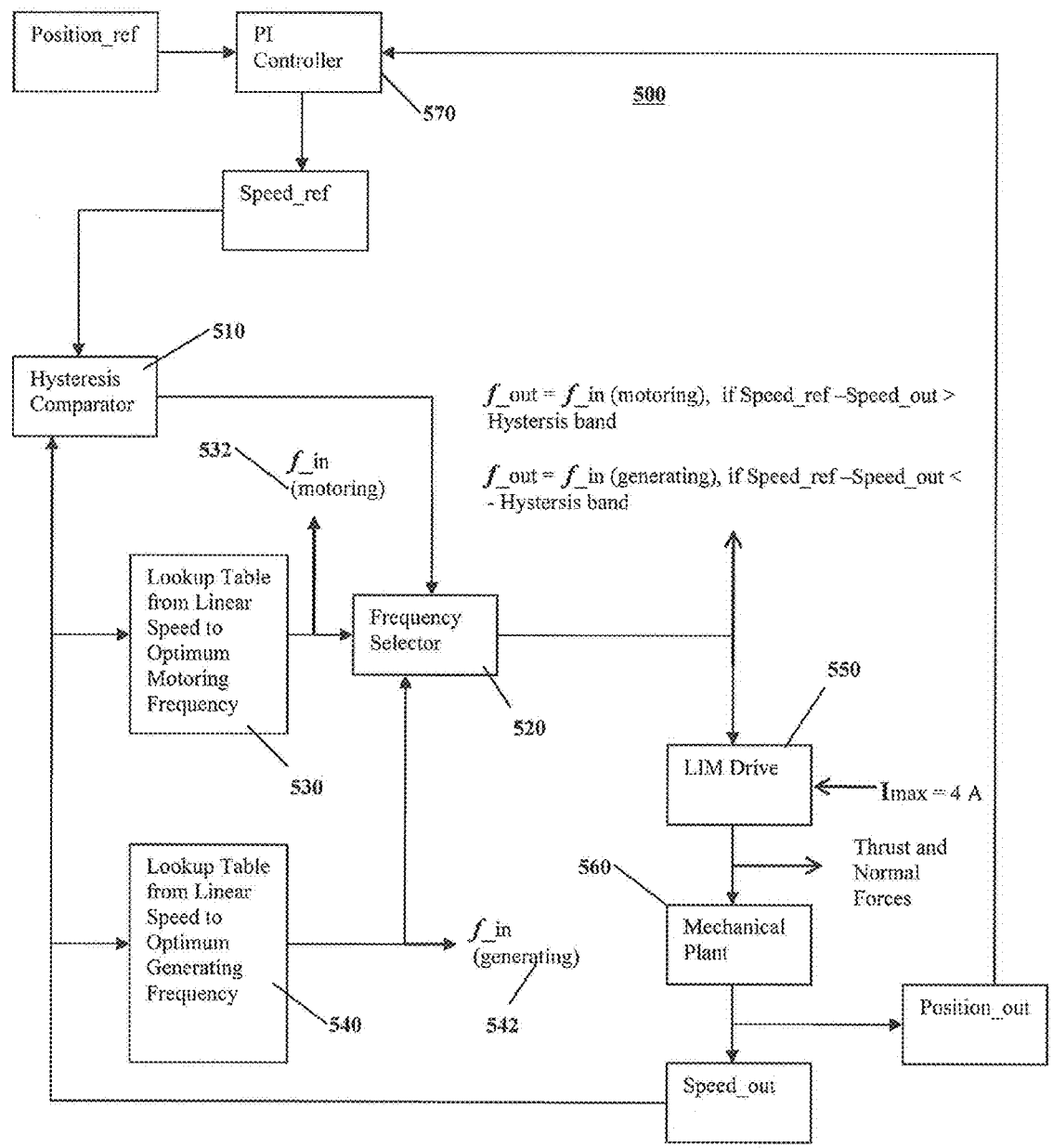
FIG. 10 is a schematic of the multilayer control scheme.

In one embodiment, a multilayer control scheme 500 is shown in FIG. 10 and comprises a position, speed, and force controls. The multilayer control scheme 500 comprises a hysteresis comparator 510, a frequency selector 520, and at least a first lookup table 530 and a second lookup table 540. The hysteresis comparator 510 is a comparator which compares a processed quantity with a quantity whose value is standard for hysteresis property, where the difference being given as the output. The hysteresis comparator 510 determines whether the machine should work as a motor 532 or as a generator 542, which is outputted to the frequency selector 520. The first and second lookup tables 530 and 540 store the optimum frequencies at discrete linear speeds. The first lookup table 530 stores the optimum frequency for motoring operations 532. The second lookup table 540 stores the optimum frequency for generating operations 542. The outputs from the lookup tables 530 and 540 will be selected based on the operation mode as the motor 532 or generator 542. The function of the frequency selector 520 comprises expressions (2) and (3) indicated previously. The thrust and normal forces of the LIM system 550 can then be coupled to a mechanical plant 560 to generate the Speed$_{out}$, which is then coupled or monitored by the hysteresis comparator 510 and Position$_{out}$ that is coupled to a PI type controller.

The outer control layer is position control. The speed reference (Speed$_{ref}$) is computed by passing the error between a position reference (Position$_{ref}$) and a predicted position through a PI type controller 570. The PI controller, or the proportional-integral controller, is a generic control loop feedback mechanism, which attempts to correct the error between a measured process variable and a desired set-point by calculating and then outputting a corrective action that can adjust the process accordingly. In one embodiment, the total mass of the LIM system is 15 kg, and the friction coefficient $\xi_{friction}$ is assumed to be 0.1, where the total mass of the LIM system determines the dominant time constant of the LIM drive system. The excitation scheme uses three phase, balanced current sources, and the phase current amplitude is kept at or below rated value of 4 A to make full use of the power rating of the LIM system. Alternative current amplitude rated values may be set according to the parameters of the LIM system. The maximum speed acceleration/deceleration that the LIM can supply during the motion can be gained. The phase currents are regulated using hysteresis control to implement and maintain sinusoidal waveforms.

Figure 11:
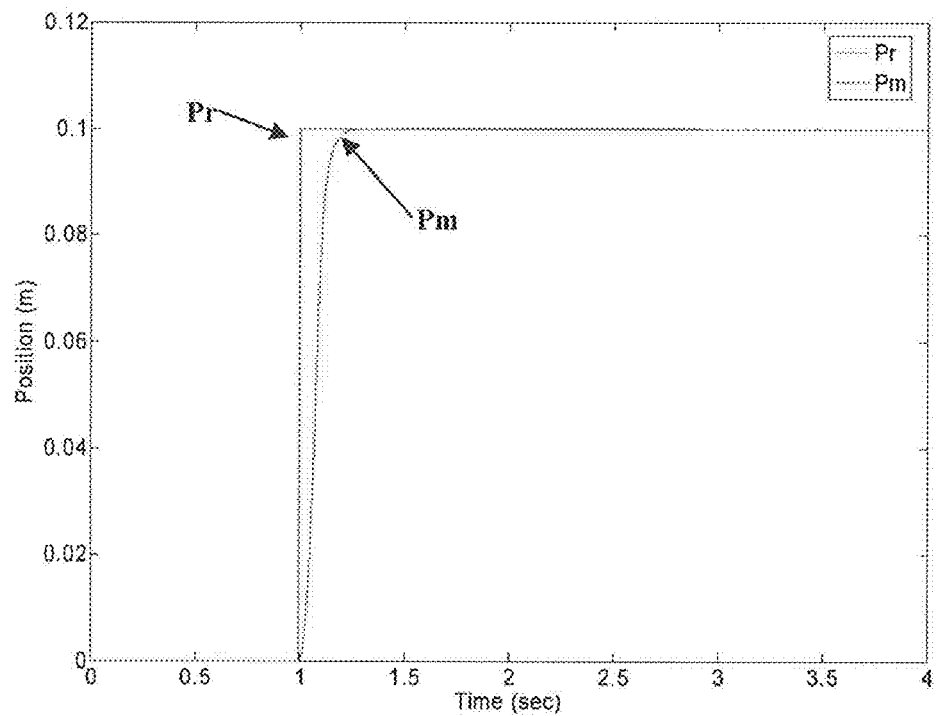
FIG. 11 is a plot of the step position response.
Figure 12:
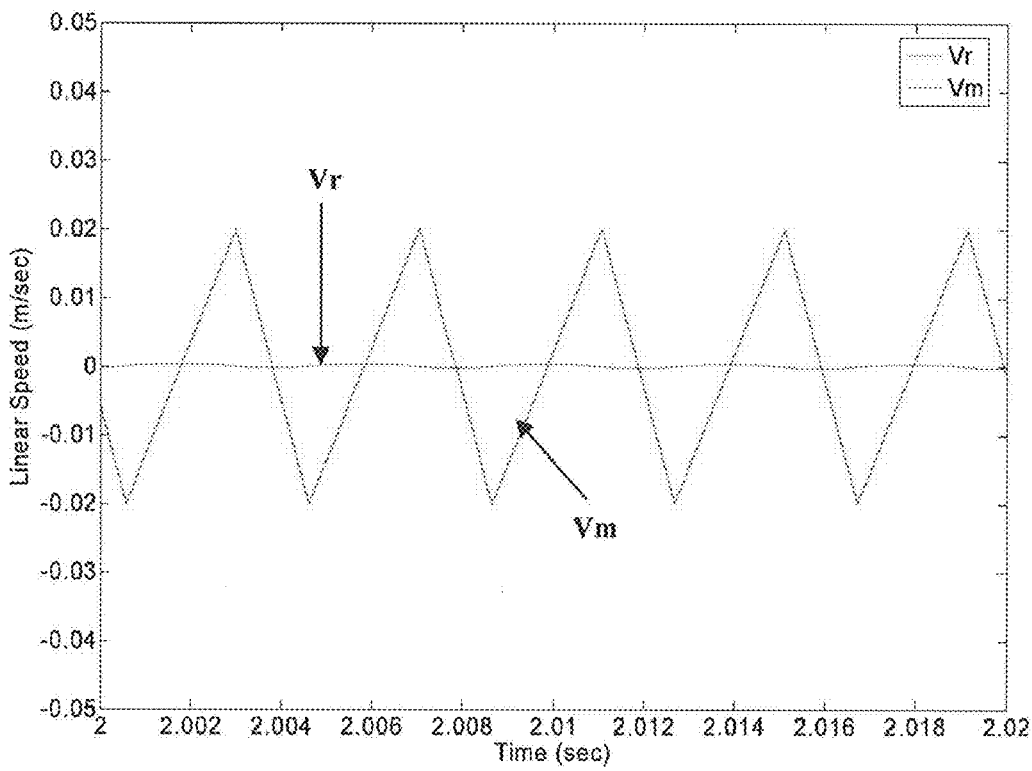
FIG. 12 is a plot of the linear speed response.
Figure 13:
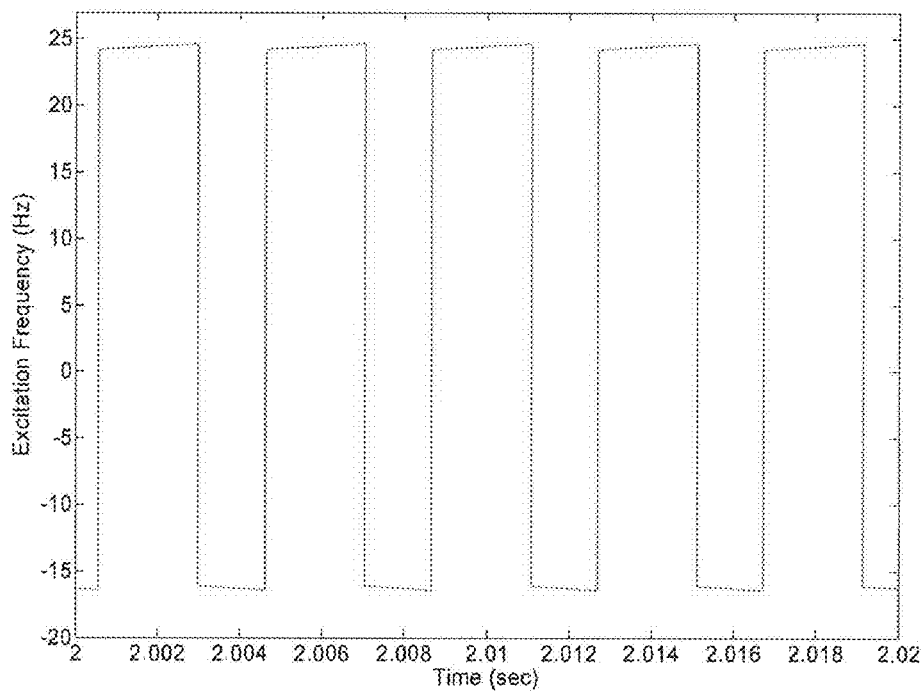
FIG. 13 is a plot of the waveform of excitation frequency.
Figure 14:
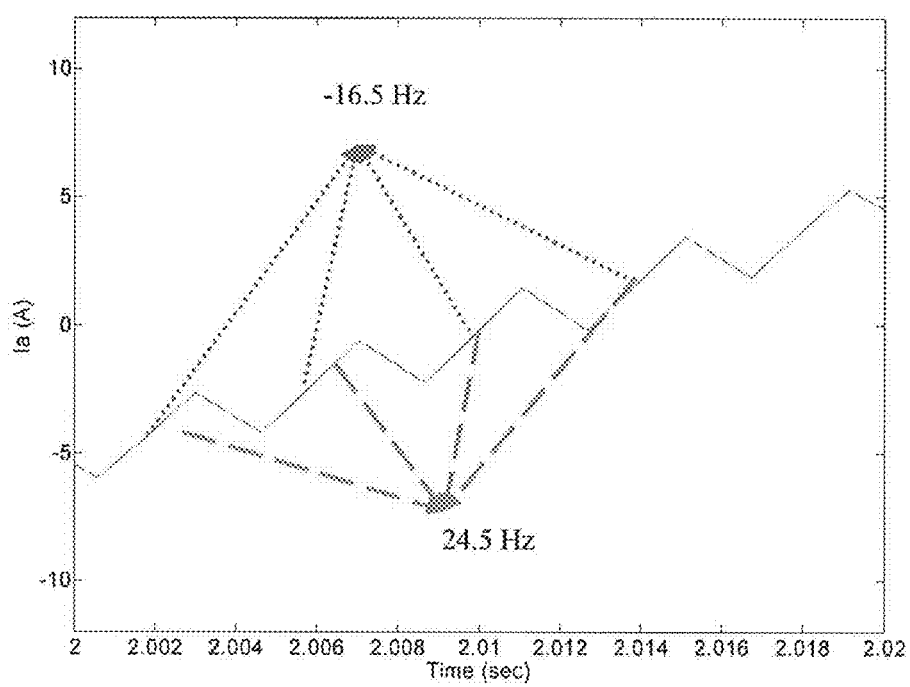
FIG. 14 is a plot of the reference of excitation current of phase a (Ia).

As shown in FIG. 11, the step position control effect shows that the response of the multilayer control scheme 500 has no overshoot for the position reference Pr compared to position predicted Pm, which is applicable to applications such as elevators and industrial assembly lines. FIG. 12 represents the response of linear speed control magnified between the 2.00 to 2.02 s region. The predicted speed Vm closely follows the reference speed Vr. FIG. 13 represents a magnified plot of the waveform of excitation frequency between 2.00 to 2.02 s, where FIG. 14 shows the magnified plot of the reference of phase a current. Depending on the operation modes, the linear motor drive selects the correct excitation frequency (−16.5 Hz or 24.5 Hz) to produce the corresponding electromagnetic forces.

Figure 15:
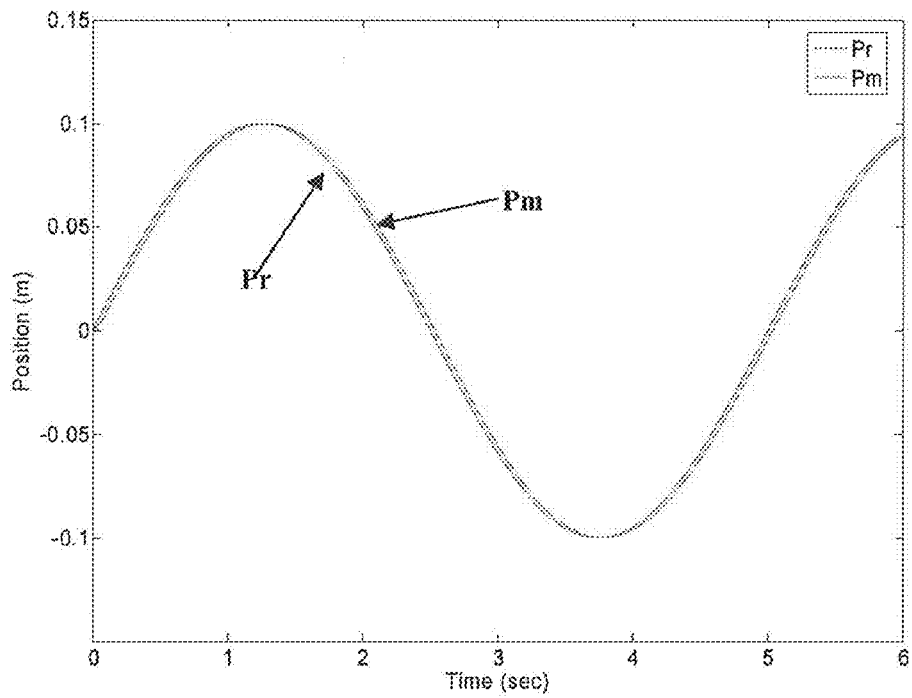
FIG. 15 is a plot of the sinusoidal position response.
Figure 16:
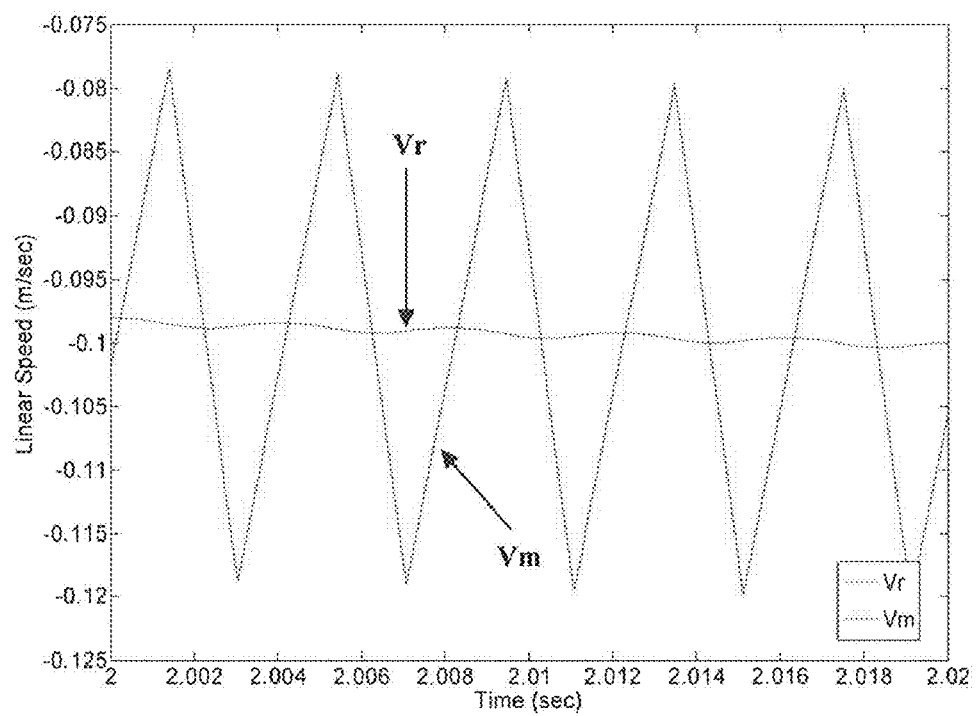
FIG. 16 is a plot of the linear speed response.
Figure 17:
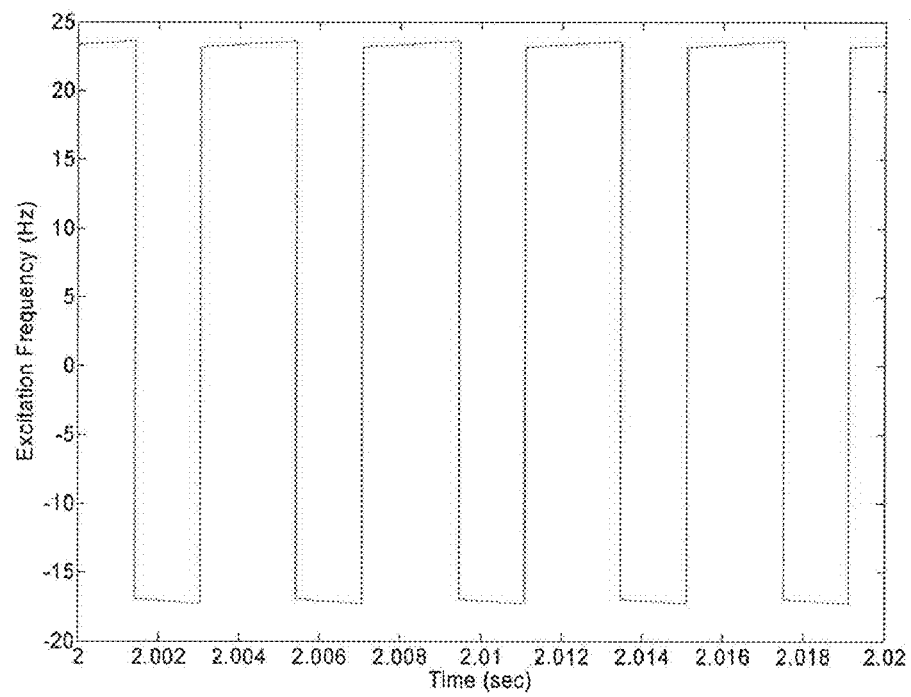
FIG. 17 is a plot of a waveform of excitation frequency.
Figure 18:
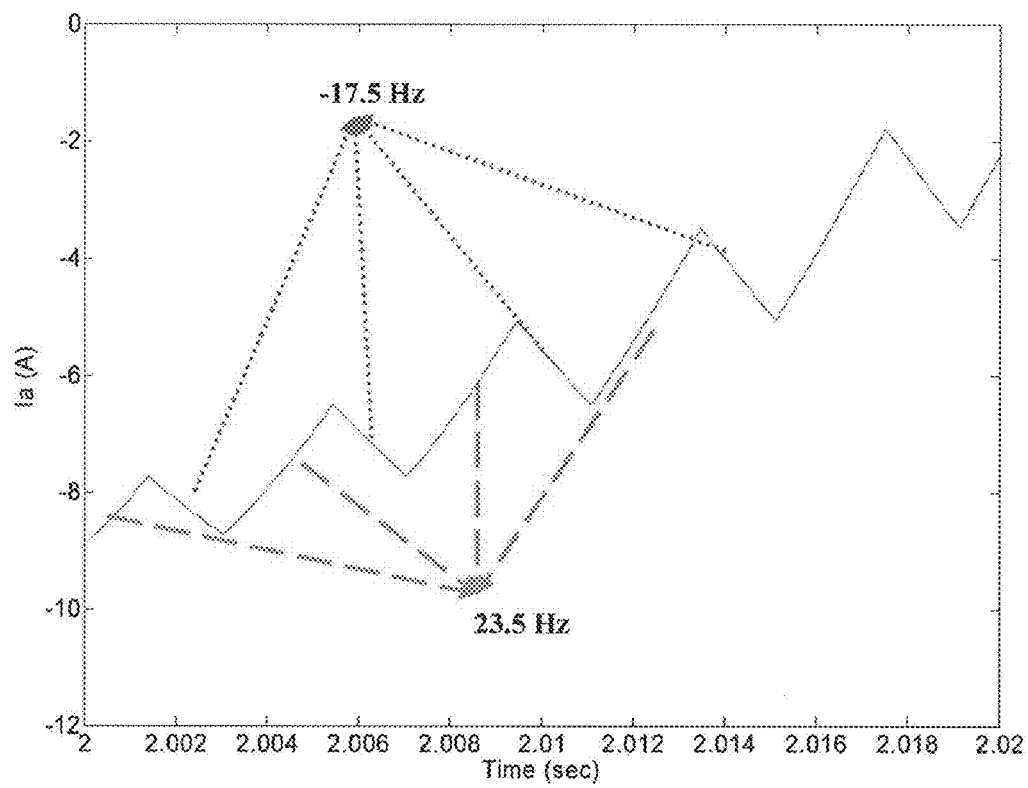
FIG. 18 is a plot of the excitation current of phase a (Ia).

FIG. 15 represents the response of the sinusoidal position reference Pr, where the response of the position measure Pm quickly tracks the position reference. FIG. 16 is the control effect of linear speed from 2.00 to 2.02 s, where the predicted speed Vm closely follows the reference speed Vr. FIGS. 17 and 18 illustrate the waveforms of excitation frequency and reference of phase a current, respectively. Depending on the operation modes, the linear motor drive selects the correct excitation frequency (−17.5 Hz or 23.5 Hz) to produce the corresponding electromagnetic forces under the sinusoidal position response. Based on the LIM performance under each linear speed range, the closed-loop control scheme in the LIM system includes a step position response and a sinusoidal position response for the multilayer control scheme 500.

Figure 2B:
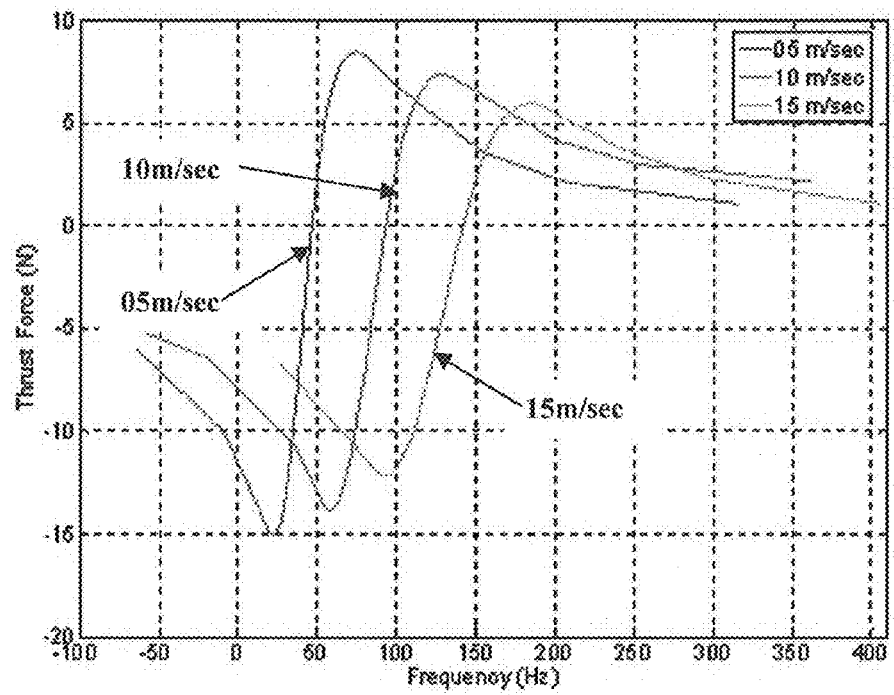
FIG. 2B is a plot that depicts average thrust force variation with frequency at different linear speeds.
Figure 2C:
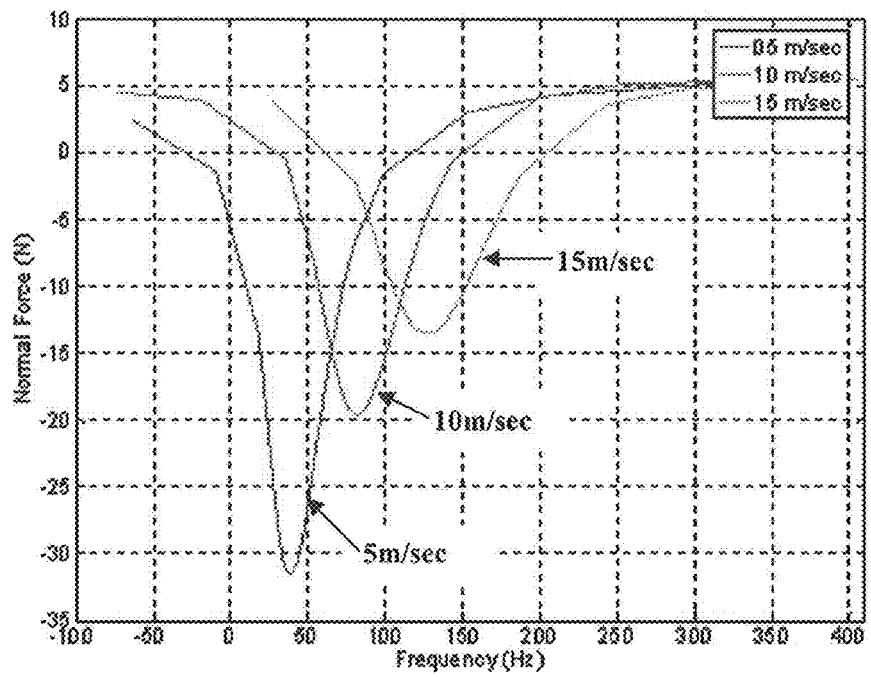
FIG. 2C depicts average normal force variation with frequency at different linear speeds.

In another embodiment, the relationship between the average thrust and normal forces with the linear speed and excitation frequency using FEA is shown in FIGS. 2B and 2C. The LIM system 200 in FEA is a single sided, 4-pole LIM with an overall stroke of 1524 mm, as shown in FIG. 5A, with detailed operating information as given in Table 1. Primary excitation is formed by three phase balanced current sources, where the phase current amplitude is 2 A, in one embodiment. In one embodiment, the linear speed is kept at 5 m/sec, 10 m/sec, and 15 m/sec to represent various ranges of linear speeds.

TABLE 2 provides representative information regarding linear speed increases from 5 m/sec to 15 m/sec. The absolute drop and magnitude of a peak normal force are significantly bigger than values of peak thrust forces. Consequently, the normal force and the friction of the bearings, appears more sensitive to the linear speed than the thrust force.

TABLE 2

| Linear Speed (m/sec) | Peak Motoring Thrust Force (N) | Peak Breaking Thrust Force (N) | Peak Normal Force (N) |
|---|---|---|---|
| 5 | 8.45 | 15.03 | 31.55 |
| 10 | 7.325 | 13.85 | 19.60 |
| 15 | 5.934 | 12.142 | 13.49 |

Figure 19A:
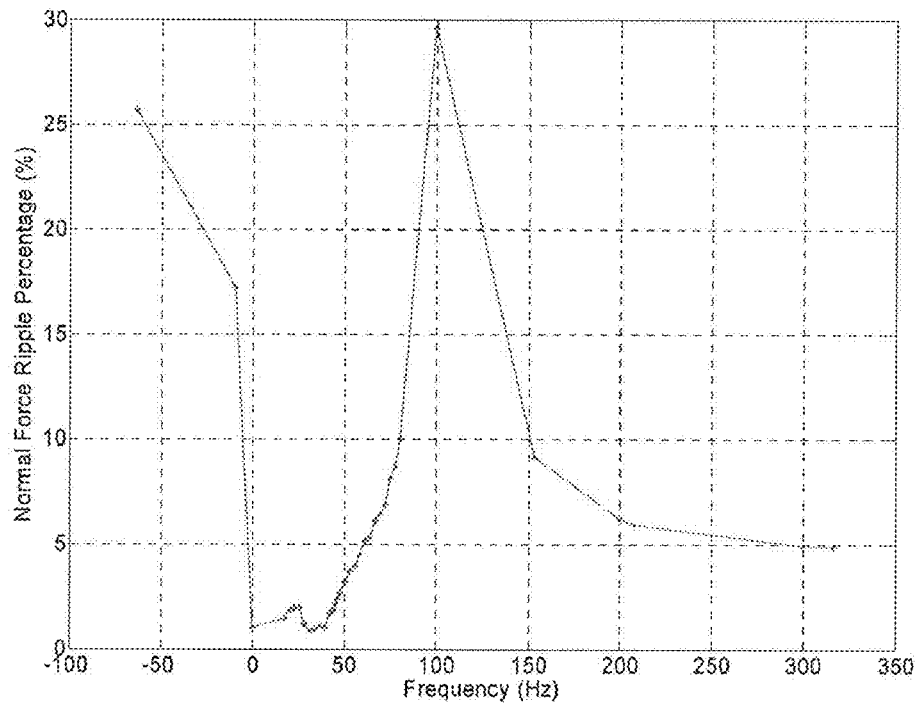
FIG. 19A is a plot of the normal force ripple percentage with respect to frequency at linear speed 5 m/sec.
Figure 19B:
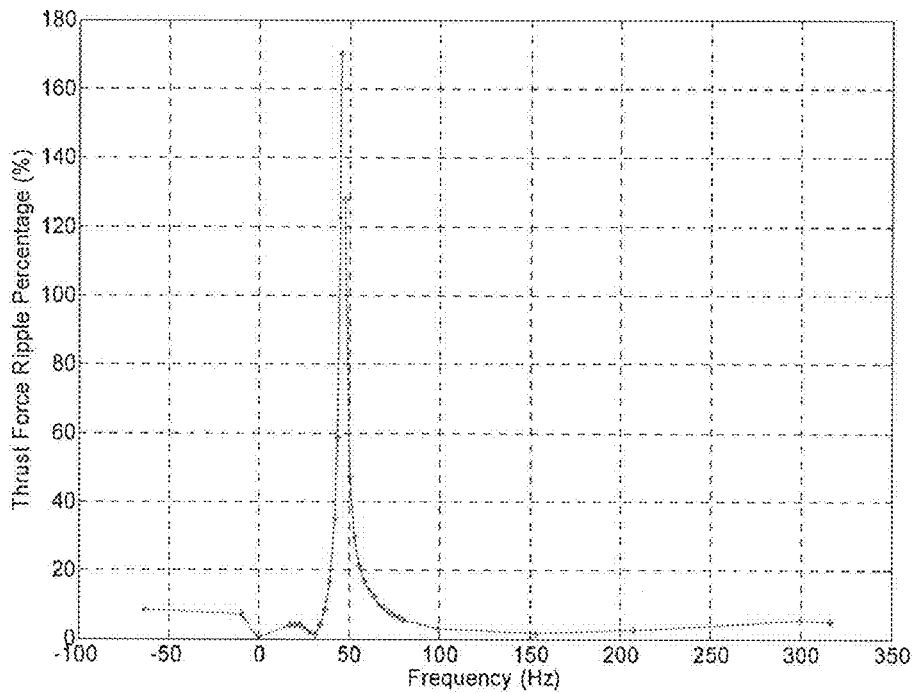
FIG. 19B is a plot of the thrust force ripple percentage with respect to frequency at linear speed 5 m/sec.

In FIGS. 19A and 19B, the normal and thrust force ripple percentages with respect to the frequency at linear speed of 5 m/sec are shown, respectively. The single peak in FIG. 19B is when the linear speed approaches to synchronous speed, as determined by the power supply, and the thrust force approaches zero. FIG. 19A shows two peaks, where the negative frequency peak is from the frequency approaching negative infinity or positive infinity, and the normal force changes to repulsion force from attraction force. When the normal force is zero, the normal force ripple percentage will be infinity. The second positive frequency peak in FIG. 19A is when the thrust force ripple percentage has a minimum value.

Using Equation (1), an optimum frequency for acceleration or deceleration at each linear speed may be determined. So in FIGS. 19A and 19B, the two frequencies will both produce a relatively small ripple. Under the optimum frequencies, the LIM will have maximum acceleration/deceleration, and simultaneously the force ripple percentage is in a suitable range. Using knowledge of the optimum frequencies and by the interpolation method, one or more loolup tables between linear speed and optimum frequency are readily provided to achieve maximum acceleration or deceleration.

Figure 5B:
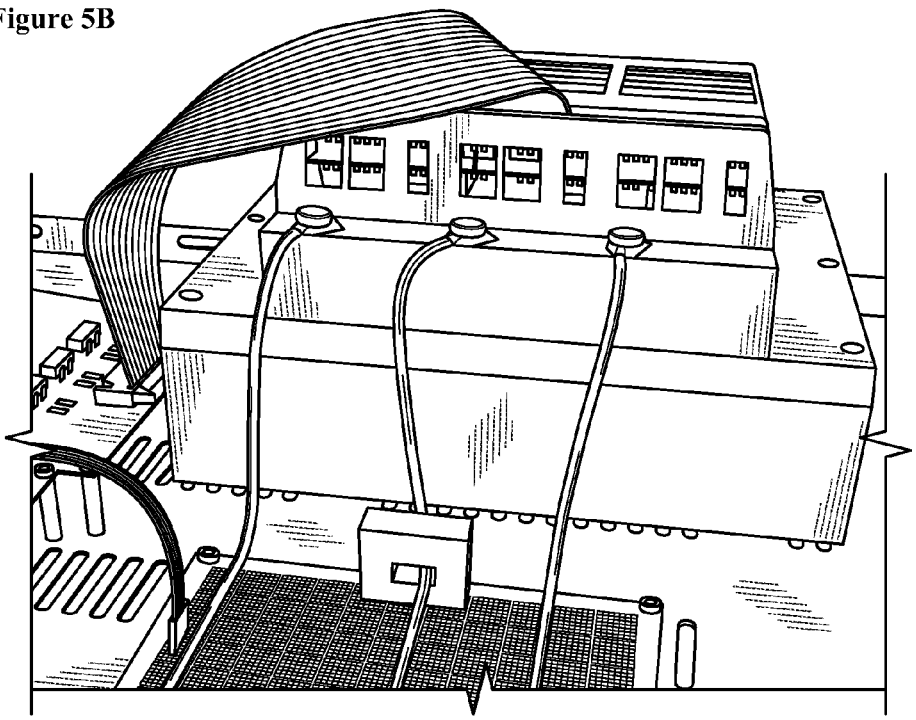
FIG. 5B three phase inverter.
Figure 5C:
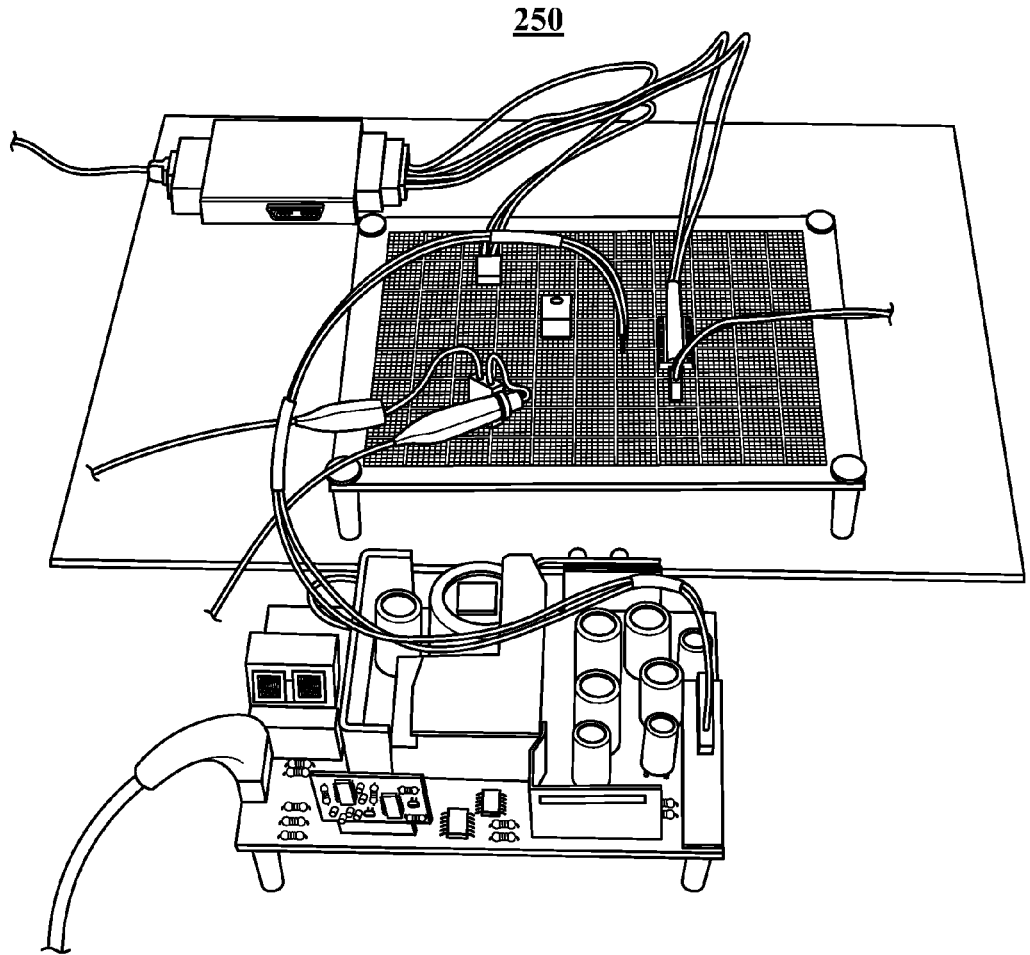
FIG. 5C is a perspective view of the interface and protection circuit of the linear position encoder.
Figure 5D:
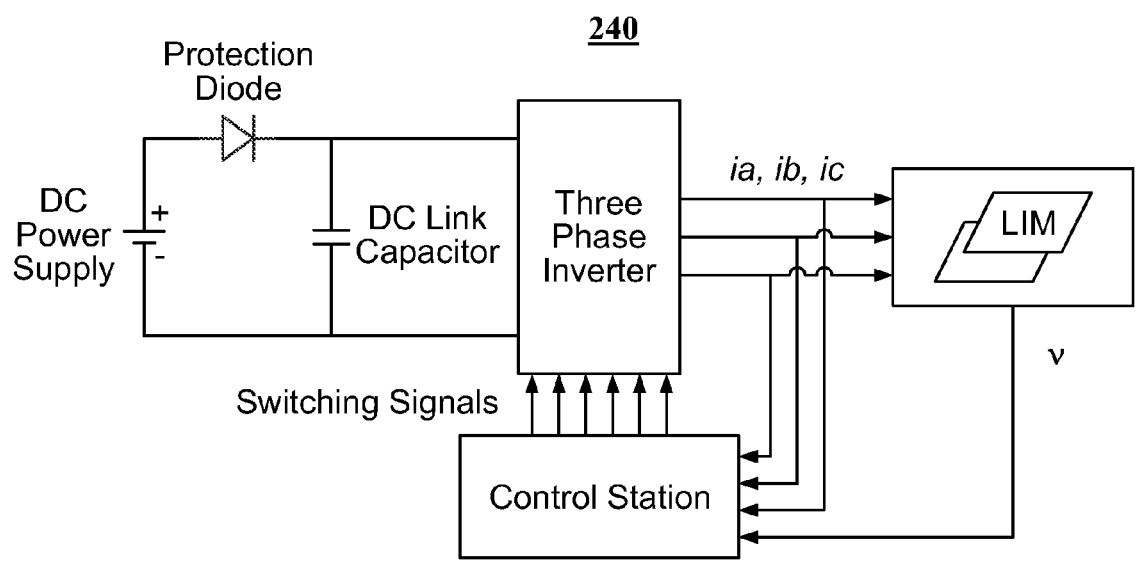
FIG. 5D is a schematic of the hardware setup for the whole LIM drive.

FIG. 7 shows a block diagram for the control scheme 400. A linear speed regulation is achieved using hysteresis control, which is shown as the hysteresis comparator 410 and frequency selector 420 in FIG. 7. The hysteresis control 410 determines how a machine should work, either as a motor 432 or a generator 442. A measured speed (Speed$_{out}$) is fed into the first or second lookup tables 430 and 440 and produces appropriate excitation frequencies for a three phase inverter 240, as shown in FIGS. 5B and 5D. FIG. 5D is a schematic of the hardware setup for the whole LIM drive, including the DC power supply coupled to a protection diode, which is used to prevent the DC power supply from absorbing current. The DC link capacitor is a power buffer for regenerative braking. The control station collects the three phase current information and linear speed value, and generates a sequence of switching signals. FIG. 5C is a perspective view of the interface and protection circuit of the linear position encoder.

In one embodiment, a total mass of an LIM system is 15 kg, and a friction coefficient $\xi_{friction}$, is about 0.1. To make full use of a power rating of a LIM system 200, an excitation scheme is implemented onto the power converter that incorporates a multiple-phase balanced current sources, and keeps phase current amplitude at or below a rated value (e.g., 4 A, 10 A, 100 A), which provides a maximum speed acceleration/deceleration that an LIM drive 200 may supply. The phase current amplitude may be kept at or below a rated value of current depending on the parameters of the LIM system in order to reduce the likelihood of the LIM system from damage. Phase currents are regulated using hysteresis control to promote desirable sinusoidal waveforms, as previously indicated.

Figure 20A:
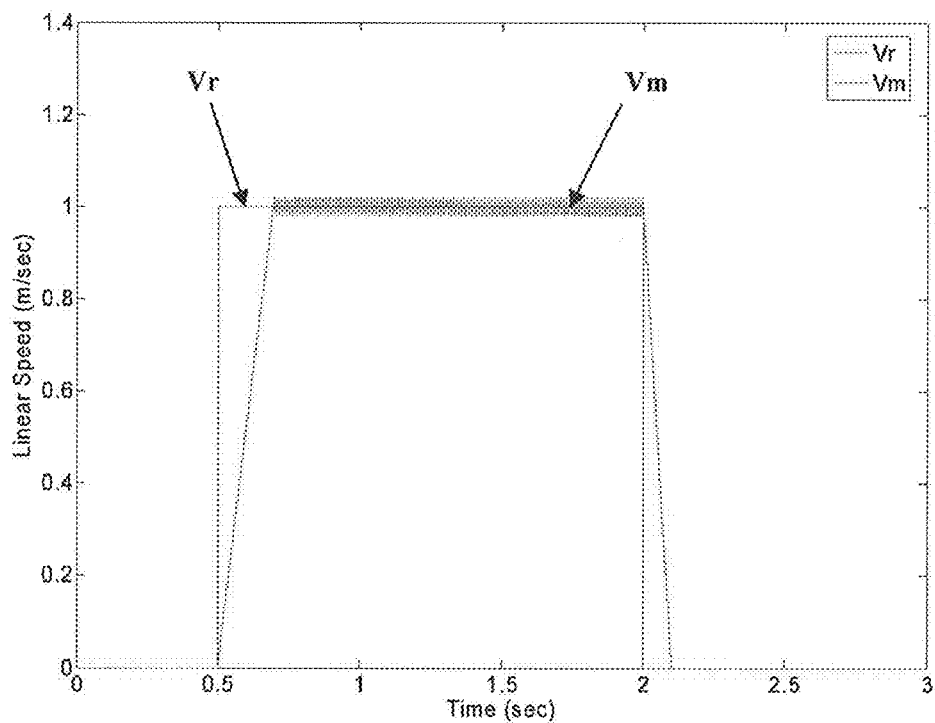
FIG. 20A is a plot of the reference speed ("Vr") and measured speed ("Vm") during a disturbance of an optimum frequency.
Figure 20B:
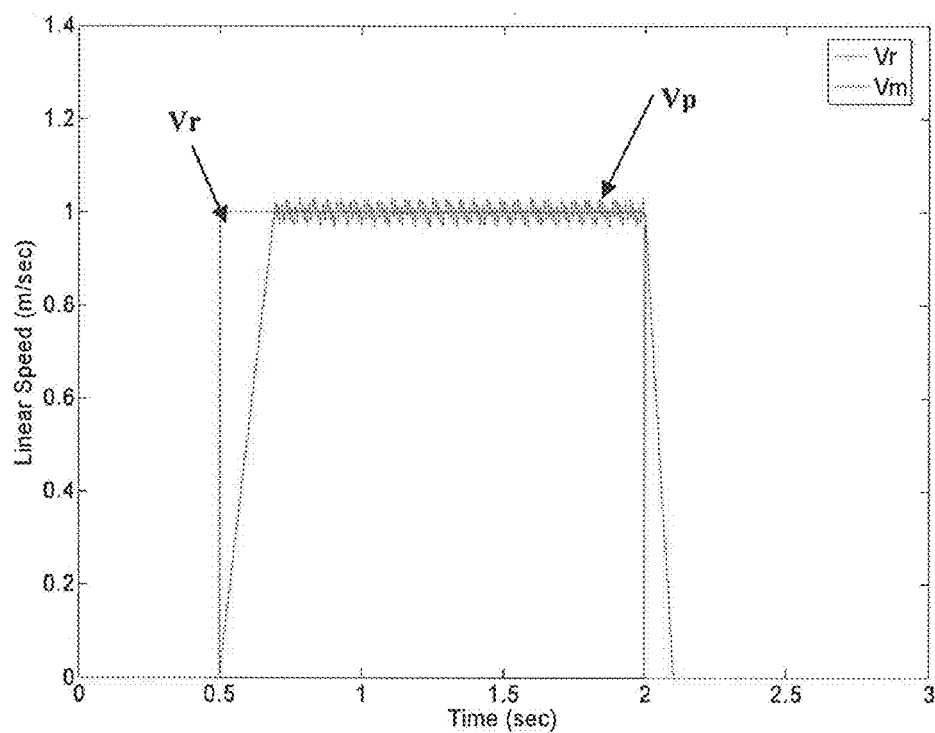
FIG. 20B is a plot of the reference speed ("Vr") and predicted speed ("Vp") during a disturbance of speed noise.
Figure 21A:
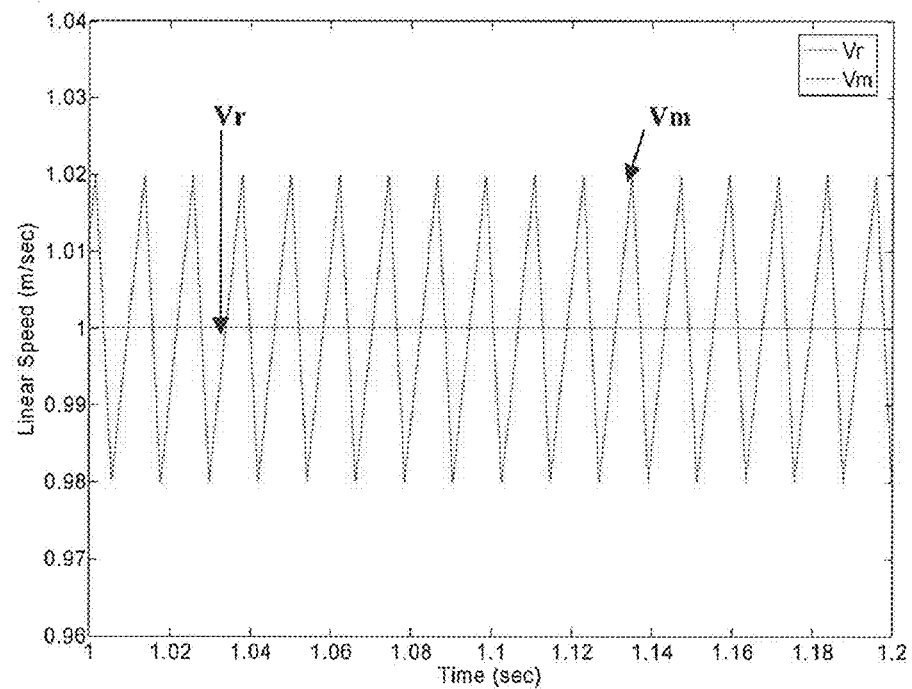
FIG. 21A is a plot of the zoomed waveform of FIG. 20A.
Figure 21B:
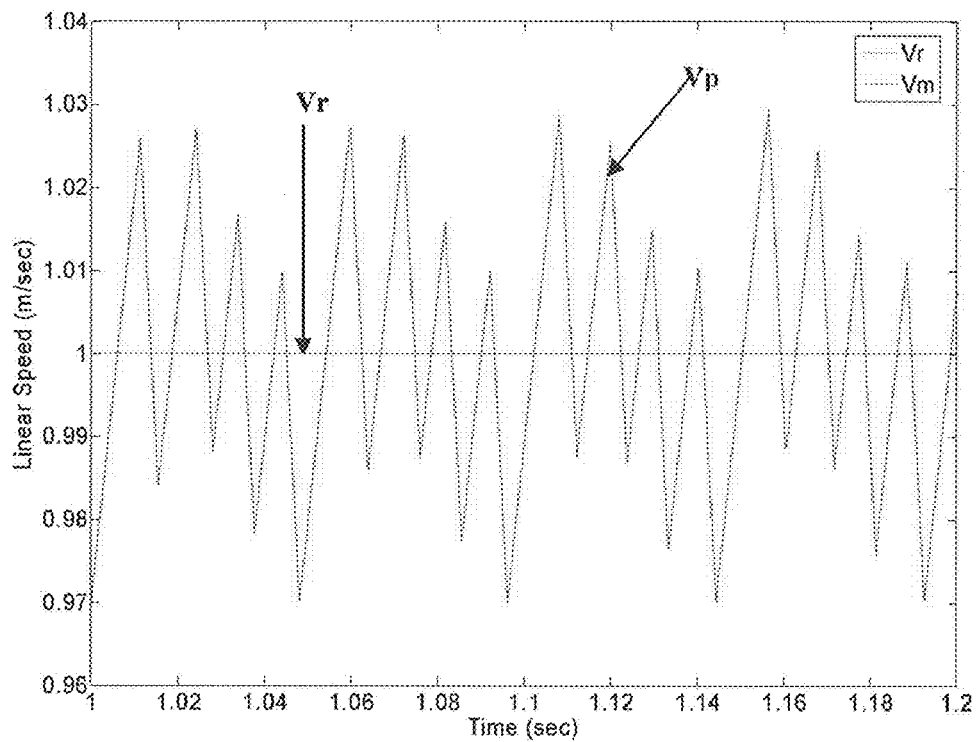
FIG. 21B is a plot of the zoomed waveform of FIG. 20B.

FIG. 20A displays the waveforms of the reference speed ("Vr") and the predicted speed ("Vm") when a noise power is 0.1 of the excitation frequency exists in the LIM system. The reference speed is one rectangular profile with a peak value at 1 m/sec, and the measured speed is somewhat trapezoidal. A response time is about 0.2 sec. FIG. 20A indicates that the control scheme 400 includes a desired tolerance to a disturbance of an optimum frequency. FIG. 20B shows a response of speed when there is noise, e.g., 1% noise in a measured speed. FIGS. 21A and 21B are magnified plots of FIGS. 20A and 20B, respectively, which show speed hysteresis control. The control scheme 400 is capable of tolerating speed noise and includes speed hysteresis control.

Figure 22A:
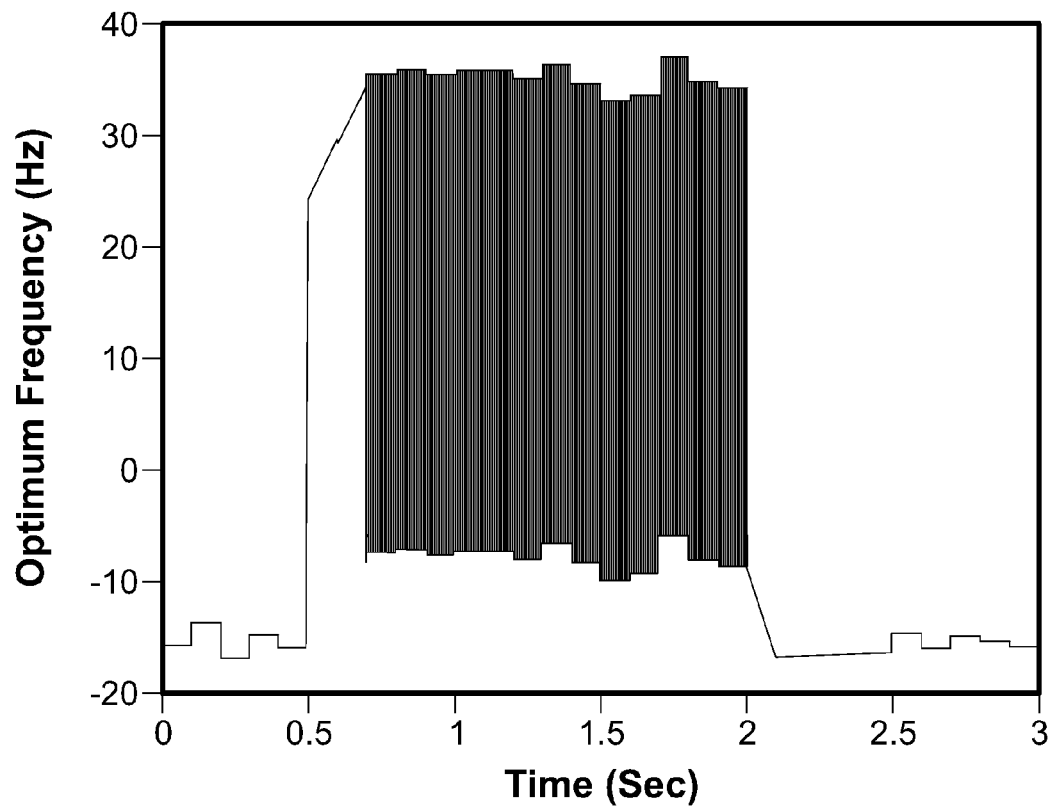
FIG. 22A is a plot of the optimum excitation frequency of the primary.
Figure 22B:
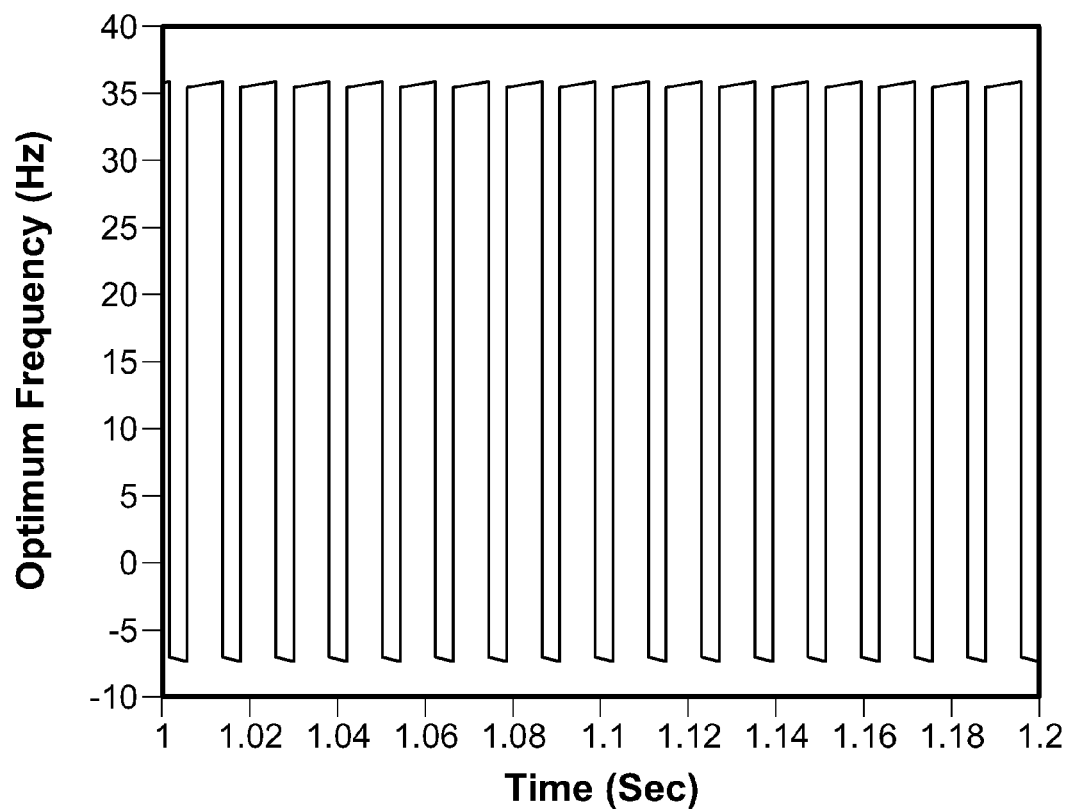
FIG. 22B is a zoomed version of FIG. 22A.
Figure 23A:
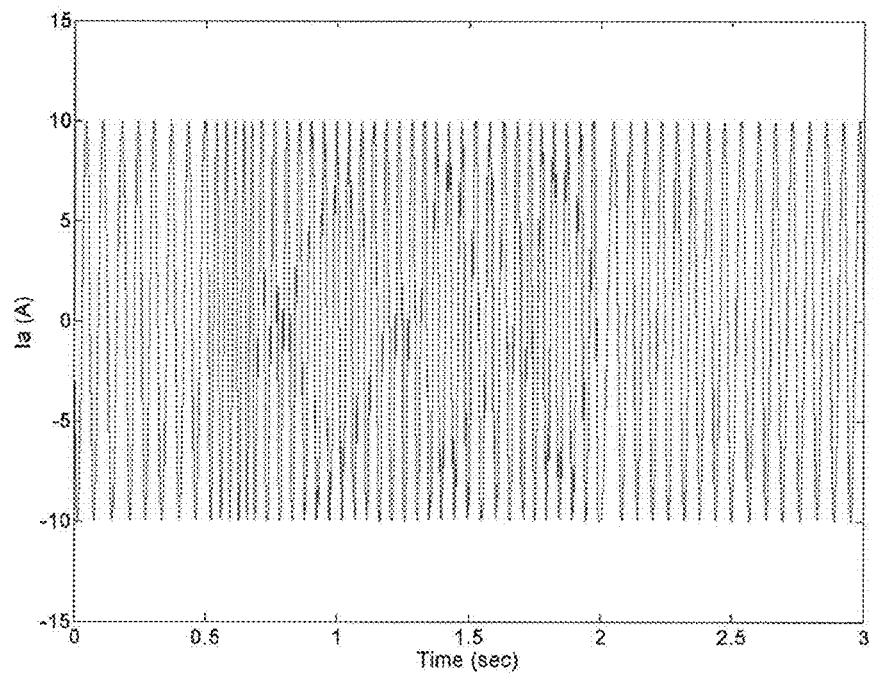
FIG. 23A is a plot of the reference of a (Ia)
Figure 23B:
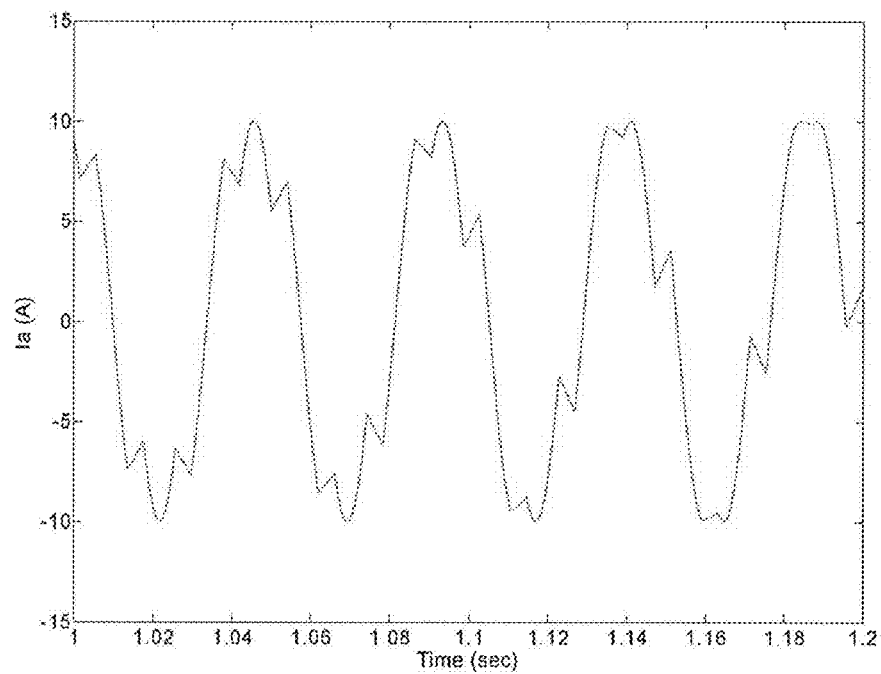
FIG. 23B is a zoomed version of reference Ia.

FIGS. 22A and 22B provide different motoring or generating conditions, respectively. As shown, the control scheme 400 selects the optimum frequency between the motoring and generating conditions. Correspondingly, FIG. 23A displays reference phase a current waveform from 0 to 3 s, and FIG. 23B displays the reference phase a current waveform from 1 to 1.2 s.

Figure 24A:
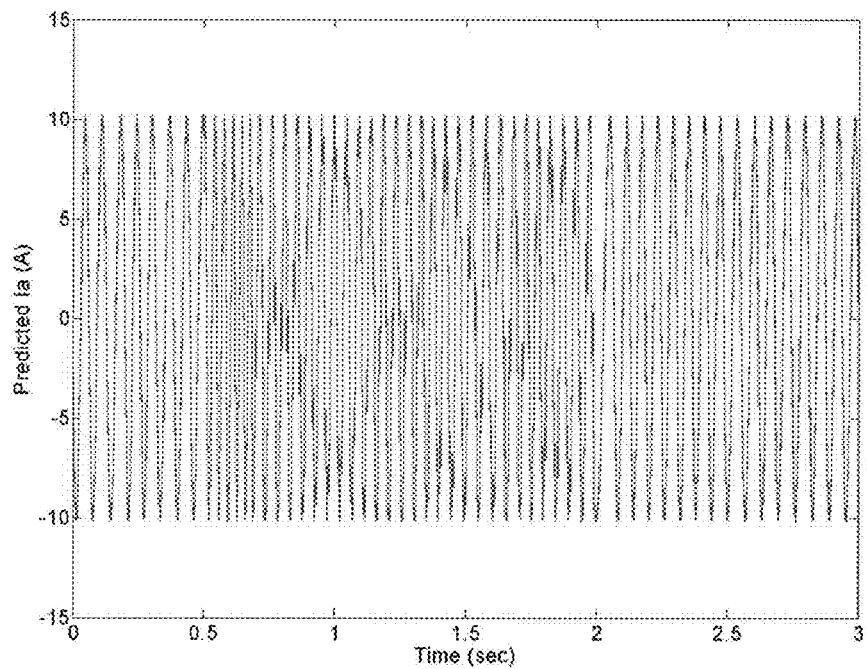
FIG. 24A is a plot of the response of excitation current of phase a (Ia)
Figure 24B:
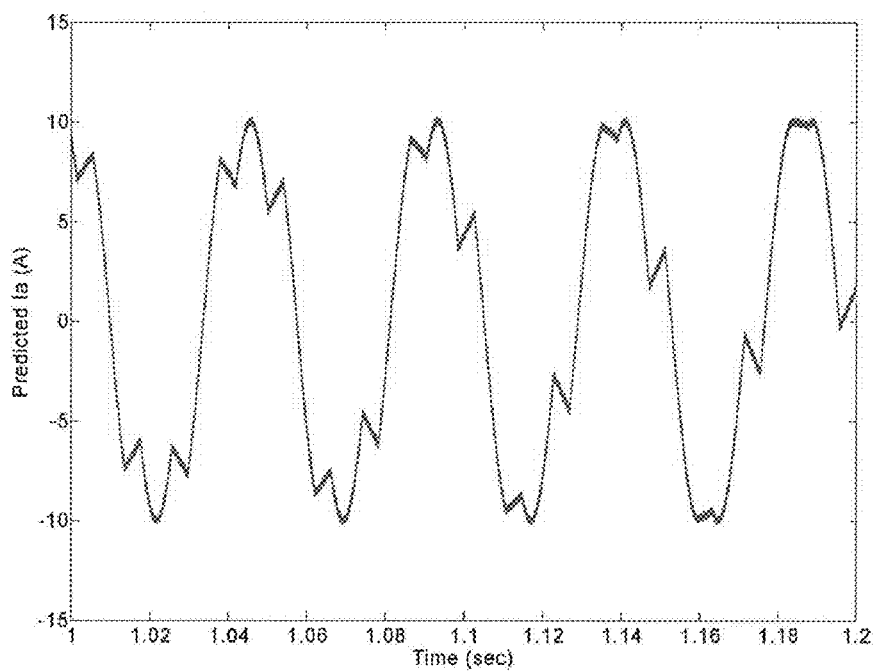
FIG. 24B is a zoomed version of FIG. 24A.

FIGS. 24A and 24B show the predicted Ia using hysteresis control. The predicted waveform follows the reference waveform closely, which indicates proper functionality of the control scheme described herein. Furthermore, from FIG. 22A, when a condition of motoring changes to a generating condition, the current waveform also changes to achieve a correct force generation.

The multilayer control scheme 500 and systems make full use of normal force when braking, which provides a deceleration speed larger than an acceleration speed. Force performance of the LIM system operates well under different speed ranges. Based on the LIM performance under each speed range, the closed-loop speed control scheme may be used. Simulation results verify that the multilayer control scheme 500 described herein is robust and operational. In one or more embodiments, the multilayer control scheme includes maximum energy conversion ratio (e.g., force/ampere) as well as including maximum acceleration/deceleration.

Field Reconstruction Method

The computational effort required to complete FEA is significant; therefore, a field reconstruction method ("FRM") is an alternative tool to evaluate electromagnetic forces and fields of LIM. FRM requires a few number of FEA evaluations to reconstruct the fields in the middle of an airgap for any set of given excitation and positions. Based on the knowledge of fields in the middle of airgap, a Maxwell Stress Tensor ("MST") method and the Force calculation by MST, the forces acting on the primary 110 can be predicted. MST is the stress tensor of an electromagnetic field.

Figure 25:
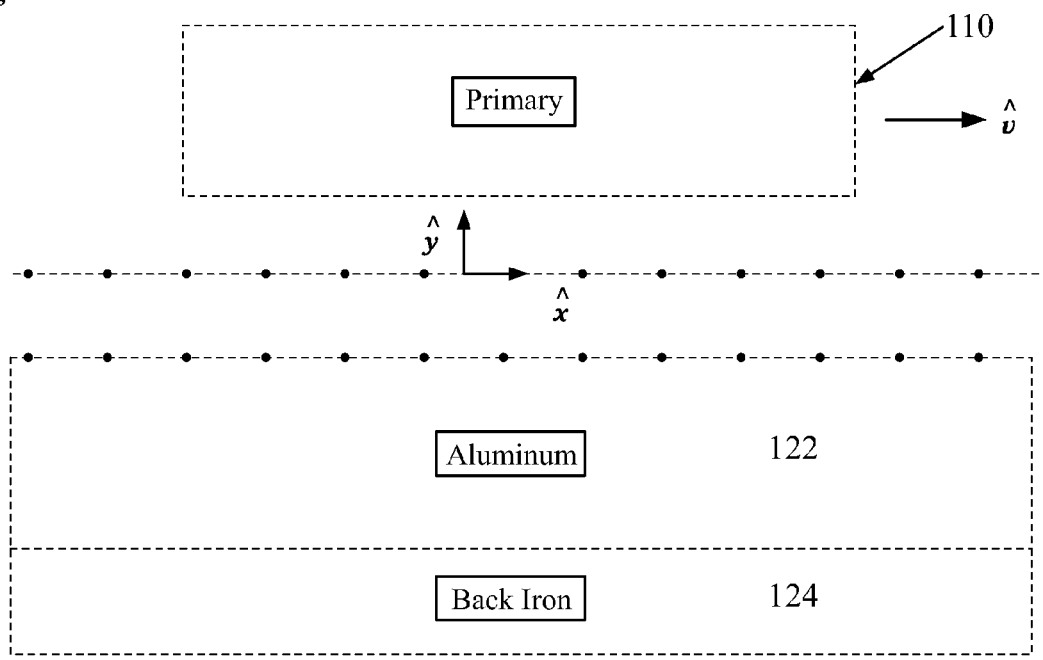
FIG. 25 is a cross-sectional view of a schematic for the positive directions of Normal and Tangential Components in the LIM.

Using MST, the tangential and normal force densities in the middle of airgap can be expressed as Equation (7) and (8):

$$f_x = \frac{1}{\mu_o} B_x y_y \tag{7}$$

$$f_y = \frac{1}{2\mu_o}(B_y^2 - B_x^2) \tag{8}$$

where $B_x$ and $B_y$ are the tangential and normal components of the flux densities in the middle of airgap of the machine; $\mu_0$ is the permeability of the air; and $f_x$ and $f_y$ are the tangential and normal force densities in the airgap. The positive directions of normal and tangential components are defined in FIG. 25.

Therefore, the thrust and normal force can be expressed by Equations (9) and (10)

$$F_t = z \int_l f_x dl \tag{9}$$

$$F_n = z \int_l f_y dl \tag{10}$$

where z is the stack length of LIM, $F_n$ is the normal force.

The following assumptions have been made for the investigation of FRM. The flux density in the axial direction is zero, which means no end effect is included. The machine is not saturated, such that the superposition can be applicable. Hysteresis and eddy currents in the primary and secondary back iron are neglected. The operating temperature is assumed to be constant. The heating effect to machine parameters can be neglected. Furthermore, the primary teeth are assumed to be rigid.

Basis Function Identification

Based on the assumption of no saturation, the normal and tangential components of flux density in the middle of airgap can be expressed by the sum of primary and secondary quantities.

$$B_x = B_{xs} + B_{xr} \tag{11}$$

$$B_y = B_{ys} + B_{yr} \tag{12}$$

where $B_{xs}$ and $B_{xr}$ are tangential flux densities of primary and secondary respectively, and $B_{ys}$ and $B_{yr}$ are normal flux densities of primary and secondary respectively. These four quantities are also defined as "Basis Function".

Primary Basis Function Derivation

Figure 26A:
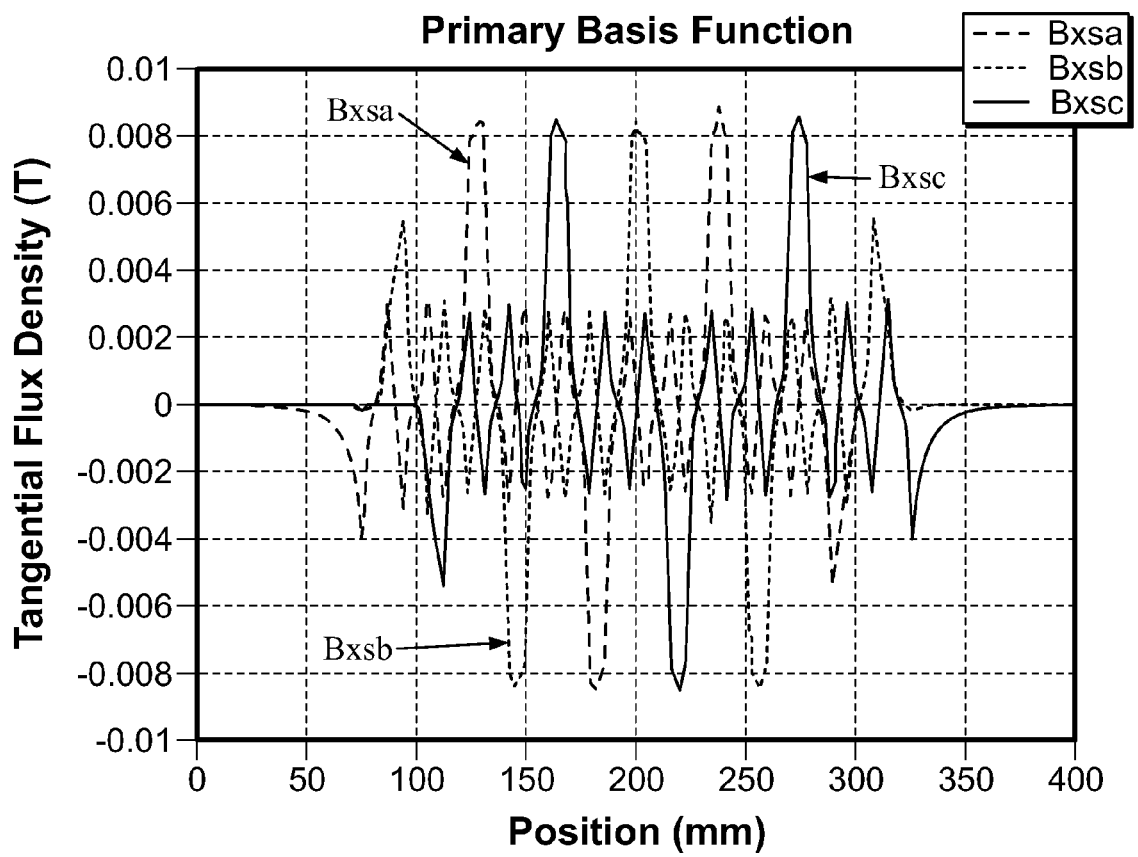
FIG. 26A is a plot of the tangential basis functions of the three phases a, b, and c.
Figure 26B:
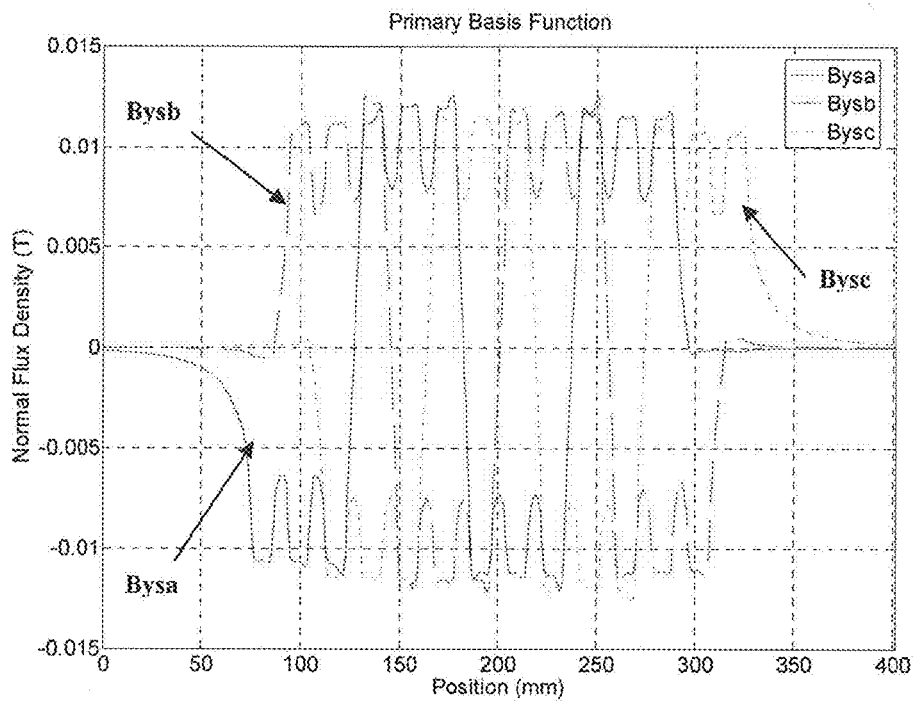
FIG. 26B is the normal basis functions of the three phases a, b, and c.

At the first step, a static FEA evaluation is used to derive the primary basis function of phase a. In the FEA program, the primary is fixed in the middle of the secondary railway to eliminate the railway asymmetry effect on the primary basis function. The length of the secondary railway is assumed to be infinity. In addition, phase a current $i_a$ is set with 1 A of DC current, and phases b and c are open. The normal and tangential flux densities are calculated and stored as basis functions $B_{xsa}$ and $B_{ysa}$ respectively. In order to store the basis functions, the infinite railway of the secondary is truncated into an effective and finite length. Furthermore, the effective airgap is discretized into equally distributed points. Hence, $B_{xsa}$ and $B_{ysa}$ are represented as two n by 1 vectors in the computer. Because of the magnetic asymmetry effects of the primary, in order to calculate the basis functions of phases b and c, the same procedure for phase a has to be repeated in phase b and c, respectively. FIGS. 26A and 26B illustrate the basis functions of the normal and tangential flux densities, respectively.

Using these basis functions, the flux density contributed by the primary with arbitrary three phase currents can be expressed as Equations (13) and (14):

$$B_{xs}(l) = i_a B_{xsa}(l) + i_b B_{xsb}(l) + i_c B_{xsc}(l) \quad (13)$$

$$B_{ys}(l) = i_a B_{ysa}(l) + i_b B_{ysb}(l) + i_c B_{ysc}(l) \quad (14)$$

where l is the position information on the effective airgap.

Secondary Basis Function Derivation

Unlike $B_{xs}$ and $B_{ys}$, $B_{xr}$ and $B_{yr}$ are not only determined by the instantaneous primary current, they are also subject to the change of the primary current. $B_{xr}$ and $B_{yr}$ are generated by a secondary eddy current, which results from the primary current and the primary motion. However, the electromagnetic forces are only determined by the slip frequency $\omega_{slip}$, which can be expressed as Equation (15):

$$\omega_{slip} = \omega_e - \frac{P}{2}\omega_r \quad (15)$$

where $\omega_{slip}$ is the combined result of the electrical and mechanical systems.

In the procedure of FRM for LIM, for a given excitation frequency and linear speed, the electrical angular frequency corresponding to the linear speed is subtracted from the excitation frequency, and the result is the slip frequency. In order to identify secondary basis functions, the primary speed is set at v=0. Using a transient FEA evaluation, an impulse current is used as phase a current input signal. The impulse input has a value of 1 A at $t_0$, and 0 elsewhere. A sequence of normal and tangential flux densities for t≧$t_0$ is then recorded. Using the previously established primary basis functions, the flux densities generated by secondary eddy current can be represented as Equations (16) and (17):

$$B_{xra} = B_{xim} - B_{xsa} \quad (16)$$

$$B_{yra} = B_{yim} - B_{ysa} \quad (17)$$

where $B_{xim}$ and $B_{yim}$ are the recorded values of flux densities due to the impulse current input, and $B_{xra}$ and $B_{yra}$ are the secondary basis functions of phase a. Using the same procedure, the secondary basis functions of phase b and c can also be identified. Furthermore, all secondary basis functions are in the format of matrices. The rows of the matrices represent the n points along the effective airgap; the columns of matrices describe the impulse response of these points in the time domain. Therefore, the normal and tangential flux densities due to the secondary eddy current can be summarized as following Equations (18) and (19):

$$B_{xr}(l,t) = i_a(t)*B_{xra}(l,t) + i_b(t)*B_{xrb}(l,t) + i_c(t)*B_{xrc}(l,t) \quad (18)$$

$$B_{yr}(l,t) = i_a(t)*B_{yra}(l,t) + i_b(t)*B_{yrb}(l,t) + i_c(t)*B_{yrc}(l,t) \quad (19)$$

where '*' denotes the operation of convolution.

Figure 27:
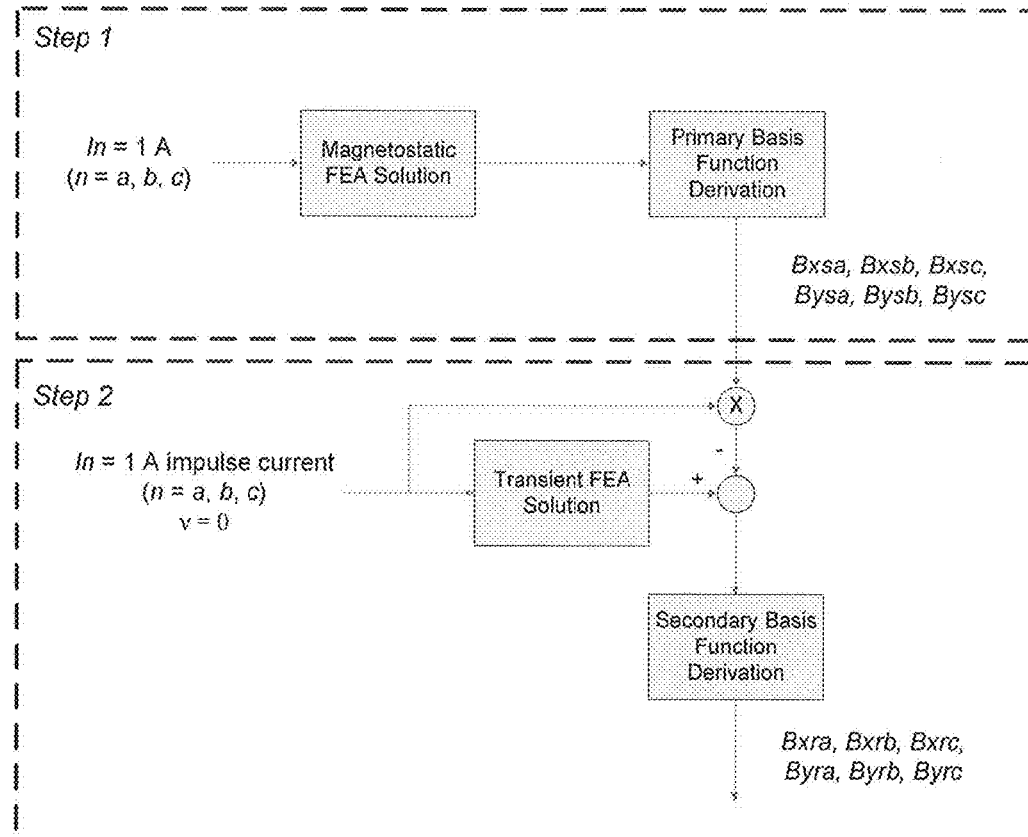
FIG. 27 is a schematic of the two step procedure of basis function identification.

The two step procedure of basis function identification is shown in FIG. 27.

Field Reconstruction

Once all basis functions have been identified, the total tangential and normal flux densities $B_x$ and $B_y$ in the middle of airgap due to the arbitrary primary excitation current can be obtained as:

$$B_x(l, t) = i_a(t)B_{xsa}(l) + i_b(t)B_{xsb}(l) + i_c(t)B_{xsc}(l) + \\ i_a(t)*B_{xra}(l, t) + i_b(t)*B_{xrb}(l, t) + i_c(t)*B_{xrc}(l, t) \quad (20)$$

$$B_y(l, t) = i_a(t)B_{ysa}(l) + i_b(t)B_{ysb}(l) + i_c(t)B_{ysc}(l) + \\ i_a(t)*B_{yra}(l, t) + i_b(t)*B_{yrb}(l, t) + i_c(t)*B_{yrc}(l, t) \quad (21)$$

Since the secondary basis functions are in the discrete time domain, the operation of convolution in Equation (20) and (21) will be conducted in discrete time domain.

$$B_x(l, t_k) = i_a(t_k)B_{xsa}(l) + i_b(t_k)B_{xsb}(l) + i_c(t_k)B_{xsc}(l) + \\ \sum_{m=1}^{k} i_a(t_m)B_{xra}(l, t_k - t_m) + \sum_{m=1}^{k} i_b(t_m)B_{xrb}(l, t_k - t_m) + \\ \sum_{m=1}^{k} i_c(t_m)B_{xrc}(l, t_k - t_m) \quad (22)$$

$$B_y(l, t_k) = i_a(t_k)B_{ysa}(l) + i_b(t_k)B_{ysb}(l) + i_c(t_k)B_{ysc}(l) + \\ \sum_{m=1}^{k} i_a(t_m)B_{yra}(l, t_k - t_m) + \sum_{m=1}^{k} i_b(t_m)B_{yrb}(l, t_k - t_m) + \\ \sum_{m=1}^{k} i_c(t_m)B_{yrc}(l, t_k - t_m) \quad (23)$$

Figure 28:
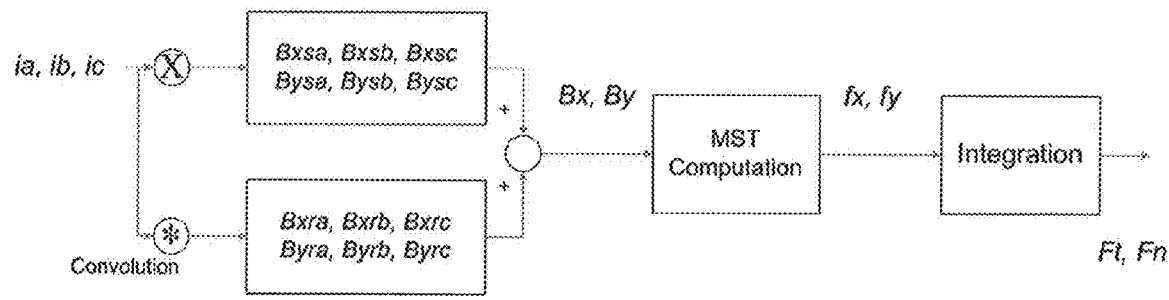
FIG. 28 is a schematic of the Field Reconstruction Procedure.

Finally, using MST, the force densities and then electromagnetic forces can be computed. The procedure is shown in FIG. 28.

Verification of Field Reconstruction

Figure 29A:
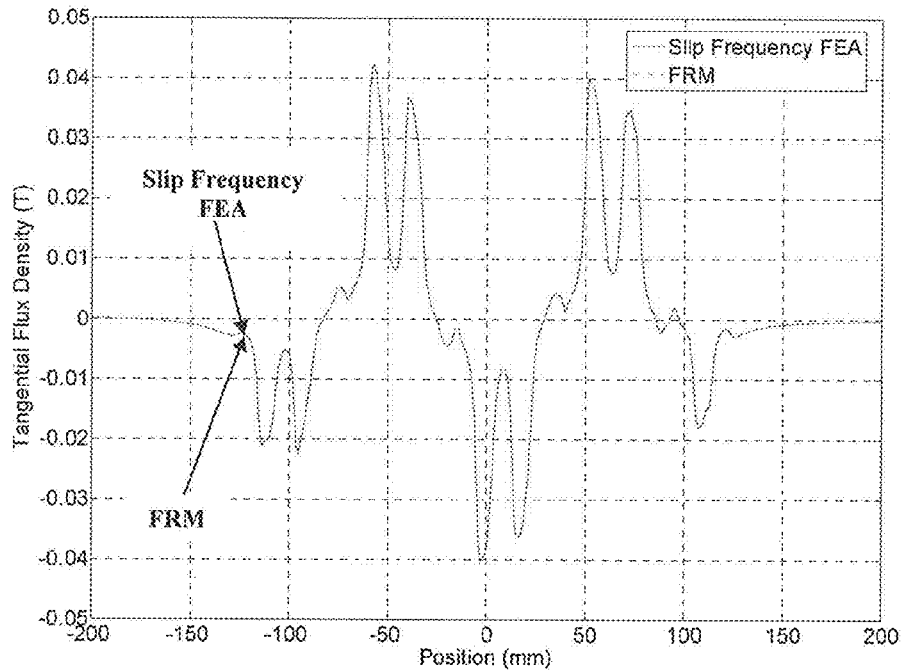
FIG. 29A is a plot of the tangential flux density.
Figure 29B:
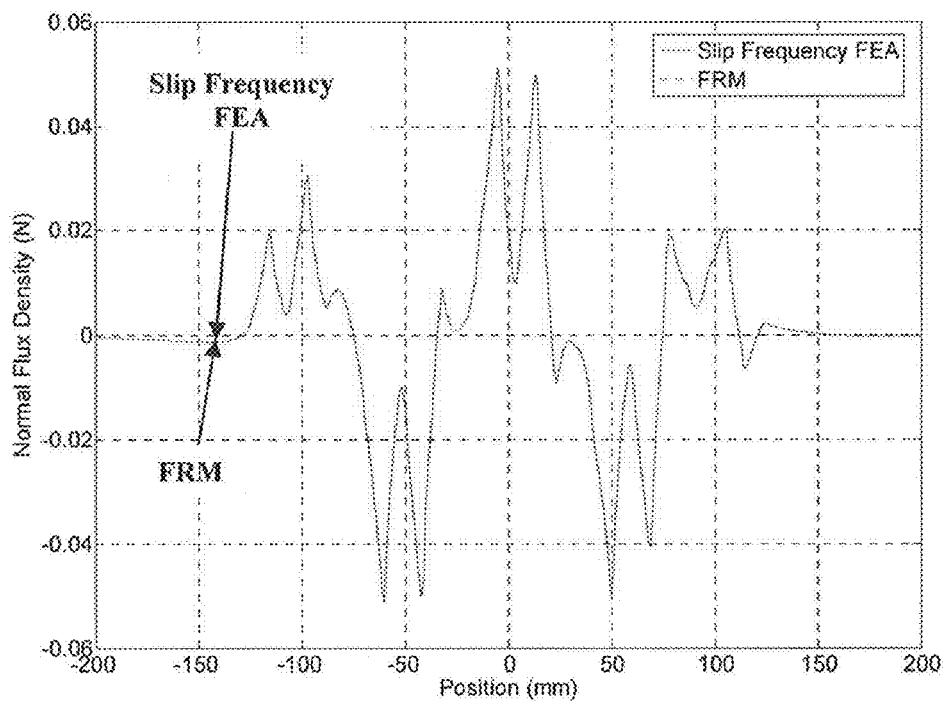
FIG. 29B is a plot of the normal flux density.
Figure 30A:
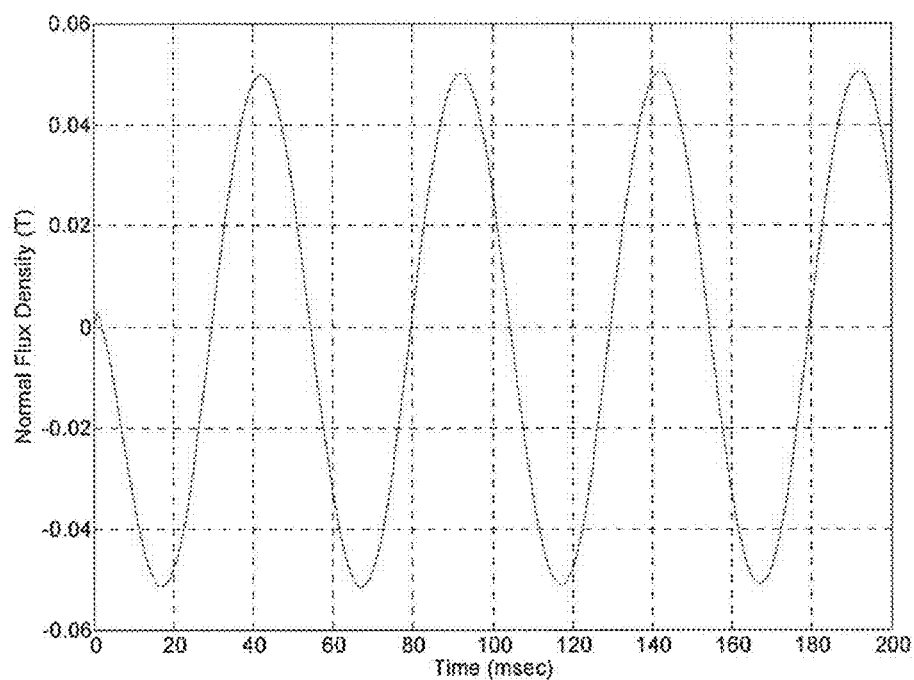
FIG. 30A is a plot of the normal flux density in the middle of an airgap at one particular position using the Field Reconstruction Method ("FRM")
Figure 30B:
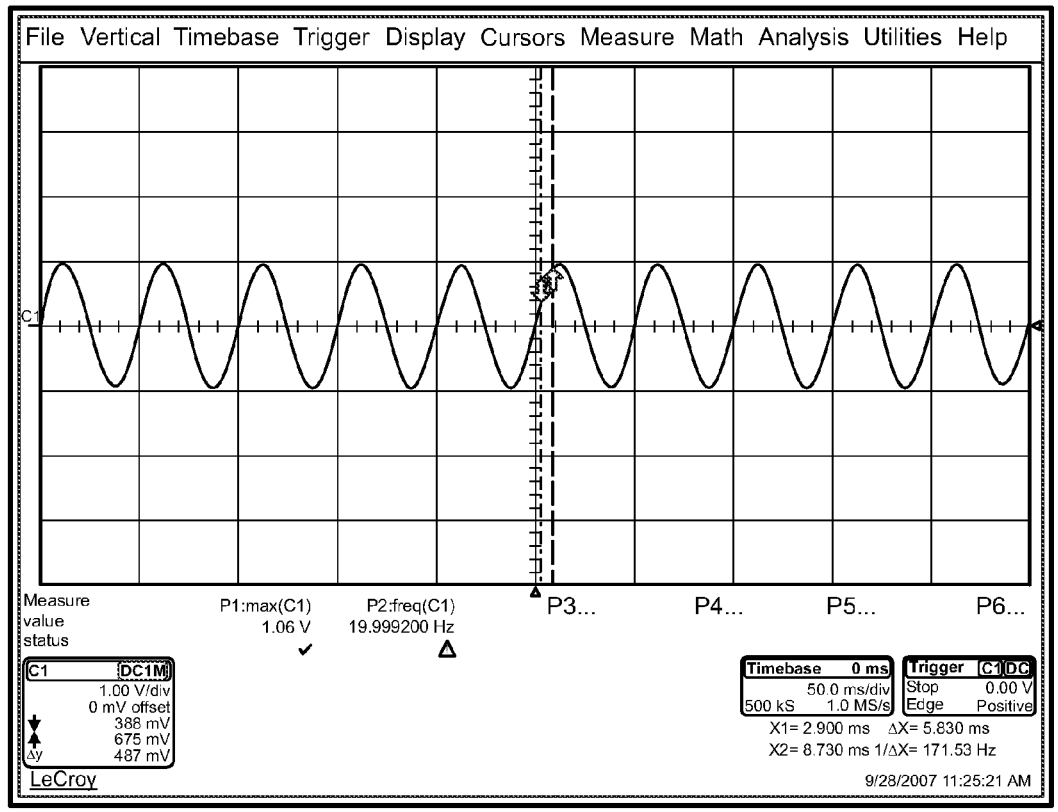
FIG. 30B is a plot of the measurement of normal flux density in the middle of an airgap at the same position from FIG. 30A at 0.05 T/Div.

To verify the effectiveness of the FRM method, the constant speed operation is simulated. Constant speed operation is useful in the evaluation of LIM steady state performance. The comparison between direct FEA, slip frequency FEA, and FRM is shown. The direct FEA is the FEA simulation including the linear speed. Slip frequency FEA is the transient FEA program that uses the slip frequency in the excitation instead of real frequency, and does not have linear motion. FRM is the simulation conducted in Matlab/Simulink that utilizes the slip frequency excitation method to reconstruct fields of the LIM. Since the experimental test is conducted at linear speed of 0.1 m/sec, the linear speed is also set to 0.1 m/sec in the constant speed operation for comparison. The electrical angular frequency corresponding to 0.1 m/sec is 1 Hz. Therefore, when the excitation frequency is 51 Hz, the slip frequency will be 50 Hz. At t=0 sec, the commanded three phase current are activated. The flux densities results from both slip frequency FEA and FRM at t=0.1 sec are shown in FIGS. 29A and 29B respectively. There is no visual difference between slip frequency FEA and FRM. FIGS. 30A and 30B illustrate the normal flux density variations at the same position from the FRM and experiment system. The output of the flux meter to the oscilloscope is the voltage signal. The amplitude of this voltage signal is 1.06 V, which is corresponding to about 0.05 T. The results from FIGS. 30A and 30B match well.

Figure 31A:
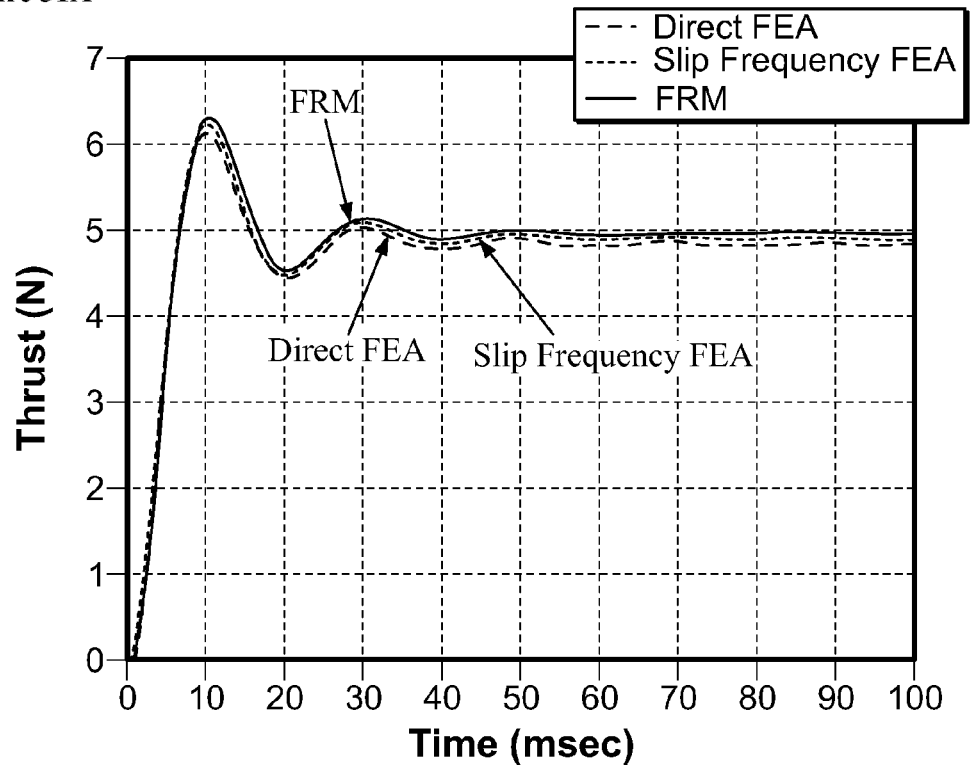
FIG. 31A is a plot of the thrust variations of the three methods, Direct FEA, Slip Frequency FEA, and FRM.
Figure 31B:
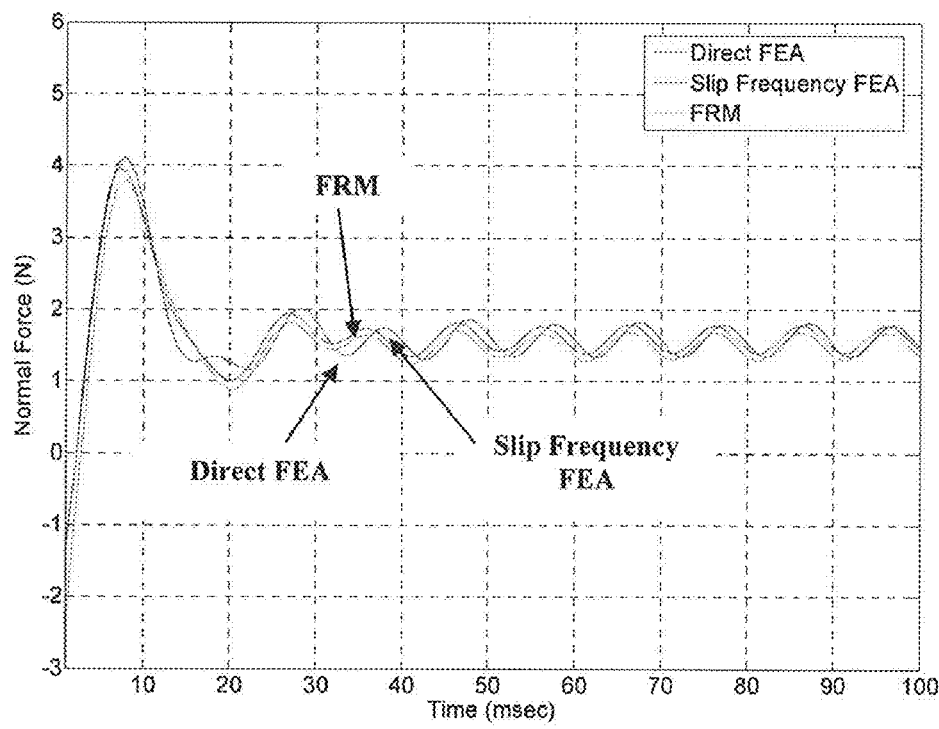
FIG. 31B is a plot of the normal force variations of the three methods.

Using MST, the thrust and normal force variations with time are illustrated in FIGS. 31A and 31B, respectively. In steady state, there are small values of DC error between these three methods. The reason of the DC error between direct FEA and slip frequency FEA is that the slip frequency FEA has no motion; therefore, there is no trailing eddy current effect in the slip frequency FEA. The DC error between slip frequency FEA and FRM is caused by truncating the infinite railway into a finite effective railway with the airgap and using finite discrete time domain convolution. In addition, due to the existence of the trailing eddy currents, the thrust value from direct FEA is less than the value from FRM. The trailing eddy current can degrade the force performance of LIM.

Saturation Effects

Figure 32A:
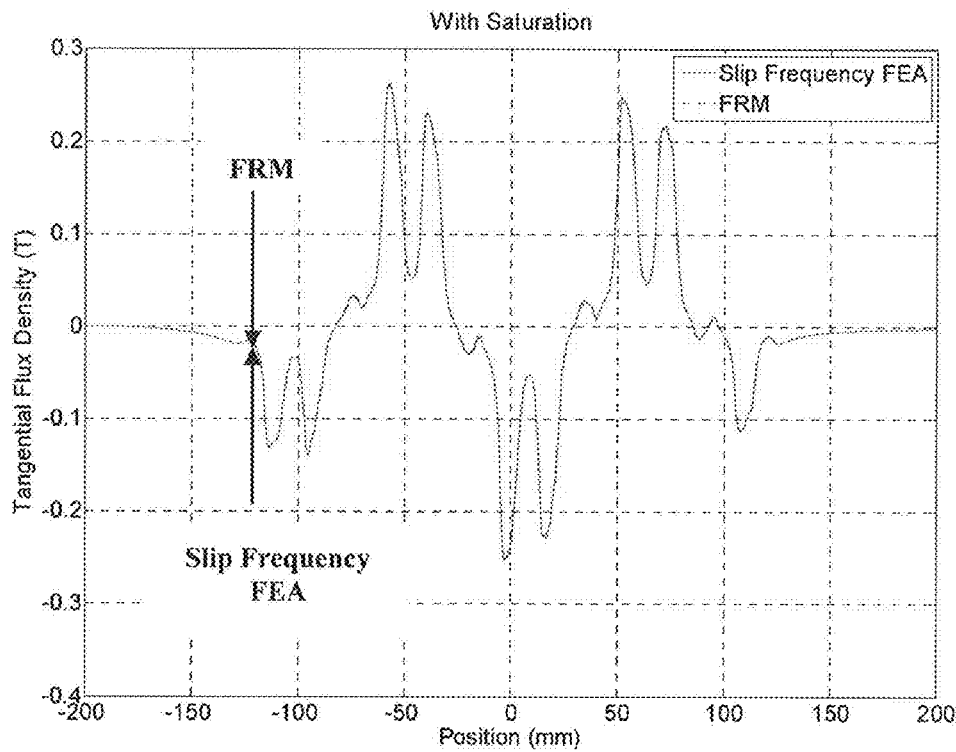
FIG. 32A is a plot of the tangential flux density with saturation.
Figure 32B:
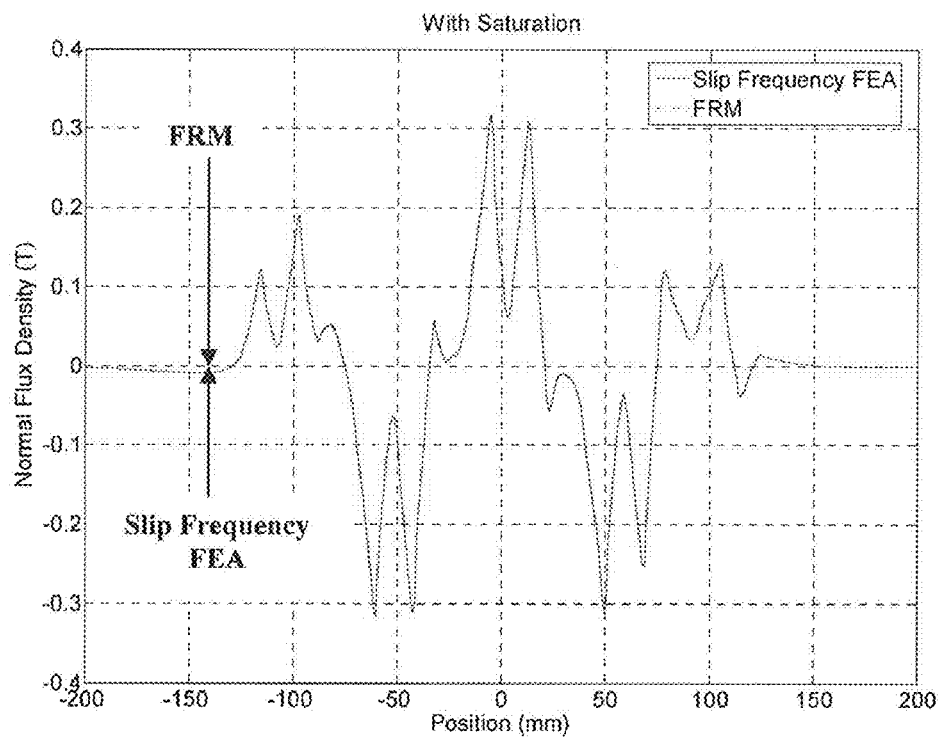
FIG. 32B is a plot of the normal flux density with saturation.

No saturation is one of the fundamental assumptions of FRM, so the robustness of FRM to the saturation effects is shown. Except the current amplitude, all the other parameters are the same. In FEA calculation and FRM, the phase current amplitude is changed to 25 A, such that the maximum flux density in the primary of LIM is about 1.49 T, which means the LIM machine has been saturated. FIGS. 32A and 32B illustrate the flux densities from both the slip frequency FEA and the FRM at instant 0.1 sec. There is some local visual differences between the results from the slip frequency FEA and the FRM due to the existence of saturation effect and most parts of the waveform match well.

Figure 33A:
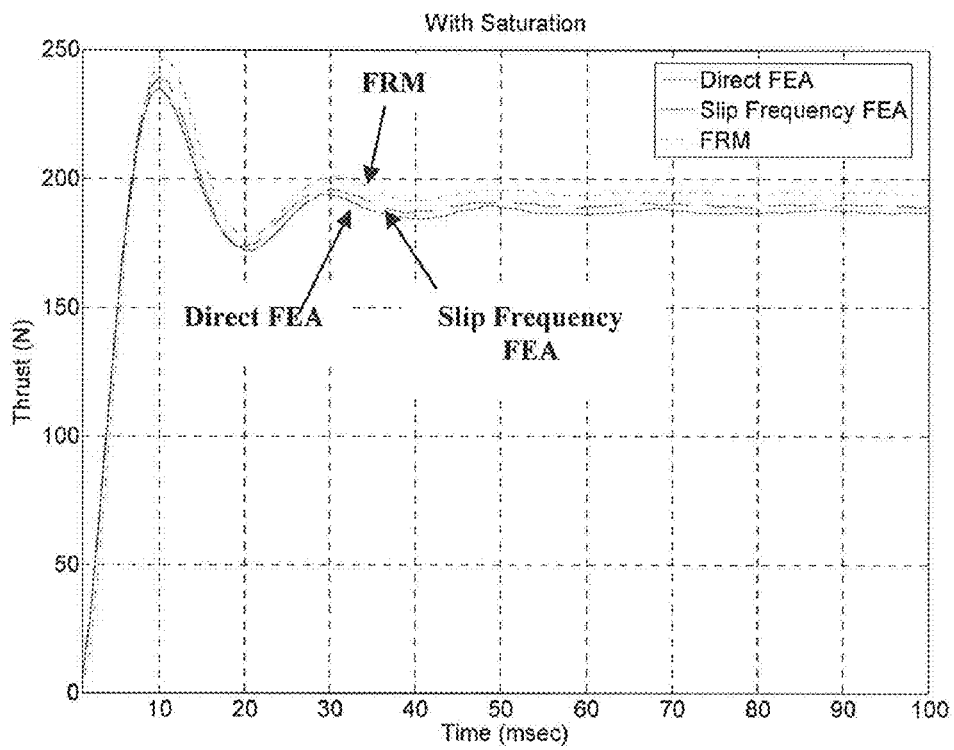
FIG. 33A is a plot of the thrust variations of the three methods with saturation.
Figure 33B:
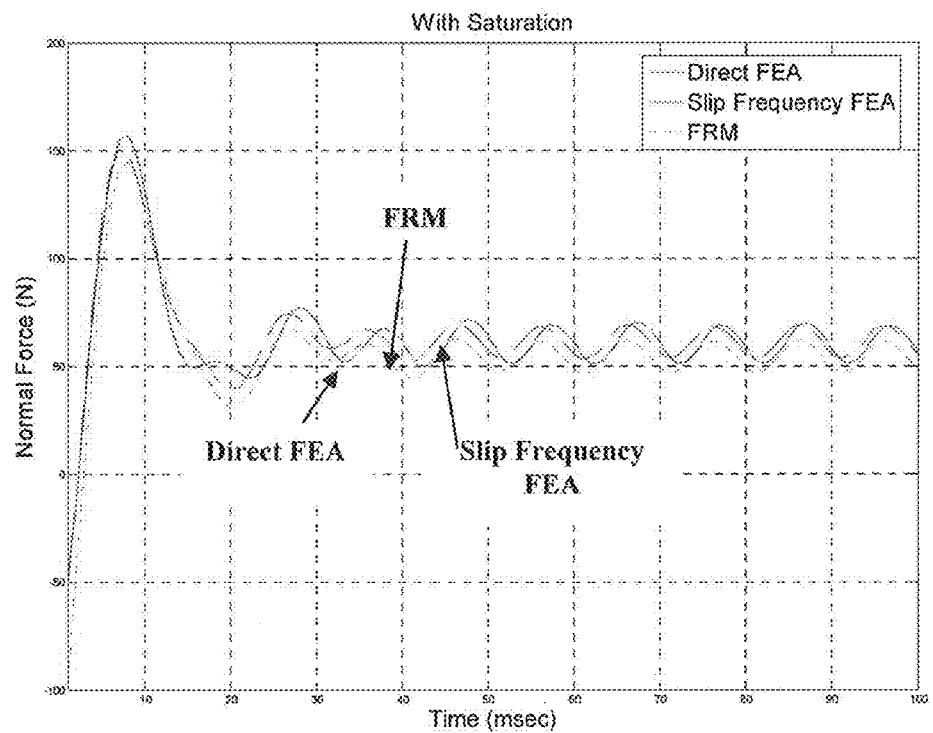
FIG. 33B is a plot of the normal force variations of the three methods with saturation.

FIGS. 33A and 33B represent the resultant force profiles subject to the saturation effects. The steady state DC errors between the three methods increase to 2.5%. The FRM can still generate accurate enough results even though the saturation still exists.

In one or more embodiments, FRM is able to detect faults in LIM systems and the adoption of a self-healing mechanism that seamlessly recovers the drive in the event of a failure in one of the phases of the machine.

Maximum Force/Ampere Control Scheme Using FRM

The LIM system 200 is shown in FIG. 7 and its 3D Finite Element model is shown in FIG. 1A. The high grade control scheme 400 comprises a maximum energy conversion ratio, including the maximum force/ampere control, a closed loop speed regulation, and a maximum acceleration/deceleration.

One pair of excitation frequencies can produce the maximum driving force or braking force for the LIM system 200 at any linear speed, where these excitation frequencies are defined as "optimum frequencies". If the gravity force and its by-product, friction force, are also taken into account, Equation (1) can be used. In one embodiment, using FRM, the pair of optimum frequencies for each linear speed can be determined. Based on the knowledge of the optimum frequencies for the discrete linear speeds and the interpolation method, the lookup tables 430 and 440 between linear speed and optimum frequency under motoring and generating conditions can be set up. Furthermore, the optimum frequency is fed into the interface board 250 to produce a set of three phase, balanced, current sources of optimum frequencies using current hysteresis control, so that at any linear speed maximum acceleration/deceleration can be implemented and maintained. Finally, the linear speed is regulated with the usage of hysteresis control. The complete functionality of the control scheme 400 is shown in FIG. 7. As shown in FIG. 7, the hysteresis comparator 410 in the block diagram determines whether the machine should work as a motor or as a generator, which is outputted to the Frequency Selector 420. $I_{max}$ may be set to 4 A. Two lookup tables 430 and 440 store the optimum frequencies at discrete linear speeds. The outputs from the lookup tables are selected based on the operation mode. The Expressions (2) and (3) represent the function of Frequency Selector. Simulation studies have been conducted based on the LIM system 200, as shown in FIG. 5A.

FIGS. 19A and 19B show the normal and thrust force ripple percentages with respect to the frequency at linear speed of 5 m/sec. The optimum frequencies 77.49 Hz and 25.9 Hz of 5 m/sec both will produce relatively small ripples, which verify that the control scheme has good immunity in noise.

Figure 34:
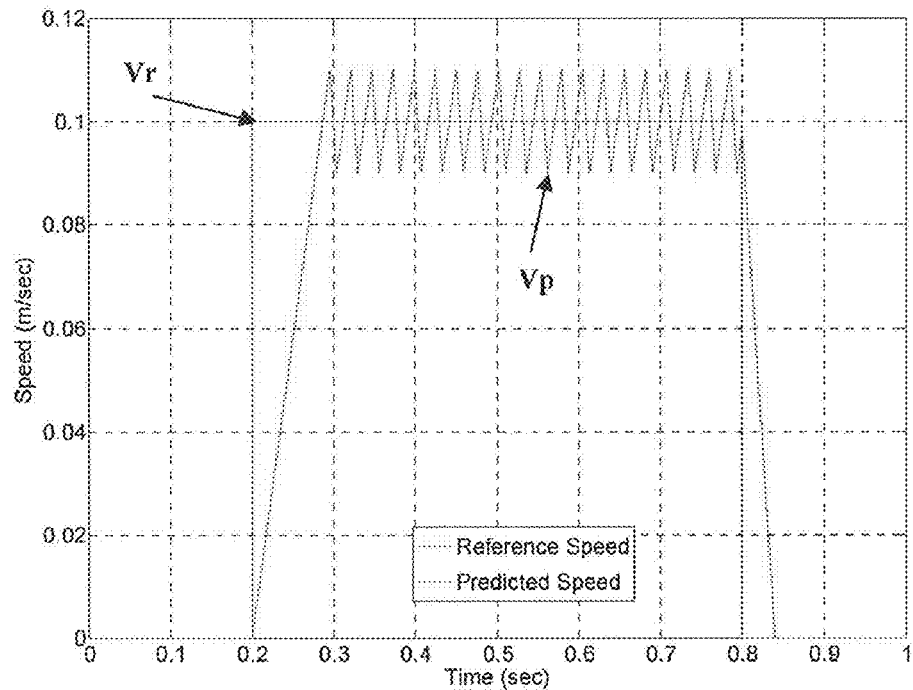
FIG. 34 is a plot of the speed response of maximum force/ampere control.

FIG. 34 represents the simulated speed response of a rectangular reference speed ("Vr"). At instant 0.2 sec, the speed reference steps up to 0.1 m/sec, and steps down to zero at instant 0.8 sec. The hysteresis band of the speed regulator is 0.01 m/sec. Under accelerating conditions, the friction force resists motion; however, under decelerating condition, the friction force helps the braking. Therefore, FIG. 34 has a larger braking slope than the one for starting.

Figure 35:
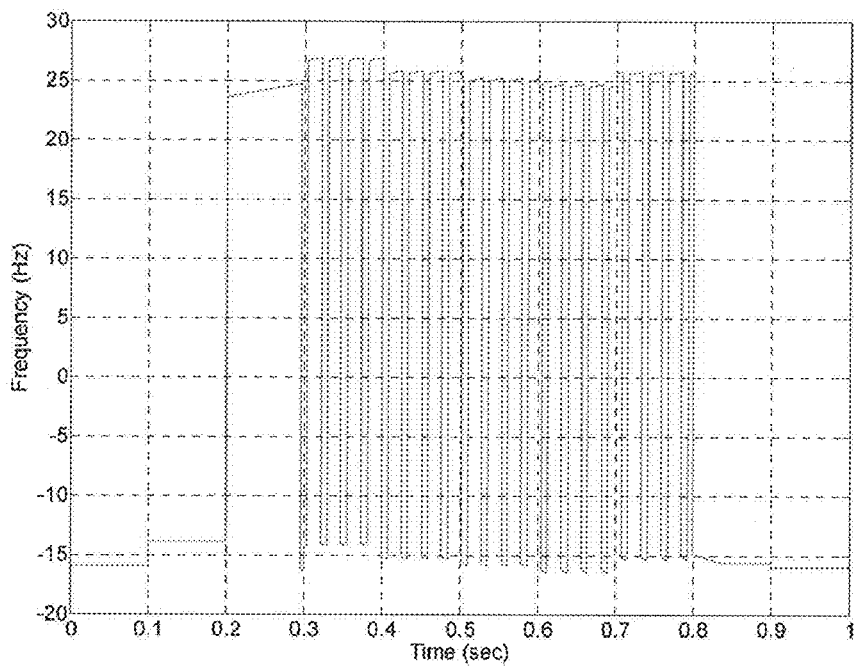
FIG. 35 is a plot of the profile of optimum excitation frequency.
Figure 36A:
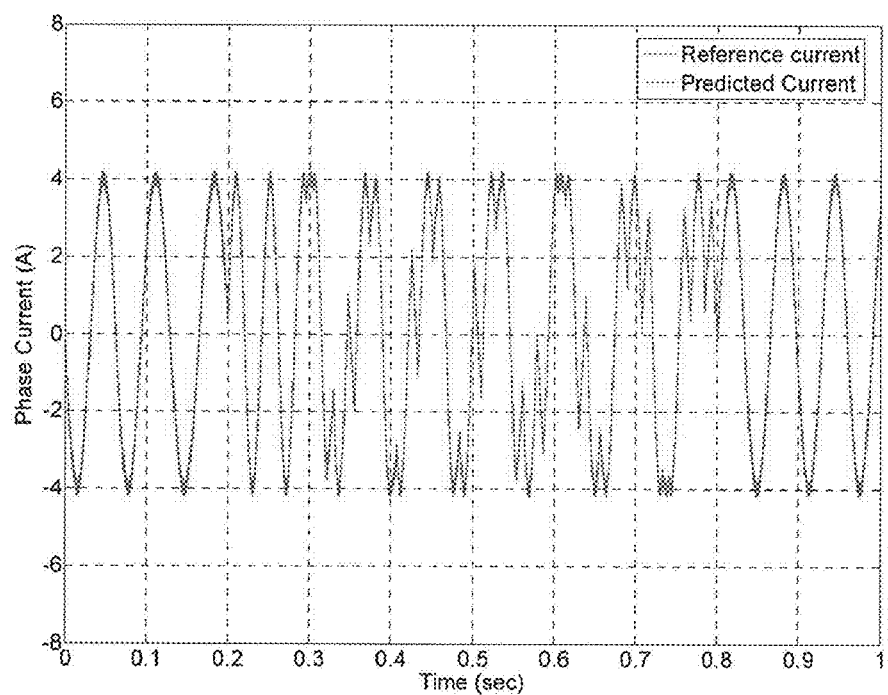
FIG. 36A is a plot of the simulated reference phase current and predicted phase current.
Figure 36B:
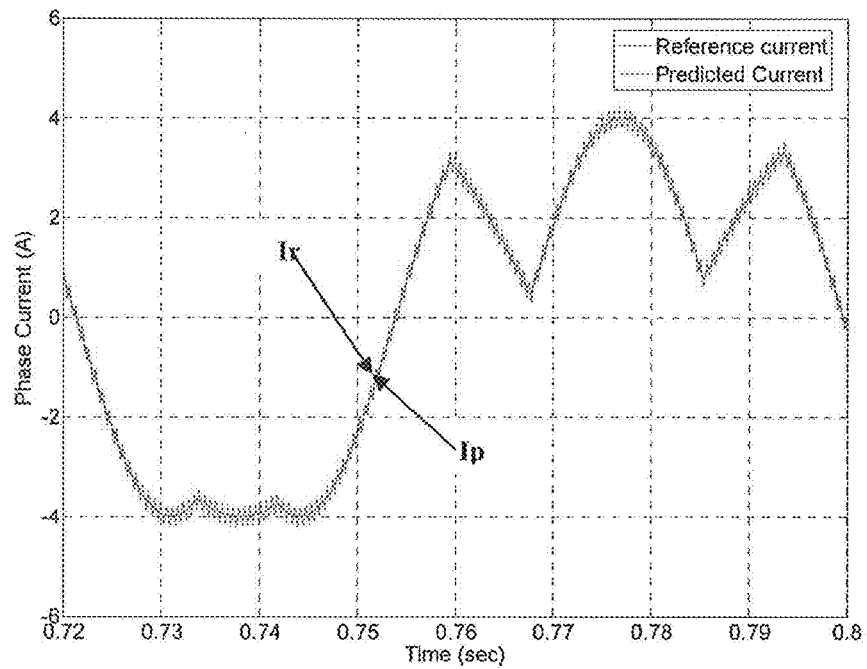
FIG. 36B is a zoomed phase current profile of FIG. 36A.

FIG. 35 is the simulated optimum excitation frequency profile. Depending on the mode of operation, the frequency switches between motoring (positive frequency) and generating (negative frequency) conditions. FIG. 36A illustrates the reference phase current ("Ir") and the predicted phase current ("Ip") using hysteresis control. FIG. 36B is a magnification of FIG. 36A from 0.72 to 0.80 s.

FIGS. 8A and 8B represent the thrust and normal force variations with respect to excitation frequency when airgap is set at 2.5 mm and 4.5 mm, respectively (linear velocity is 10 m/sec). When the airgap length discrepancy is 80% to the rated value 2.5 mm, the pair of optimum frequencies at 10 m/sec linear speed do not change, which validates that the control scheme has good immunity to airgap length variation.

Due to the existence of the heating effect of the secondary reaction plate, the electric conductivity of aluminium plate will change. For example, 20% discrepancy of the electric conductivity will result in the real electric conductivity being 31000000 Siemens/m (79% of Aluminium electric conductivity). FIGS. 9A and 9B illustrate the force variations with respect to excitation frequency when secondary electric conductivity is 39000000 Siemens/m (100% of Aluminium electric conductivity) and 31000000 Siemens/m respectively. The pair of optimum frequencies for motoring and generating approximately remains the same. Therefore, the control scheme is verified to tolerate the secondary heating effect well.

Figure 37:
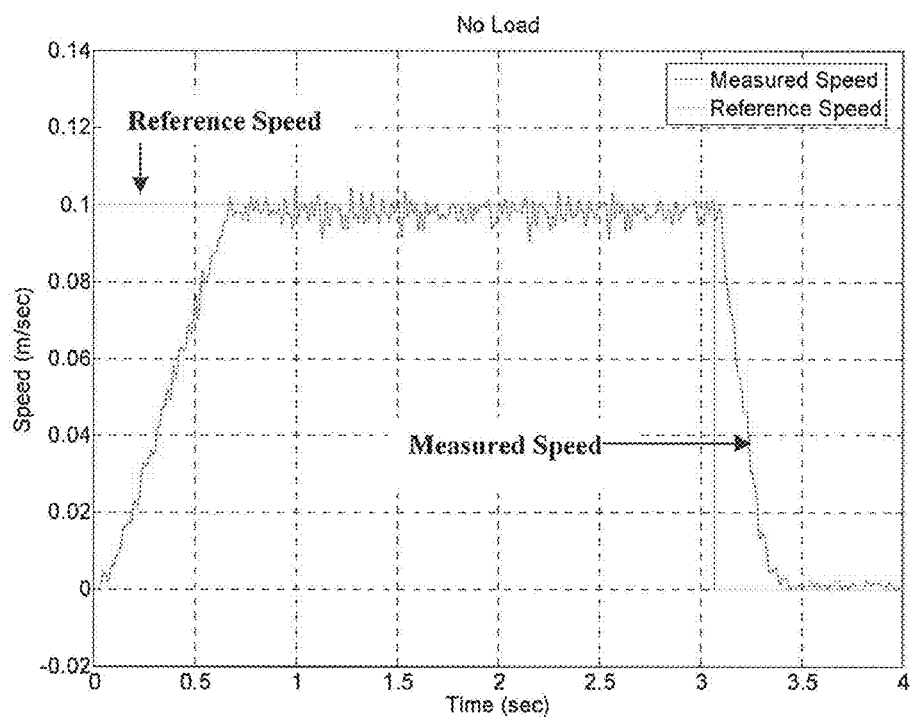
FIG. 37 is a plot of the speed response of the Maximum Force/Ampere Control with no load.

Tests have been conducted based on the LIM system 200, as shown in FIG. 5A. FIG. 37 illustrates the speed response under no load conditions using maximum force/ampere control, i.e. the control scheme. When the speed reference steps up to 0.1 m/sec at 0 sec, the speed response is tracking the reference immediately. In addition, the control scheme includes excellent speed regulation in the steady state. Furthermore, the braking slope is larger than that of the starting slope.

Figure 38A:
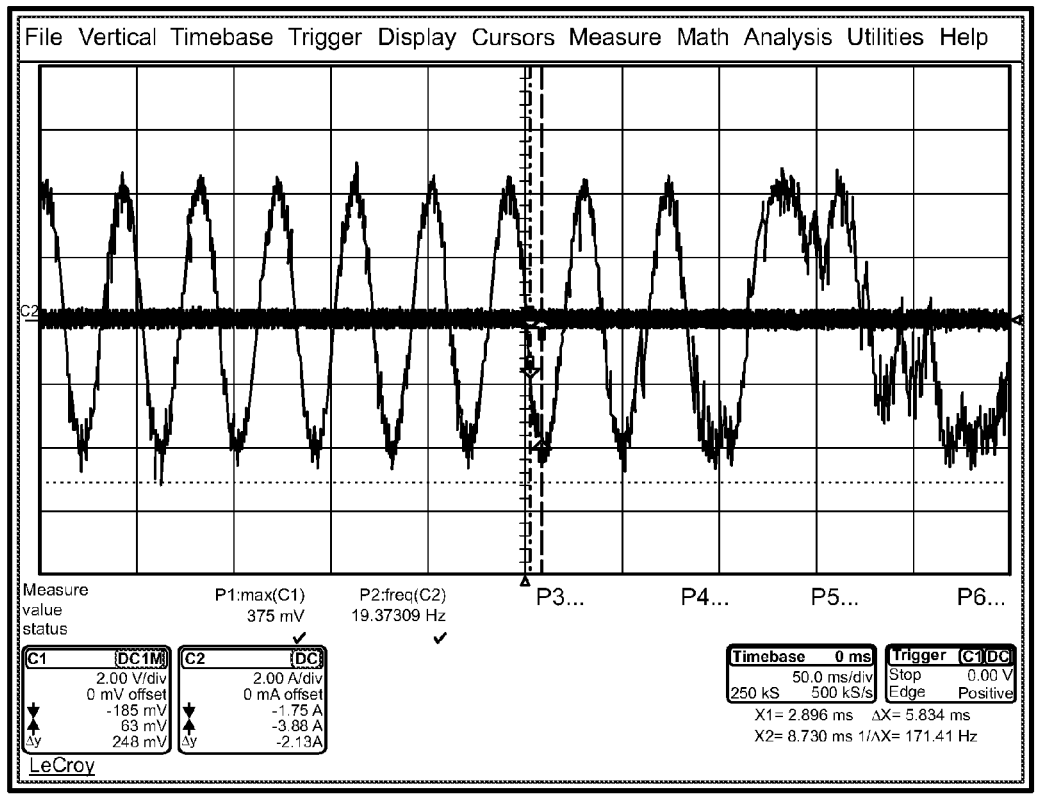
FIG. 38A is a plot of the transition phase current from starting to steady state.
Figure 38B:
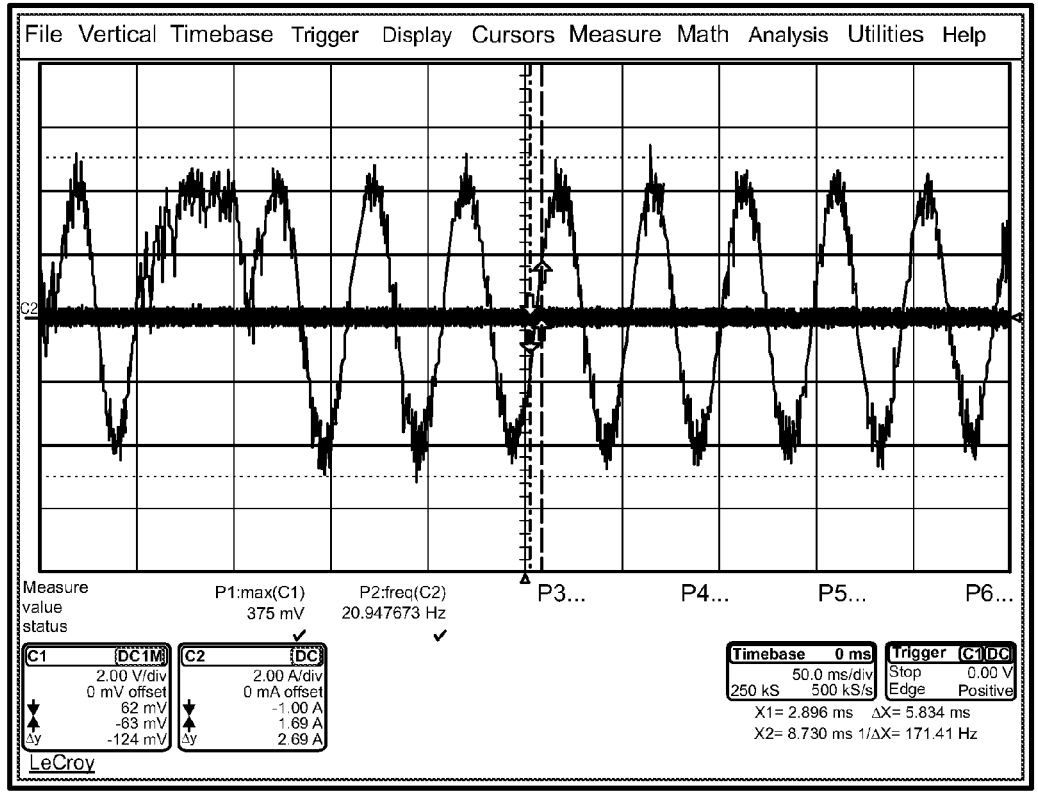
FIG. 38B is a plot of the transition phase current from steady state to braking with no load.
Figure 38C:
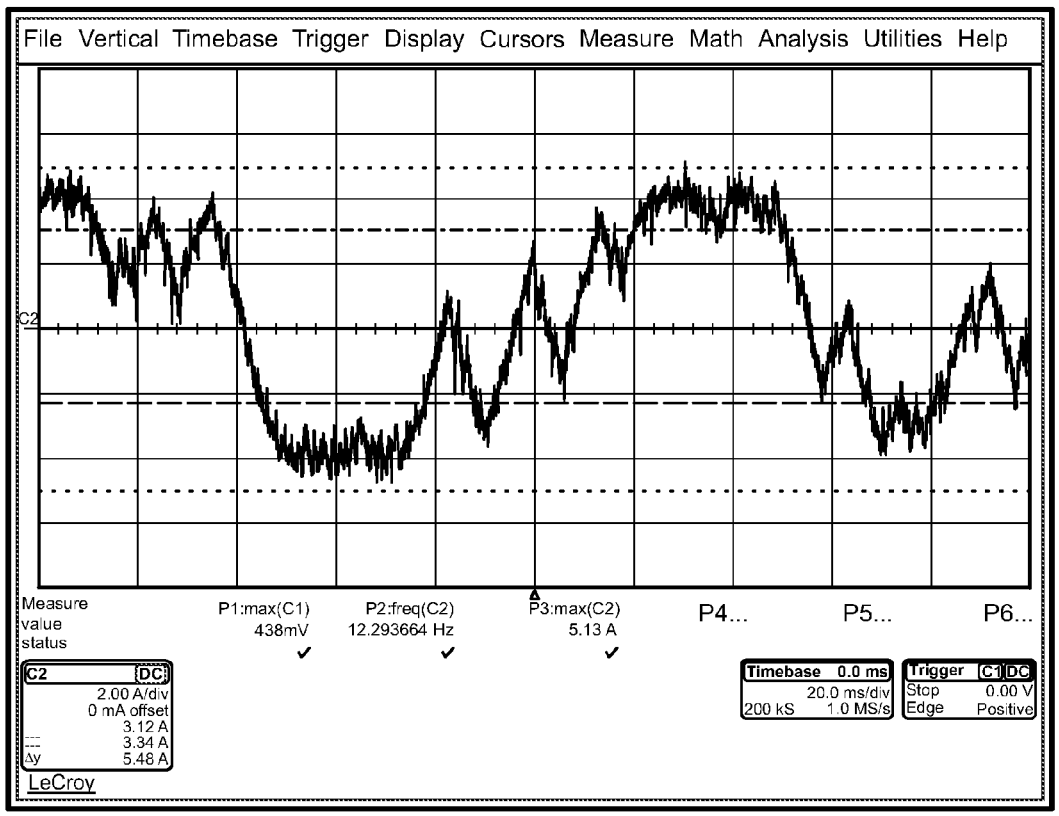
FIG. 38C is a plot of the zoomed steady state phase current using maximum force/ampere control with no load.

FIGS. 38A-38C illustrate the transition of phase current from the starting to steady state, from the steady state to braking, and during the steady state. FIG. 38C verifies that during steady state, depending on the operation mode, the excitation frequency switches. In addition, the excitation frequency includes a very similar format with the simulated waveform.

Figure 39:
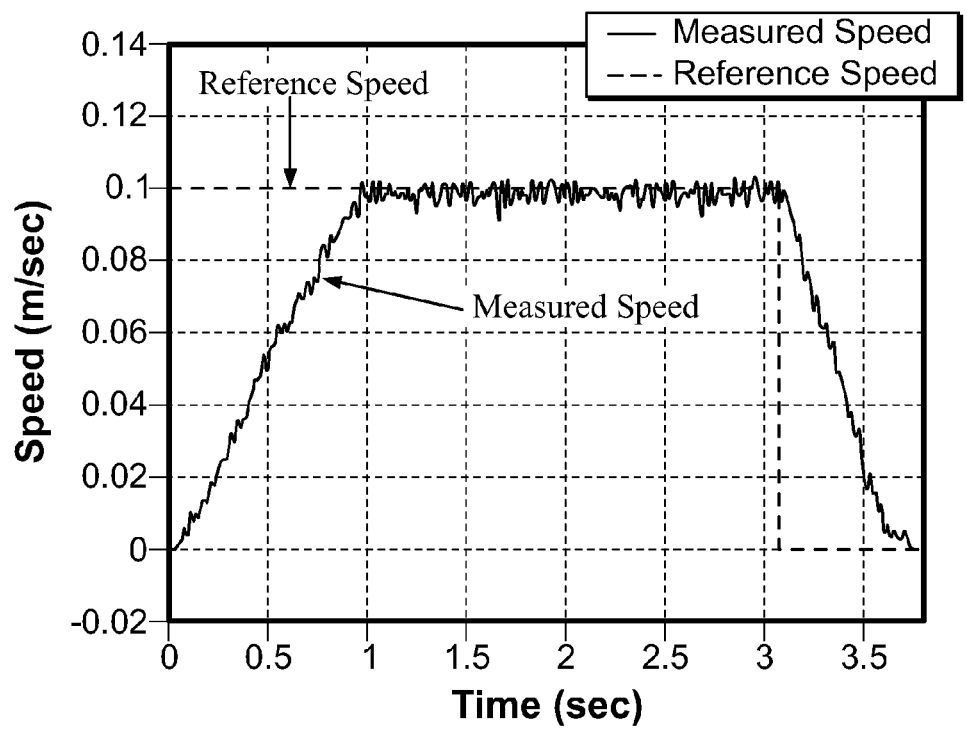
FIG. 39 is a plot of the speed response of the maximum force/ampere control with 22 lbs. of load.
Figure 40A:
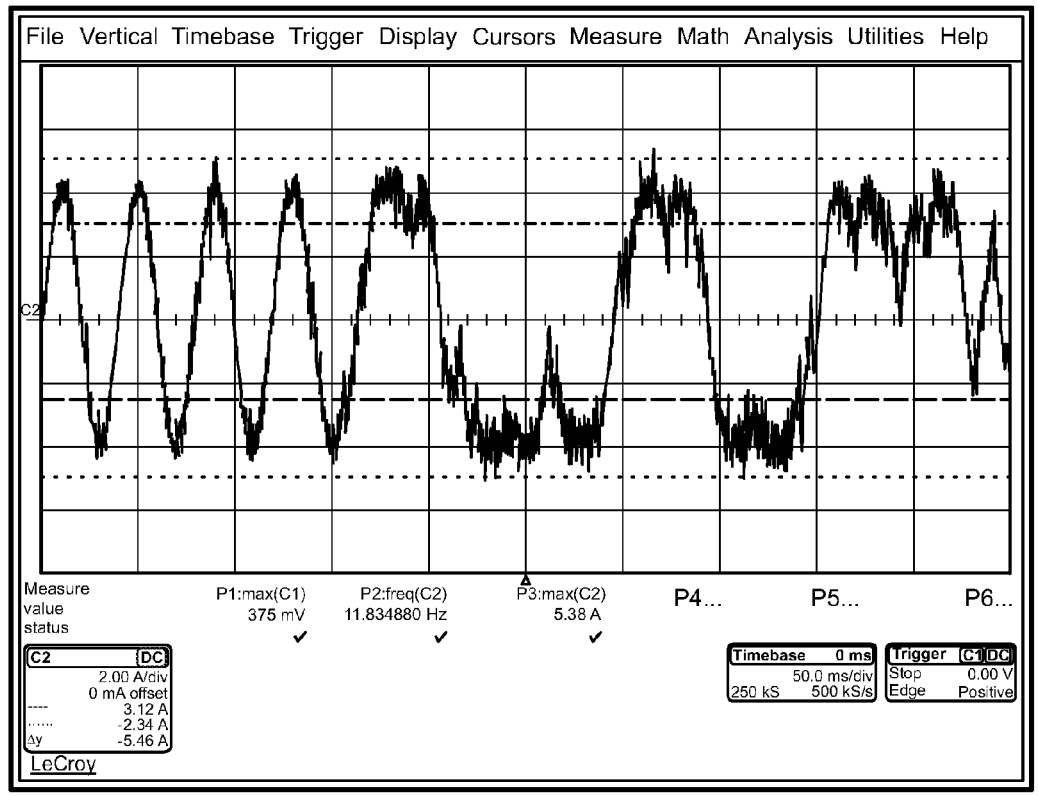
FIG. 40A is a plot of the transition phase current from starting to steady state with 22 lbs. of load.
Figure 40B:
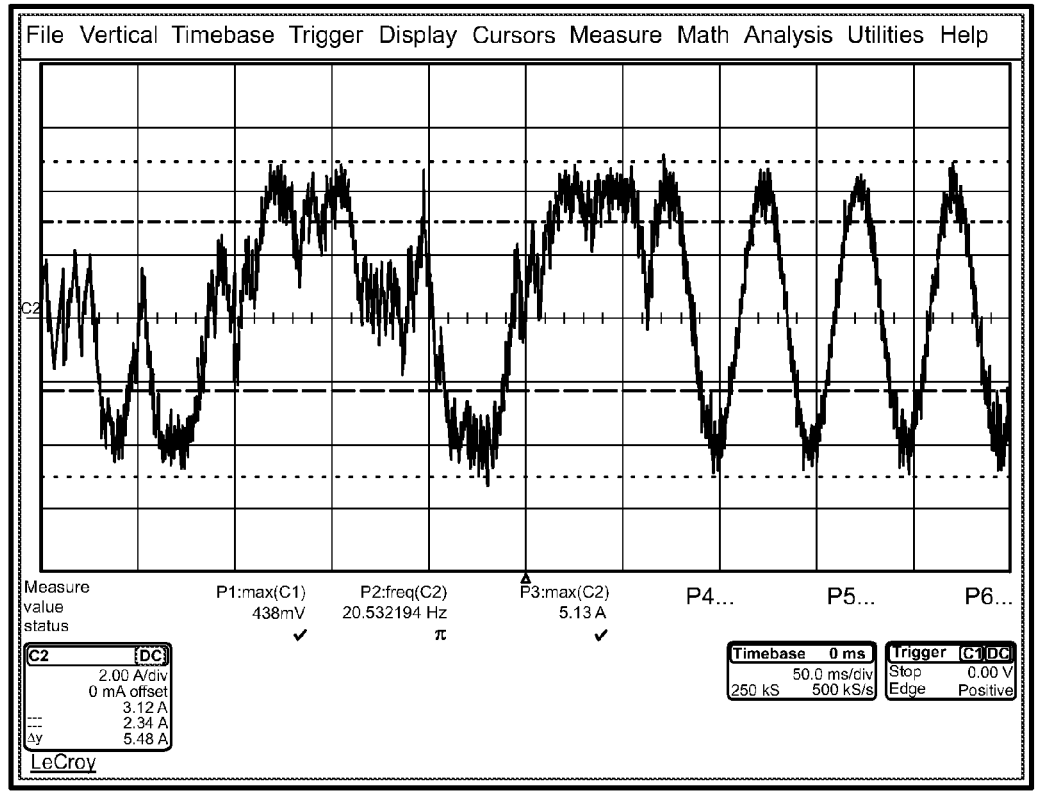
FIG. 40B is a plot of the transition phase current from steady state to braking with 22 lbs. of load.
Figure 40C:
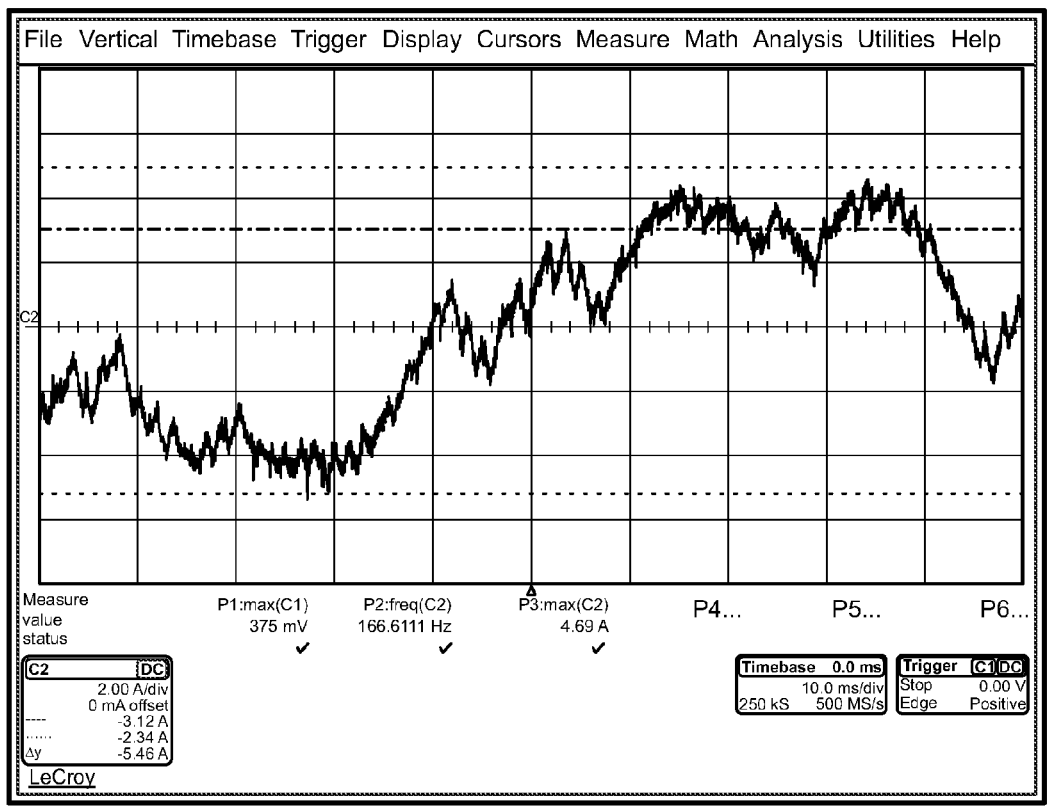
FIG. 40C is a plot of the zoomed steady state phase current using maximum force/ampere control with 22 lbs. of load.

FIG. 39 represents the speed response when the primary is loaded with 22 lbs. mass. The steady state speed is regulated well with small ripples. FIGS. 40A-40C display the transition of phase current from starting to steady state, from steady state to braking, and during steady state with 22 lbs. load on the primary.

Figure 41:
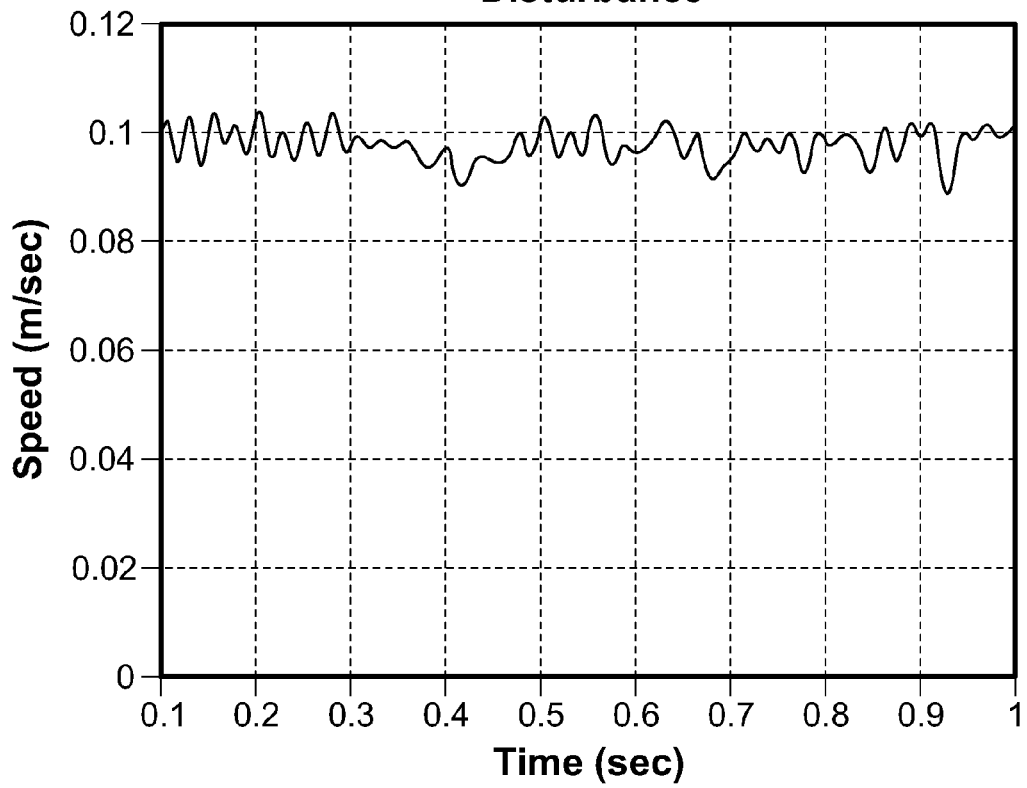
FIG. 41 is a plot of the speed profile of a sudden change of 22 lbs. of load using maximum force/ampere control.

In FIG. 41, at the instant about 0.3 sec, the mass is put on the primary; however, the linear speed is not affected by this disturbance much. The reason is that at any instant the control scheme 400 always generates the maximum force per ampere based on the current linear speed value, which indicates that the control scheme 400 is adaptive to any load change.

Comparison between IFOC and the Control Scheme

Figure 42A:
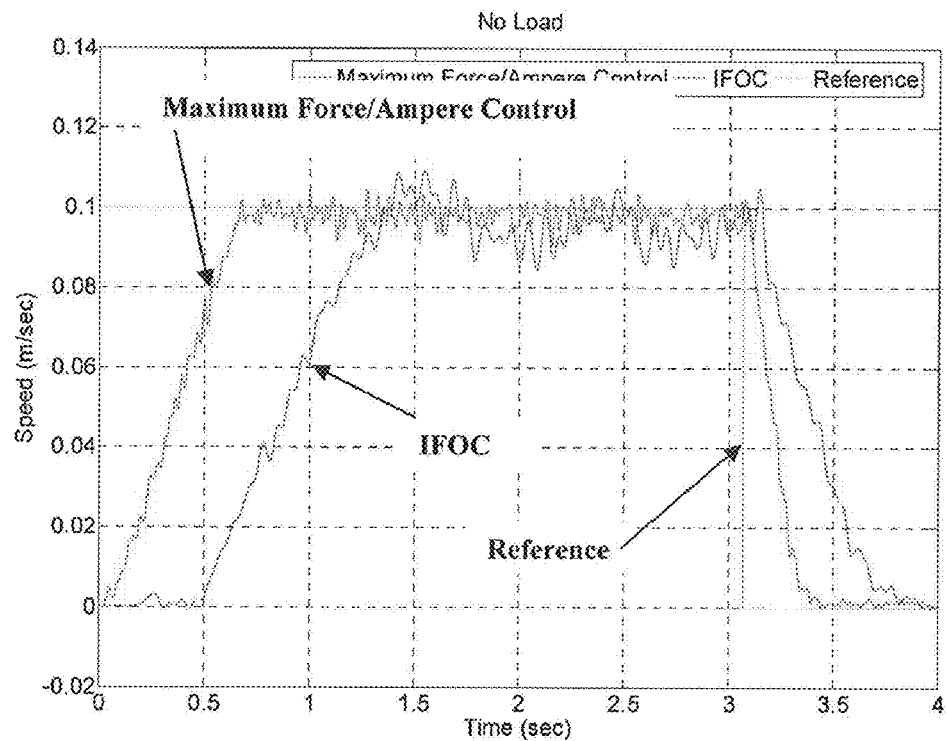
FIG. 42A is a plot of speed response of both methods and no load.
Figure 42B:
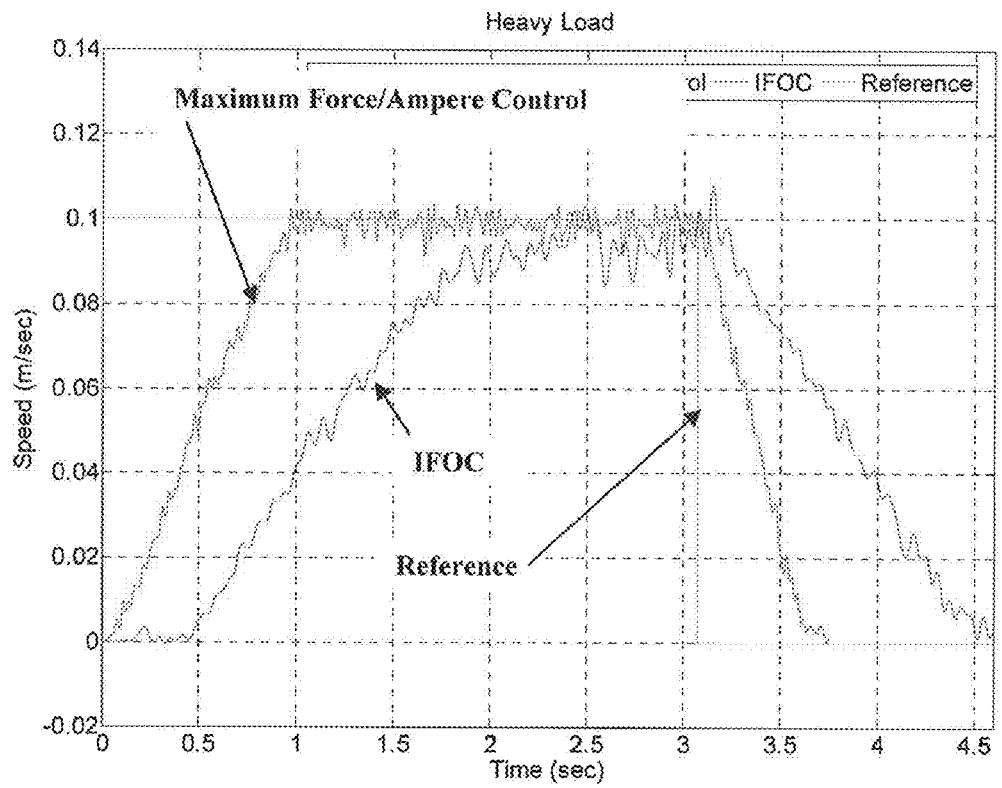
FIG. 42B is a plot of the speed response of both methods under 22 lbs. of load.

Direct field oriented control directly measures the location of rotor flux axis, and uses the flux angle to decouple the stator currents into quadrature and direct components, i.e. $I_q$ and $I_d$. $I_q$ and $I_d$ are also called force and magnetizing current respectively. The concept of indirect field oriented control ("IFOC") is similar to that of direct field oriented control in which the position of rotor flux in the airgap is estimated. As can be seen, the speed response of the control scheme 400 and IFOC is plotted together in FIGS. 42A and 42B. The control scheme has a faster response and a better regulation on the linear speed compared to the IFOC. In addition, the current waveforms from the control scheme are much cleaner than those from IFOC, which results in a smaller value of total harmonic distortion ("THD").

Figure 43:
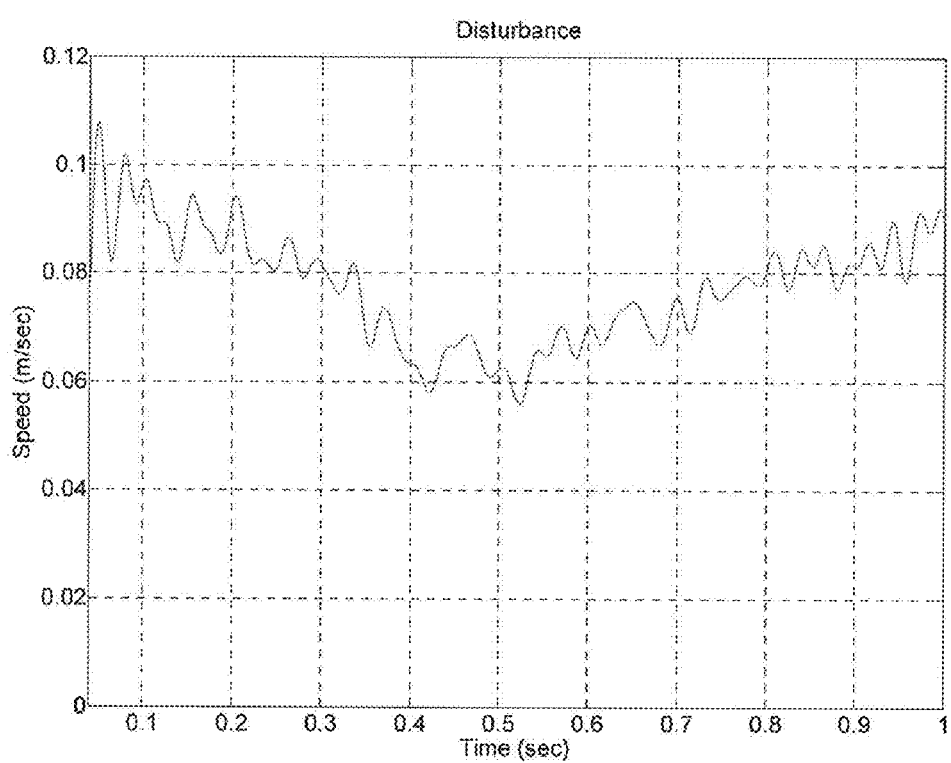
FIG. 43 is a plot of the speed profile subject to a sudden change of 22 lbs. of load using Indirect Field Oriented Control ("IFOC").

Furthermore, the stability and robustness of the control scheme compared to IFOC is shown in FIGS. 43 and 41, which illustrate the linear speed reaction when the 22 lbs. mass is suddenly put on the moving primary in the steady state. In FIG. 43, at the instant about 0.1 sec, the load is put on the primary, there is a big dip in the speed profile, which is due to the design of the PI controller for IFOC based on the no load LIM plant (17 Kg). The sudden change of load will change the mechanical plant immediately. In FIG. 41, at the instant about 0.3 sec, the mass is put on the primary, however, the linear speed is not affected by this disturbance much, because at any instant the control scheme always generates the maximum force per ampere based on the current linear speed value.

The embodiments described herein are usable with schemes, methods, and systems described in "High grade control of linear induction motor drives"; H. Yu, (Dissertation, University of Texas, 2007), herein incorporated by reference. Additional objects, advantages and novel features as set forth in the description, will be apparent to one skilled in the art after reading the foregoing detailed description or may be learned by practice of the embodiments. The objects and advantages may be realized and attained by means of the instruments and combinations particularly pointed out here.

What is claims is:

1. A control scheme for a linear induction machine, comprising the steps of:
    a. determining whether a machine should function under a motoring condition or under a generating condition with a hysteresis comparator;
    b. coupling the motoring condition and the generating condition functions to a frequency selector;
    c. storing an optimum frequency for the motoring condition in a first lookup table and storing an optimum frequency for the generating condition in a second lookup table, wherein the first and second lookup tables are coupled to the frequency selector; and
    d. outputting the first and second lookup tables based on the motoring condition or the generating condition selected by the hysteresis comparator.

2. The control scheme of claim 1, wherein the first lookup table stores the optimum frequency of a discrete linear speed for the motoring condition.

3. The control scheme of claim 1, further comprising coupling the optimum frequencies into a power converter to produce a set of three phase, balanced, current sources of the optimum frequencies; and using a hysteresis current control to implement and maintain a maximum acceleration and deceleration at any linear speed.

4. The control scheme of claim 1, wherein the function of the frequency selector comprises $f\_out = f\_in$(motoring), if $Speed\_ref - Speed\_out <$ -Hysteresis band, for the motoring condition; or $f\_out = f\_in$(generating), if $Speed\_ref - Speed\_out <$ -Hysteresis band, for the generating condition.

5. The control scheme of claim 4, further comprising computing the $Speed\_ref$ by passing an error between a position reference and a predicted position through a PI type controller.

6. The control scheme of claim 4, further comprising using a field reconstruction method to evaluate the electromagnetic forces of the different ranges of the linear speed and the excitation frequencies to determine the pair of optimum frequencies for each linear speed.

7. The control scheme of claim 1, further comprising coupling the optimum frequencies of the motoring condition and the generating condition into a linear induction machine to generate thrust and normal forces.

8. The control scheme of claim 7, further comprising coupling the thrust and normal forces of the linear induction machine to generate a $Speed\_out$, and monitoring the $Speed\_out$, by the hysteresis comparator.

9. The control scheme of claim 7, further comprising setting a phase current amplitude of the linear induction machine to a set value.

10. A linear induction machine control scheme comprising:
    a. a hysteresis comparator electronically coupled to a frequency selector, wherein the hysteresis comparator determines whether a machine operates as a motor or a generator;
    b. a first lookup table electronically coupled to the frequency selector, wherein the first lookup table stores an optimum frequency for a discrete linear speed for the motor operation;
    c. a second lookup table and the second lookup table stores an optimum frequency for the generator operation; and
    d. a first output from the first lookup table and a second output from the second lookup tables, wherein the first and second outputs are selected based on the operation mode as the motor operation or the generator operation.

11. The linear induction machine control scheme of claim 10, further comprising a power converter coupled to the frequency selector to produce a set of three phase, balanced, current sources of the optimum frequencies.

12. The linear induction machine control scheme of claim 10, wherein the frequency selector comprises a function of $f\_out = f\_in$(motoring), if $Speed\_ref - Speed\_out >$ Hysteresis band, for the motor operation, or a function of $f\_out = f\_in$ (generating), if $Speed\_ref - Speed\_out <$ -Hysteresis band, for the generator operation.

13. The linear induction machine control scheme of claim 12, further comprising a mechanical plant coupled to the thrust and normal forces of the linear induction machine to generate a $Speed\_out$, wherein the $Speed\_out$ is monitored by the hysteresis comparator.

14. The linear induction machine control scheme of claim 13, further comprising a phase current amplitude to a set value.

15. The linear induction machine control scheme of claim 12, further comprising a PI type controller coupled to the hysteresis comparator to compute the $Speed\_ref$ by passing an error between a position reference and a predicted position through a PI type controller.

16. The linear induction machine control scheme of claim 10, further comprising a linear induction machine coupled to the frequency selector to generate thrust and normal forces.

17. The linear induction system control scheme of claim 10, wherein an excitation scheme is provided by a power converter that incorporates a multiple-phase balanced current source.

18. A field reconstruction method to evaluate electromagnetic forces and fields in a linear induction machine, comprising the steps of:
   a. subtracting an electrical angular frequency corresponding to a linear speed from an excitation frequency to result in a slip frequency;
   b. identifying a plurality of primary basis functions by setting a primary speed at v=0, and setting each phase current to a DC value, respectively;
   c. using a transient finite element analysis evaluation to use an impulse current as a phase a current input signal;
   d. recording a sequence of normal and tangential flux densities for $t \geq t_0$; and
   e. using a previously established primary basis functions, $B_{xs}(l)=i_a B_{xsa}(l)+i_b B_{xsb}(l)+i_c B_{xsc}(l)$ and $B_{ys}(l)=i_a B_{ysa}(l)+i_b B_{ysb}(l)+i_c B_{ysc}(l)$, where l is the position information on the effective airgap, to represent the flux densities generated by a secondary eddy current as $B_{xra}=B_{xim}-B_{xsa}$ and $B_{yra}=B_{yim}-B_{ysa}$, where $B_{xim}$ and $B_{yim}$ are the recorded values of the flux densities due to an impulse current input, and $B_{xra}$ and $B_{yra}$ are secondary basis functions of phase a.

19. The field reconstruction method of claim 18, further comprising:
   a. identifying a secondary basis functions of phase b and c;
   b. representing the secondary basis functions in a format of matrices, where the rows of the matrices represent the n points along the effective airgap and the columns of the matrices describe the impulse response of these points in the time domain; and
   c. representing a normal and a tangential flux density due to the secondary eddy current by $B_{xr}(l,t)=i_a(t)*B_{xra}(l,t)+i_b(t)*B_{xrb}(l,t)+i_c(t)*B_{xrc}(l,t)$ and $B_{yr}(l,t)=i_a(t)*B_{yra}(l,t)+i_b(t)*B_{yrb}(l,t)+i_c(t)*B_{yrc}(l,t)$, where '*' denotes an operation of convolution.

20. The field reconstruction method of claim 18, further comprising:
   a. obtaining the total tangential and normal flux densities $B_x$ and $B_y$ in the middle of airgap due to an arbitrary primary excitation current by $$B_x(l,t) = i_a(t)B_{xsa}(l) + i_b(t)B_{xsb}(l) + i_c(t)B_{xsc}(l) + i_a(t)*B_{xra}(l,t) + i_b(t)*B_{xrb}(l,t) + i_c(t)*B_{xrc}(l,t) \text{ and}$$

$$B_y(l,t) = i_a(t)B_{ysa}(l) + i_b(t)B_{ysb}(l) + i_c(t)B_{ysc}(l) + i_a(t)*B_{yra}(l,t) + i_b(t)*B_{yrb}(l,t) + i_c(t)*B_{yrc}(l,t);$$

b. conducting an operation of convolution in a discrete time domain; and
   c. using a Maxwell stress tensor to compute the force densities and the electromagnetic forces.

* * * * *